(12) United States Patent
Miura et al.

(10) Patent No.: US 7,755,779 B2
(45) Date of Patent: Jul. 13, 2010

(54) IMAGE FORMING APPARATUS HAVING ENERGY-SAVING MODE, CONTROL METHOD THEREFOR, NETWORK SYSTEM INCLUDING THE IMAGE FORMING APPARATUS, AND CONTROL METHOD THEREFOR

(75) Inventors: Shigeo Miura, Tokyo (JP); Kazuki Miyamoto, Abiko (JP); Takeharu Uchizono, Moriya (JP); Takahiro Ushiro, Toride (JP); Tomoyuki Takeda, Yokohama (JP); Shinichi Takata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/530,559

(22) PCT Filed: Oct. 8, 2003

(86) PCT No.: PCT/JP03/12902

§ 371 (c)(1),
(2), (4) Date: Oct. 25, 2005

(87) PCT Pub. No.: WO2004/033219

PCT Pub. Date: Apr. 22, 2004

(65) Prior Publication Data

US 2006/0100724 A1    May 11, 2006

(30) Foreign Application Priority Data

Oct. 8, 2002    (JP) .............................. 2002-294670

(51) Int. Cl.
G05B 11/01    (2006.01)
(52) U.S. Cl. ..................................... 358/1.13; 713/300
(58) Field of Classification Search ................ 358/1.13; 700/82; 713/300–340; 399/70
See application file for complete search history.

(56) References Cited

U.S. PATENT DOCUMENTS

| 6,807,907 | B2 * | 10/2004 | Yamada ...................... 101/484 |
| 7,283,262 | B2 | 10/2007 | Takeda et al. |
| 2002/0149789 | A1 * | 10/2002 | Okazawa .................... 358/1.14 |
| 2002/0178387 | A1 * | 11/2002 | Theron ........................ 713/300 |
| 2003/0140260 | A1 * | 7/2003 | Kizawa et al. .............. 713/300 |
| 2004/0004732 | A1 | 1/2004 | Takeda et al. |

FOREIGN PATENT DOCUMENTS

| JP | 2001-75687 | A | 3/2001 |
| JP | 2002-244833 | A | 8/2002 |
| JP | 2002-287936 | A | 10/2002 |
| JP | 3984876 | B2 | 10/2007 |

* cited by examiner

*Primary Examiner*—Benny Q Tieu
*Assistant Examiner*—Qian Yang
(74) *Attorney, Agent, or Firm*—Fitzpatrick, Cella, Harper & Scinto

(57) ABSTRACT

When the image forming apparatus shifts to the reduced power consumption mode, the image forming apparatus transmits an agency request command for requesting the server apparatus to respond to a status request, on behalf of the image forming apparatus, and the latest status thereof to the server apparatus. When there is a change in the status of the image forming apparatus in the reduced power consumption mode, the image forming apparatus transmits a changed status thereof to the server apparatus. The server apparatus receives a status request sent from an information processing apparatus connected to the network to the image forming apparatus, on behalf of the image forming apparatus. The server apparatus responds to the information processing apparatus in response to the status request, based on the status received beforehand from the image forming apparatus.

5 Claims, 38 Drawing Sheets

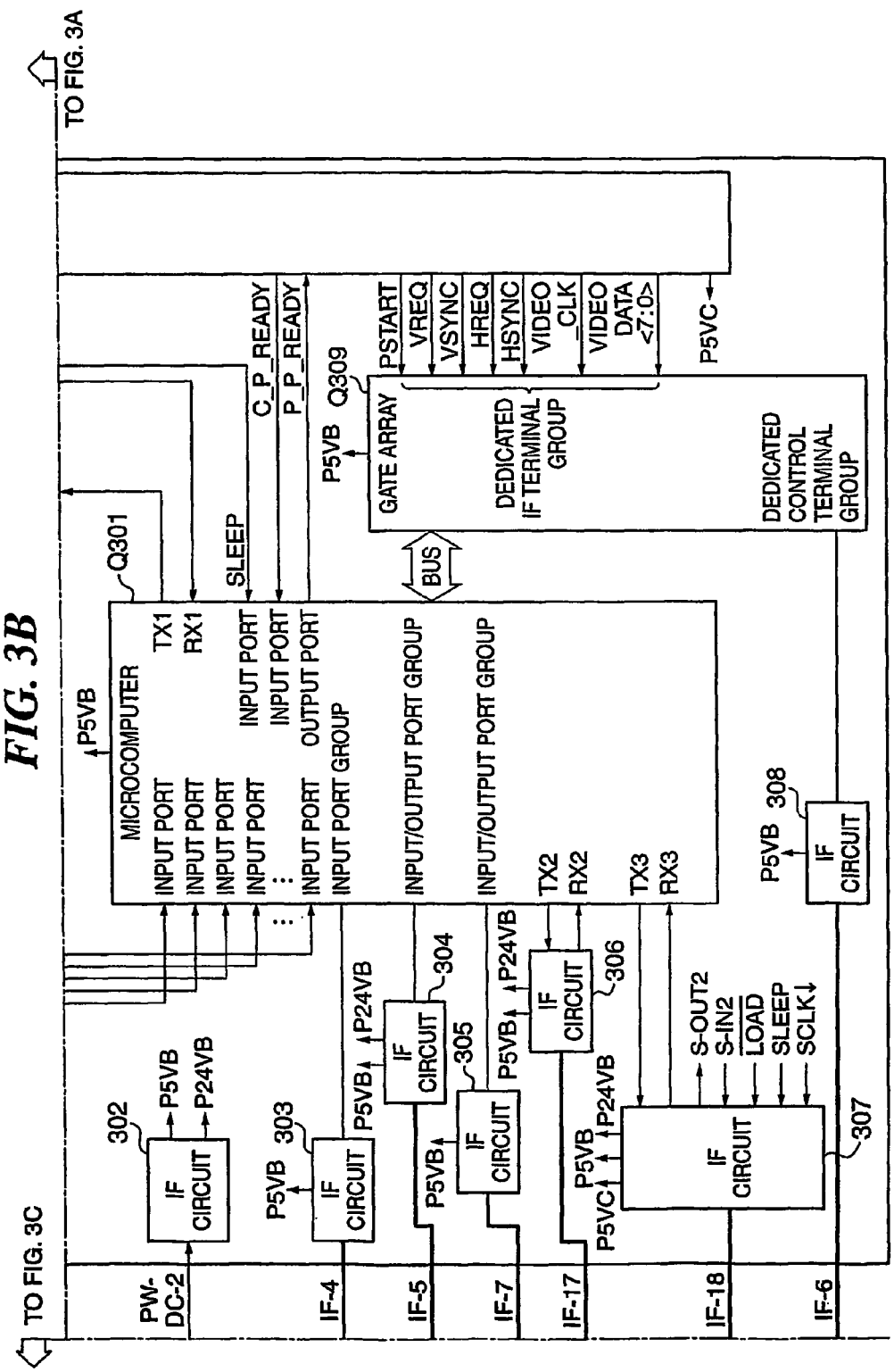

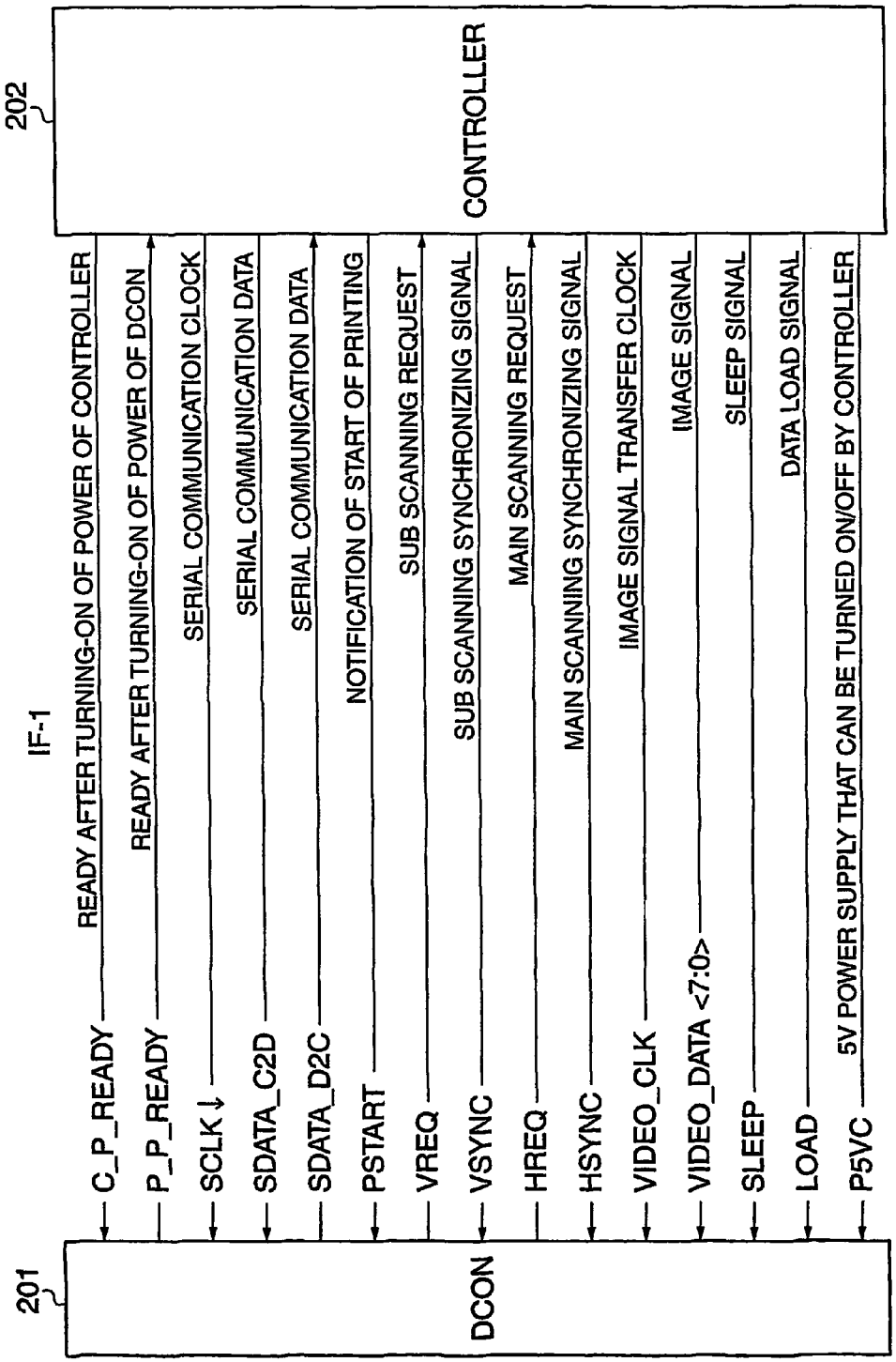

TO FIG.6B

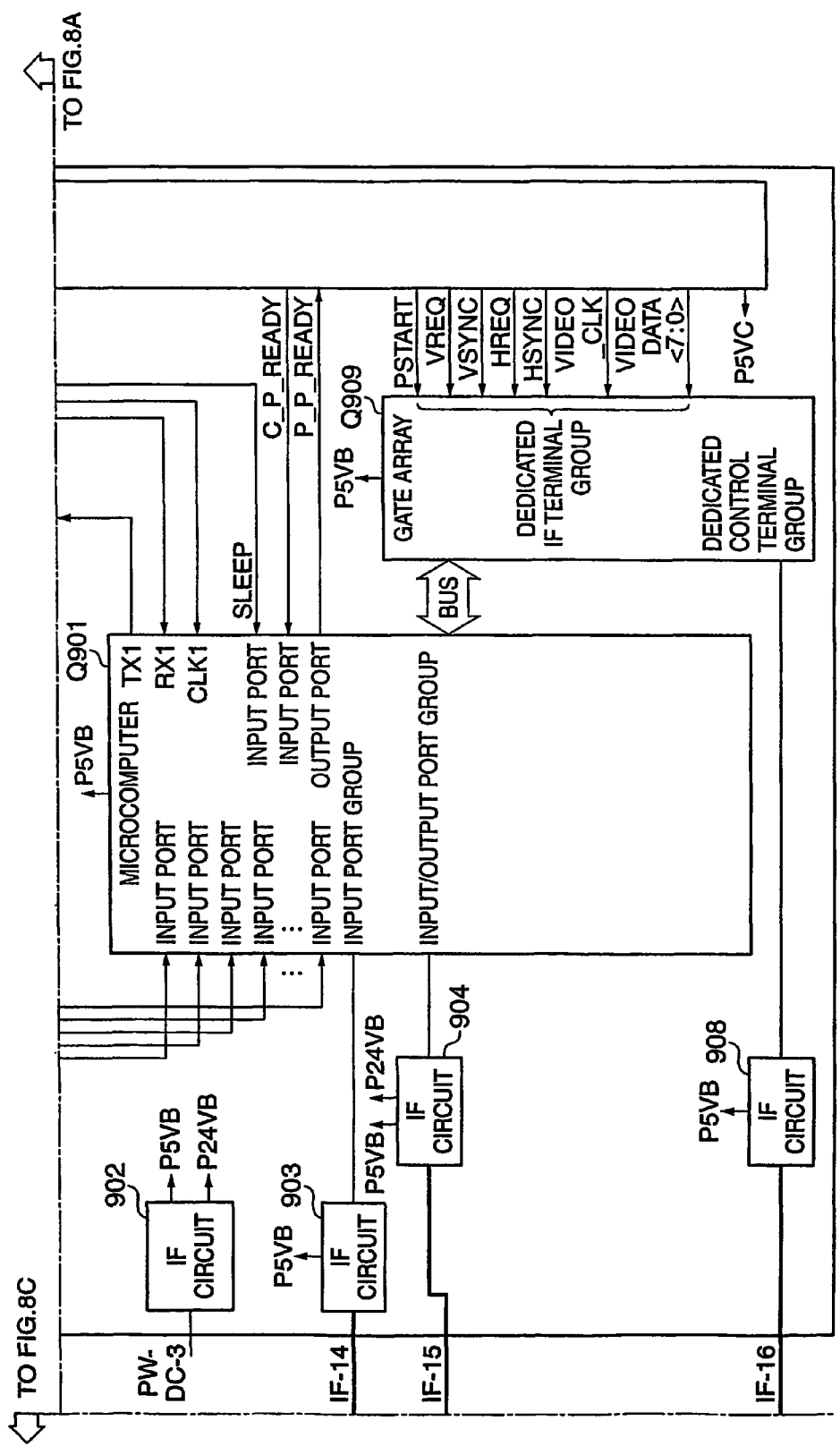

FIG. 23

STORAGE MEDIUM (FD, CD-ROM, etc.)

| DIRECTORY INFORMATION |
|---|
| FIRST DATA PROCESSING PROGRAM PROGRAM CODE GROUP CORRESPONDING TO FLOWCHART IN FIG. 11 |
| SECOND DATA PROCESSING PROGRAM PROGRAM CODE GROUP CORRESPONDING TO FLOWCHART IN FIG. 12A,12B |
| THIRD DATA PROCESSING PROGRAM PROGRAM CODE GROUP CORRESPONDING TO FLOWCHART IN FIGS. 13A,13B,14A,14B |
| FOURTH DATA PROCESSING PROGRAM PROGRAM CODE GROUP CORRESPONDING TO FLOWCHART IN FIGS. 17, 18 |
| FIFTH DATA DATA PROCESSING PROGRAM PROGRAM CODE GROUP CORRESPONDING TO FLOWCHART IN FIG. 19A,19B |
| SIXTH DATA PROCESSING PROGRAM PROGRAM CODE GROUP CORRESPONDING TO FLOWCHART IN FIGS. 20A TO 22 | ial standby state, a control method for the image forming
IMAGE FORMING APPARATUS HAVING ENERGY-SAVING MODE, CONTROL METHOD THEREFOR, NETWORK SYSTEM INCLUDING THE IMAGE FORMING APPARATUS, AND CONTROL METHOD THEREFOR

TECHNICAL FIELD

The present invention relates to an image forming apparatus having a reduced power consumption mode in which power consumption is maintained at a lower level than in a normal standby state, a control method for the image forming apparatus, a network system including the image forming apparatus, and a control method for the network system.

BACKGROUND ART

Conventionally, there exists a system in which image forming apparatuses, such as printers, copying machines, and multifunction machines, and computers are interconnected through a network.

FIG. 24 is a block diagram showing an example of the configuration of a conventional network system including conventional image forming apparatuses, which is used by a plurality of users under a network environment, for example.

In FIG. 24, the network system is comprised of a plurality of personal computers PC 1103a, PC 1103b, copying machines 1101a, 1101b, and a server 1102, which are interconnected through a network. The copying machines (both of the copying machines 1101a, 1101b) are each comprised of a printer section 1201, a reader section 1216, a controller section 1202, and a DC power supply 1203. The controller section 1202 controls exchange of information with external devices, the ON/OFF of the DC power supply 1203, and the operations of the reader section 1216 and the printer section 1201.

When a copying operation or a printing operation has not been carried out for a predetermined time period, the copying machine 1101a (1101b) shifts into a sleep mode (an energy saving mode, a reduced power consumption mode) so as to save energy (electric power consumption).

Further, by installing an application software program for managing the network in the PC 1103a (1103b), it is possible to know the status of the copying machine 1101a (1101b) connected to the network. For example, when the copying machine has run out of paper, this software program enables the PC to display the status of the copying machine thereon. Even if the copying machine 1101a or 1101b is in the sleep state, when a print request is transmitted from the PC 1103a or 1103b connected to the network, the controller section 1202 within the copying machine having received the print request detects the print request and starts the DC power supply 1203 to energize the entire copying machine to execute print output.

However, the above described network system according to the prior art suffers from the following problem:

When an image forming apparatus, e.g. a copying machine, connected to the network is in the sleep state, and receives from a PC an inquiry about the latest status of the copying machine whose status is updated as occasion demands, the controller section 1202 activates the DC power supply 1203 to supply electric power to all engines of the copying machine, and then communicates with the reader section 1216 and the printer section 1201 so as to detect the inquired status, whereafter the result of the detection is transmitted to the PC via the network.

Therefore, even though the copying machine is in the sleep state where energy conservation is being achieved, it is necessary to supply electric power to the entire copying machine whenever the status of the copying machine is inquired, or alternatively, the copying machine needs to constantly hold all the engines in energized states without shifting to the sleep mode, which is contradictory to the recent trend toward energy conservation.

DISCLOSURE OF INVENTION

It is a first object of the present invention to provide an image forming apparatus which has a reduced power consumption mode (sleep state) and a control method of controlling the image forming apparatus, and a network system including the image forming apparatus and a control method of controlling the network system, which are capable of eliminating the inconveniences of the conventional method of controlling a network system.

It is a second object of the present invention to provide an image forming apparatus which has a reduced power consumption mode (sleep state), and a control method of controlling the image forming apparatus, and a network system including the image forming apparatus and a control method of controlling the network system, which are capable of causing a server apparatus to respond to a status request, on behalf of the image forming apparatus, even when the status request is received when the image forming apparatus is in the sleep state, to thereby prevent the status request from causing an impediment to reduced power consumption.

It is a third object of the present invention to provide a control method of controlling a server apparatus connected via a network to an image forming apparatus which has a low power consumption mode (sleep state), which is capable of causing a server apparatus to respond to a status request, on behalf of the image forming apparatus, even when the status request is received when the image forming apparatus is in the sleep state, to thereby prevent the status request from causing an impediment to reduced power consumption.

To attain the above first and second objects, in a first aspect of the present invention, there is provided a control method of controlling a network system including at least one image forming apparatus having a normal standby mode, and a reduced power consumption mode in which less electric power is consumed than in the normal standby mode, at least one information processing apparatus, a server apparatus, connected to each other via a network, the control method comprising an agency request command-transmitting step of causing the image forming apparatus to transmit to the server apparatus an agency request command for requesting the server apparatus to respond to a status request, on behalf of the image forming apparatus, when the image forming apparatus shifts to the reduced power consumption mode, a first status transmitting step of causing the image forming apparatus to transmit a latest status of the image forming apparatus to the server apparatus when the image forming apparatus shifts to the reduced power consumption mode, a second status transmitting step of causing the image forming apparatus to transmit a changed status of the image forming apparatus to the server apparatus when there is a change in the status of the image forming apparatus in the reduced power consumption mode, a status request-receiving step of causing the server apparatus to receive a status request sent from the information processing apparatus to the image forming apparatus, on behalf of the image forming apparatus, and a status request-responding step of causing the server apparatus to respond to the information processing apparatus in response to the status request, based on the status received beforehand from the image forming apparatus, wherein the second changed status transmitting step comprises a temporary returning step of causing the image forming apparatus to temporarily return from the reduced power consumption mode to the normal standby mode when there is a change in the status of the image forming apparatus in the reduced power consumption mode, a status updating step of causing the image forming apparatus to transmit an updated status of the image forming apparatus to the server apparatus, and a reduced power consumption mode re-shifting step of causing the image forming apparatus to again shift to the reduced power consumption mode after the updated status of the image forming apparatus is transmitted to the server apparatus.

With the arrangement described above, it is possible to eliminate the inconveniences of the prior art, and at the same time cause the image forming apparatus to respond to a status request, with the minimum possible consumption of electric power, even when the status request is received when the image forming apparatus is in the sleep state (low power consumption mode), to thereby attain energy conservation.

Preferably, the control method further comprises a return command-transmitting step of causing the server apparatus to transmit a command for causing the image forming apparatus to return from the reduced power consumption mode to the normal standby mode, when the server apparatus has received a job execution request from the information processing apparatus.

To attain the above first and second objects, in a second aspect of the present invention, there is provided a network system including at least one image forming apparatus having a normal standby mode, and a reduced power consumption mode in which less electric power is consumed than in the normal standby mode, at least one information processing apparatus, and a server apparatus, connected to each other via a network, wherein the image forming apparatus transmits to the server apparatus an agency request command for requesting the server apparatus to respond to a status request, on behalf of the image forming apparatus, and a latest status of the image forming apparatus, when the image forming apparatus shifts to the reduced power consumption mode, the server apparatus receives the status request sent from the information processing apparatus to the image forming apparatus, on behalf of the image forming apparatus, and responds to the information processing apparatus in response to the status request, based on the status received beforehand from the image forming apparatus, and the image forming apparatus temporarily returns to the normal standby mode when the image forming apparatus has detected a change in the status thereof in the reduced power consumption mode, and after transmitting the changed status to the server apparatus, the image forming apparatus again shifts to the reduced power consumption mode.

With the arrangement of the second aspect of the present invention, the same advantageous effects as provided by the first aspect of the present invention can be obtained.

To attain the above first and second objects, in a third aspect of the present invention, there is provided an image forming apparatus image connected to a server apparatus via a network, and having a normal standby mode, and a reduced power consumption mode in which less electric power is consumed than in the normal standby mode, comprising a detecting device that detects a status of the image forming apparatus, a communication device that communicates with the server apparatus, and a control device that causes the communication device to transmit to the server apparatus an agency request command for requesting the server apparatus to respond to a status request, on behalf of the image forming apparatus, and a latest status of the image forming apparatus assumed, when the image forming apparatus shifts to the reduced power consumption mode, wherein the control device is responsive to detection of a change in the status of the image forming apparatus by the detecting device in the reduced power consumption mode, for causing the image forming apparatus to temporarily return to the normal standby mode, and after causing the communication device to transmit the changed status of the image forming apparatus to the server apparatus, causing the image forming apparatus to again shift to the reduced power consumption mode.

With the arrangement of the third aspect of the present invention, the same advantageous effects as provided by the first aspect of the present invention can be obtained.

To attain the above first and second objects, in a fourth aspect of the present invention, there is provided a control method of controlling an image forming apparatus connected to a server apparatus via a network, and having a normal standby mode, and a reduced power consumption mode in which less electric power is consumed than in the normal standby mode, the control method comprising a detecting step of detecting a status of the image forming apparatus, an agency requesting step of transmitting to the server apparatus an agency request command for requesting the server apparatus to respond to a status request, on behalf of the image forming apparatus, when the image forming apparatus shifts to the reduced power consumption mode, a status transmitting step of transmitting a latest status of the image forming apparatus detected in the detecting step, a status updating step of transmitting a changed status of the image forming apparatus to the server apparatus when a change in the status of the image forming apparatus is detected in the reduced power consumption mode in the detecting step, and a mode changing step of causing the image forming apparatus to temporarily return to the normal standby mode when a change in the status of the image forming apparatus is detected in the reduced power consumption mode, transmit the changed status of the image forming apparatus to the server apparatus, and then again shift to the reduced power consumption mode.

With the arrangement of the fourth aspect of the present invention, the same advantageous effects as provided by the first aspect of the present invention can be obtained.

To attain the above third object, in a fifth aspect of the present invention, there is provided a control method of controlling a server apparatus connected via a network to an image forming apparatus having a normal standby mode, and a reduced power consumption mode in which less electric power is consumed than in the normal standby mode, comprising an agency request-receiving step of receiving a request command sent from the image forming apparatus, for requesting the server apparatus to receive a status request sent from an information processing apparatus connected to the network, to the image forming apparatus, on behalf of the image forming apparatus, a status receiving step of receiving and holding a status of the image forming apparatus from the image forming apparatus, a status request-accepting step of accepting the status request from the image forming apparatus, on behalf of the image forming apparatus, a status responding step of responding to the information processing apparatus in response to the status request, based on the status received beforehand from the image forming apparatus, and a status updating step of updating the held status when the status is received from the image forming apparatus while the server apparatus is capable of accepting the status request on behalf of the image forming apparatus.

With the arrangement of the fifth aspect of the present invention, the same advantageous effects as provided by the first aspect of the present invention can be obtained.

Preferably, the control method further comprises a start request command-transmitting step of transmitting to the image forming apparatus a command for requesting the image forming apparatus to return from the reduced power consumption mode to the normal standby mode, when the server apparatus has received a command which cannot be executed without causing the image forming apparatus to return from the reduced power consumption mode to the normal standby mode.

Preferably, the control method further comprises a retransmission requesting step of transmitting to the information processing apparatus a command retransmission request for requesting the information processing apparatus to again transmit the status request, when the server apparatus has received information indicating that the image forming apparatus has returned from the reduced power consumption mode to the normal standby mode.

BRIEF DESCRIPTION OF DRAWINGS

FIG. 3A to FIG. 3C are block diagram showing the arrangement of a printer section (DCON) 201 and its related parts appearing in FIG. 2A and FIG. 2B;

FIG. 4 is a diagram useful in explaining interface operations between a controller 202 and a DCON 201 appearing in FIG. 2A and FIG. 2B;

FIG. 8A to FIG. 8C are block diagram showing the arrangement of a RCON 216 and its related parts appearing in FIG. 2A and FIG. 2B;

FIG. 23 is a diagram showing a memory map of a storage medium storing various data processing programs.

BEST MODE FOR CARRYING OUT THE INVENTION

The present invention will now be described in detail with reference to the accompanying drawings showing preferred embodiments thereof.

Figure 1:
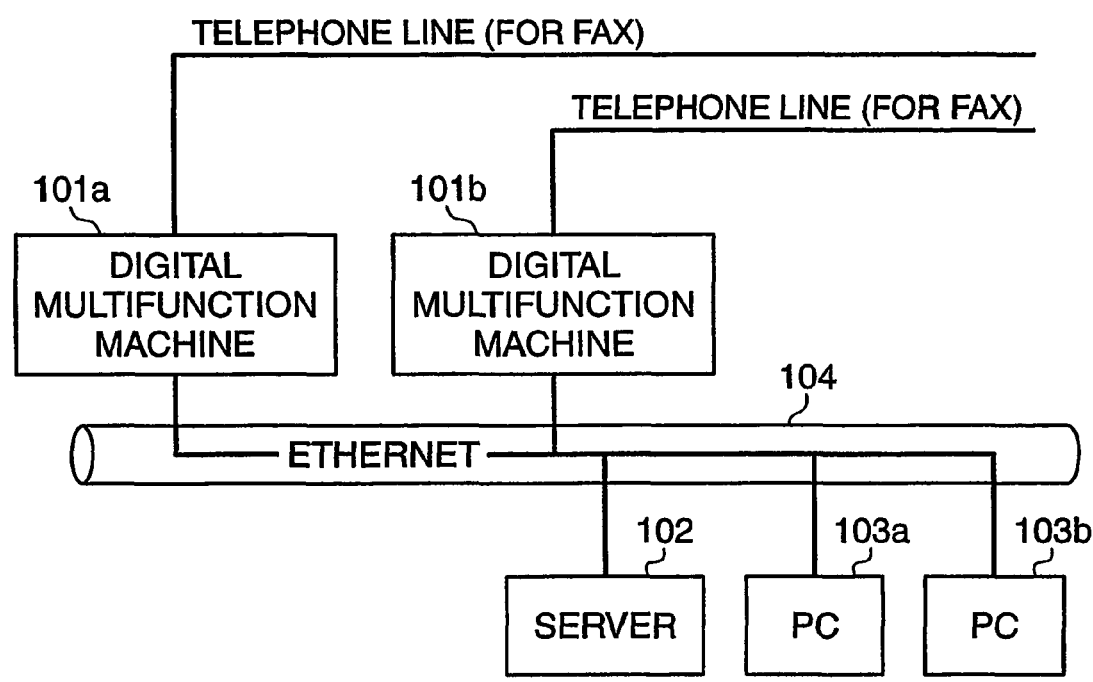
FIG. 1 is a block diagram showing an example of the configuration of a network system to which is applied a method of controlling a network system, according to a first embodiment of the present invention.

FIG. 1 is a block diagram showing an example of the configuration of a network system to which to which is applied a method of controlling a network system, according to a first embodiment of the present invention. Needless to say, the image forming apparatuses to which is applied the method according to the present invention include printing apparatuses (printers) using the electrophotographic printing method, the ink jet printing method, and other printing methods, facsimile machines or digital multifunction machines for performing multiple function image forming processing, including print processing and facsimile processing. Hereinafter, a description will be given of digital multifunction machines by way of example.

In FIG. 1, reference numerals 101a and 101b designate digital multifunction machines, each of which is operated by electric power supplied to a printer section (DCON) 201, a reader section (RCON) 216, and a controller 202 thereof, from a DC power supply 203, as described in detail hereinafter.

Reference numeral 102 designates a server, and reference numerals 103a and 103b designate personal computers (PC's). The digital multifunction machines 101a, 101b are connected to the server 102 and the PC's 103a, 103b via an Ethernet (registered trademark) 104 as a local area network. The digital multifunction machines 101a, 101b are capable of receiving print jobs from the PC's 103a, 103b, and outputting status information in response to inquiries about their statuses from the PC 103a and the PC 103b.

The term "status" used here is intended to mean a current queue of print jobs and a current job-processing state, settings as to sizes of sheet cassettes set in the machine, the presence of sheets in the sheet cassettes, the state of connection of optional equipment, the presence of toner, and so forth. Further, each digital multifunction machine is equipped with a facsimile function, and is connected to external devices for communication therewith via a predetermined communication line (e.g. a telephone line).

A brief description will be given of a copying mechanism provided in each of the digital multifunction machines. An image of an original (hereinafter referred to as "an original image") is read and converted into digital data, using a photoelectric conversion device, such as a CDD or a contact sensor, whereby reading of the original is performed. Then, a laser beam is modulated based on the read digital data to thereby form a latent image on a photosensitive member charged to a high potential, whereafter the latent image is developed by toner as a developer into a tone image (visible image), which is transferred onto a transfer sheet.

Further, the digital multifunction machine 101a (101b) as image forming apparatuses to which is applied the control method according to the present invention has two suspend modes, i.e. a standby mode and a sleep mode, in which none of copying, printing, facsimile transmission, facsimile reception, and scanning are performed.

In the standby mode, the above mentioned operations can be started immediately, while in the sleep mode, the operations cannot be started immediately, but less electric power is consumed than in the standby mode.

Figure 2A:
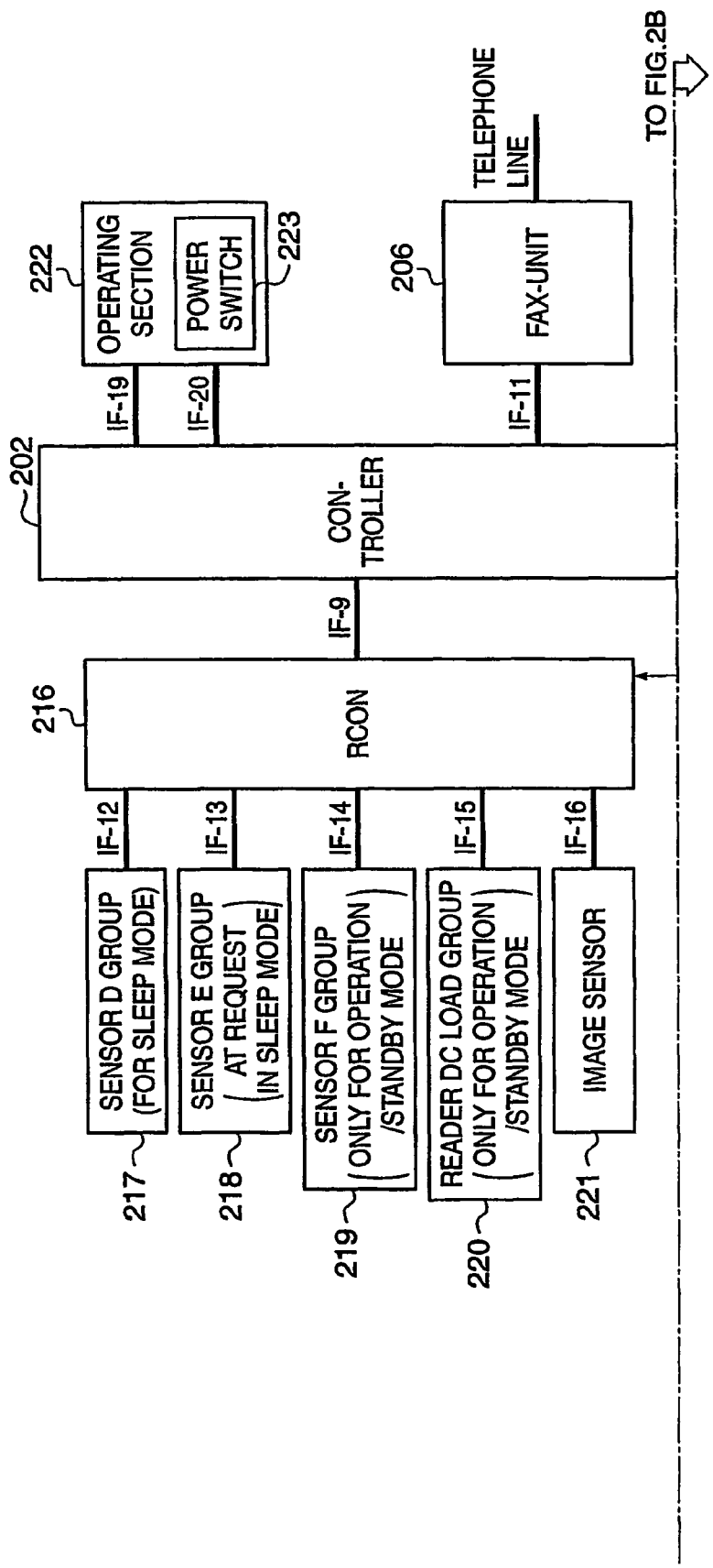
FIG. 2A and FIG. 2B are block diagram showing the arrangement of each of digital multifunction machines appearing in FIG. 1.
Figure 2B:
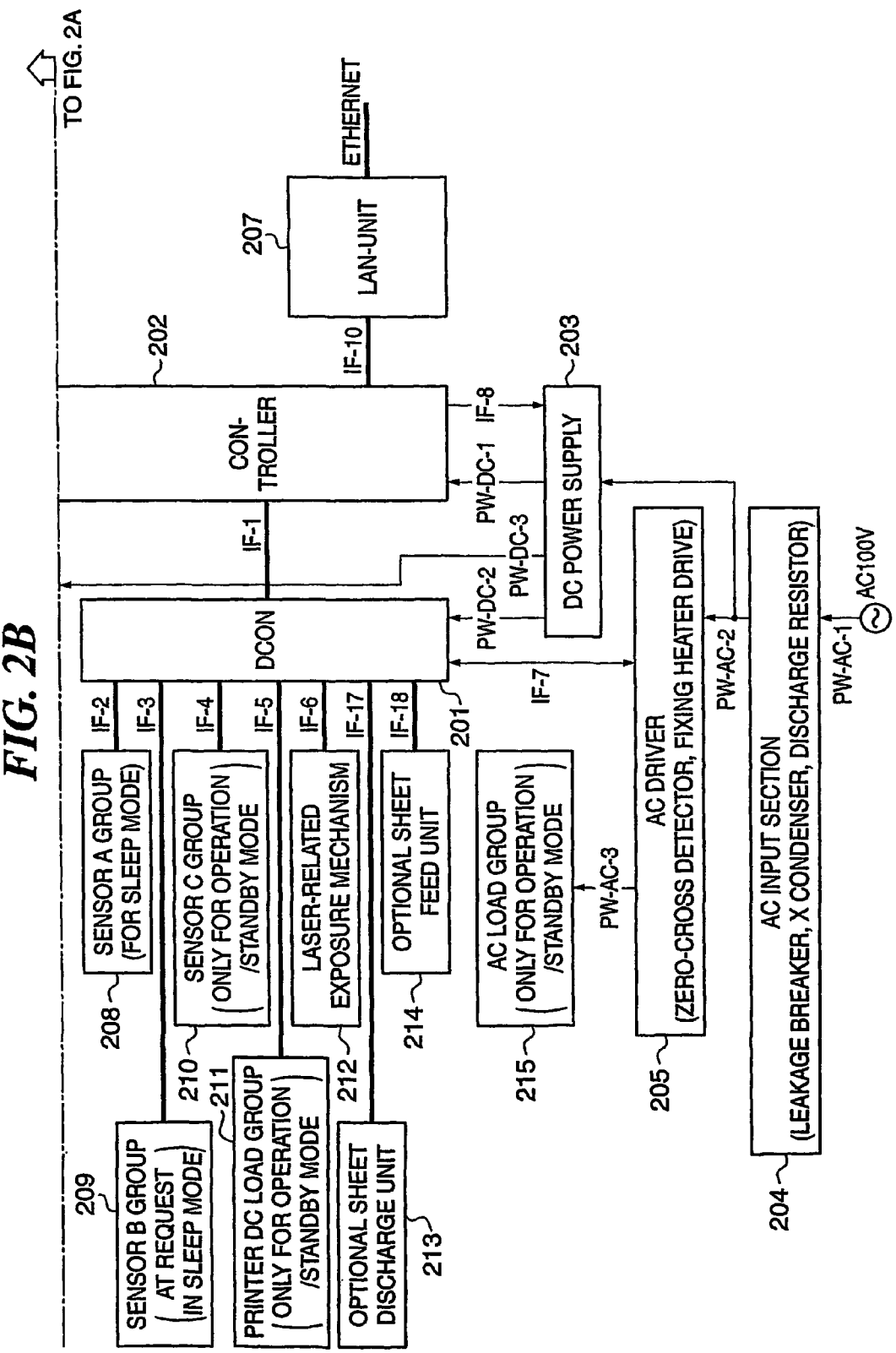

FIG. 2A and FIG. 2B are block diagram showing the arrangement of the digital machine 101a (101b) appearing in FIG. 1.

In FIG. 2A and FIG. 2B, the DCON 201 provides printing control for receiving video data from the controller 202, described in detail hereinafter, via an interface IF-1 and printing the same. The DCON 201 is connected to sensor groups 208, 209, 210 necessary for various printing control operations, via respective interfaces IF-2, IF-3, IF-4, to a printer DC load group 211 for performing printing, via an interface IF-5, and to a laser-related exposure mechanism 212 for exposing a photosensitive member to light, via an interface IF-6, for control of the groups and the mechanism.

Further, the DCON 201 is connected to an optional sheet discharge unit 213 for sorting sheets, via an interface IF-17, and to an optional sheet feed unit 214 added to increase the number of sheet feed cassettes, via an interface IF-18, for control of the optional units 213, 214 by serial communication of various kinds of information therewith.

Sensors connected to the DCON 201 are divided into the following three groups:

A first group is the sensor A group 208 that performs periodical detection in any of copying/printing/standby/sleep modes; a second group is the sensor B group 209 that performs more detailed detection (of a change in the status of the image forming apparatus detected by the sensor A group) according to results of the detection by the sensor A group 208 in any of the copying/printing/standby/sleep modes; and a third group is the sensor C group 210 that performs detecting operation only in the copying/printing/standby modes, but performs no detecting operation in the sleep mode.

Further, the DCOM 201 is connected to an AC driver 205, referred to hereinafter, via an interface IF-7, for control of an AC load group 215 connected to the AC driver 205. The AC load group 215 includes a heater, not shown, for heating and melting toner to thereby fix the toner on a sheet. Power supply to the DCON 201 includes power supplied only during operation and in the standby mode, and power supplied in the sleep mode as well.

The AC driver 205 is responsive to ON/OFF signals received from the DCON 201 via the interface IF-7, for switching between supply and cutoff of AC current of 100 V to the AC load group 215 through a line PW-AC-3, using a switching element, such as a TRIAC or an SSR.

The RCON 216 is controls scanner-related devices. The RCON 216 is connected to an image sensor 221 for reading an image, via an interface IF-16, to sensor groups 217, 218, 219 for control of feeding of an original and the like, via respective interfaces IF-12, IF-13, IF-14, and to a reader DC load group 220 via an interface IF-15, to thereby control these scanner-related devices.

Sensors connected to the RCON 216 are also divided into the following three groups:

A first group is the sensor D group 217 that performs periodical detection in any of the copying/printing/standby/sleep modes; a second group is the sensor E group 218 that performs more detailed detection when the result of detection by the sensor D group 217 changes in any of the copying/printing/standby/sleep modes; and a third group is the sensor F group 219 that performs detection only in the copying/printing/standby modes, but performs no detection in the sleep mode.

The image sensor 221 converts image data into an electric signal, and converts the electric signal into a predetermined format, and then transfers the resulting video data to the controller 202 via the interface IF-16 and an interface IF-9.

The controller 202 is connected to the DCON 201 via the interface IF-1 and to the RCON 216 via the interface IF-9. During copying operation, these connections allow transfer of video data representative of an original image from the RCON 216 to the controller 202 and transfer of the video data processed by the controller 202 from the controller 202 to the DCON 201. The controller 202 carries out processing including conversion of the format of the video data, processing of the video data, and adjustment of timing for transfer of the video data to the timing of operation of a printer. Further, the controller 202 is connected to an operating section 222 via an interface IF-19, which enables detection of inputs to be made via the operating section 222 and display of the inputs on the operating section 222.

Reference numeral 223 designates a power switch provided in the operating section 222. An operation of the power switch 223 triggers a shift of the machine to the sleep mode as well as return of the same from the sleep mode to the standby mode.

Further, the controller 202 is connected to the DC power supply 203 via an interface IF-8, for performing ON/OFF control of part of power outputs from the DC power supply 203, which pass through lines PW-DC-1, 2, and 3. The controller 202 is also connected to the telephone line via an interface IF-11 and a FAX-UNIT 206. Furthermore, the controller 202 is connected to the Ethernet via an interface IF-10 and a LAN-UNIT 207. Here, the LAN-UNIT 207 is not limitatively connected to the Ethernet, but it may be any suitable communication unit using a predetermined protocol. Needless to say, both of wireless connection and wired connection are applicable.

Reference numeral 204 designates an AC input section 204. The AC input section 204 is supplied with AC 100V power from a power receptacle via a line PW-AC-1, and supplies the power to the DC power supply 203 and the AC driver 205 via a line PW-AC-2, via its circuits including a circuit for detecting a leakage of current, a capacitor for eliminating noise, and a discharge resistor associated with the capacitor.

Figure 3A:
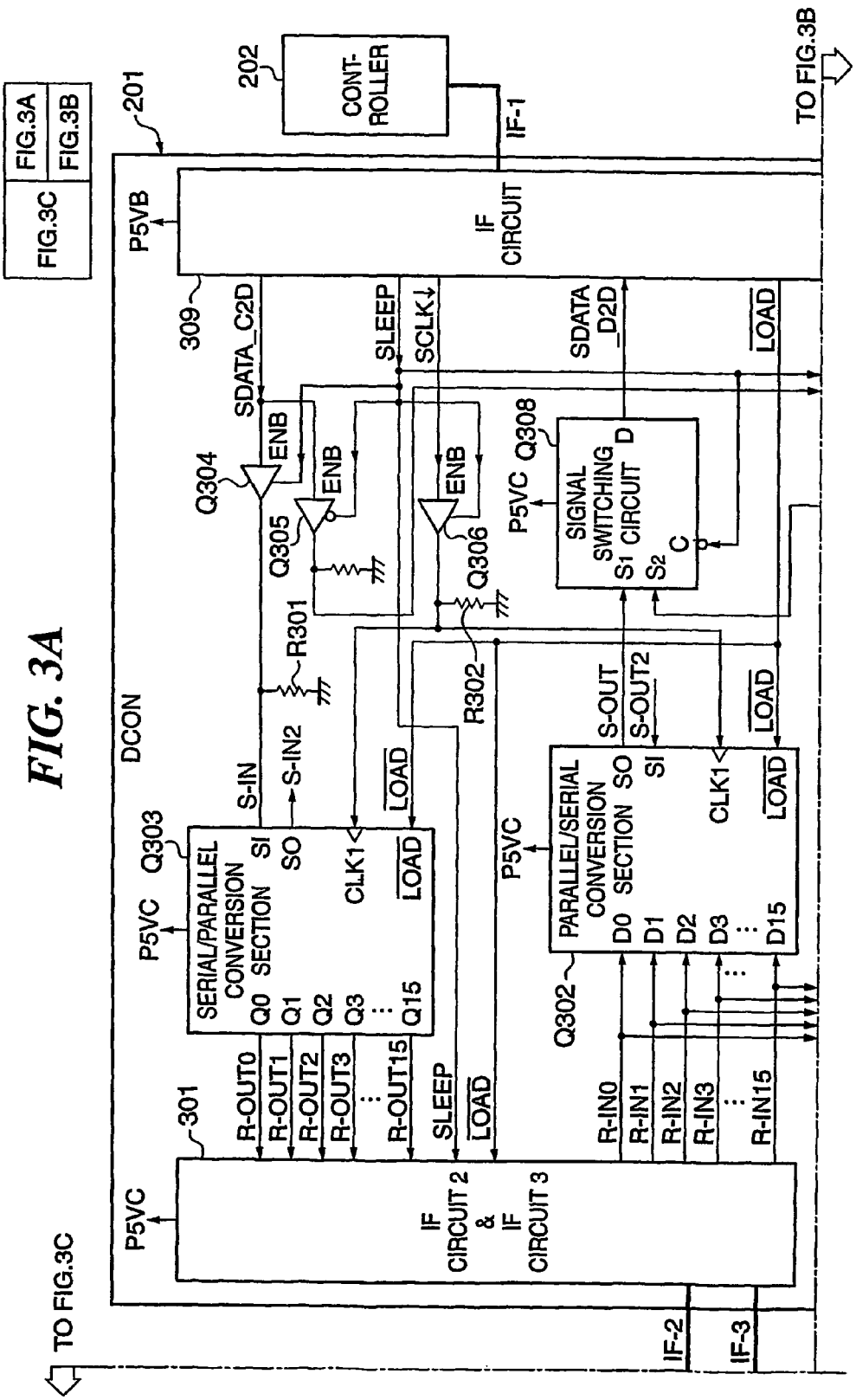
Figure 3C:
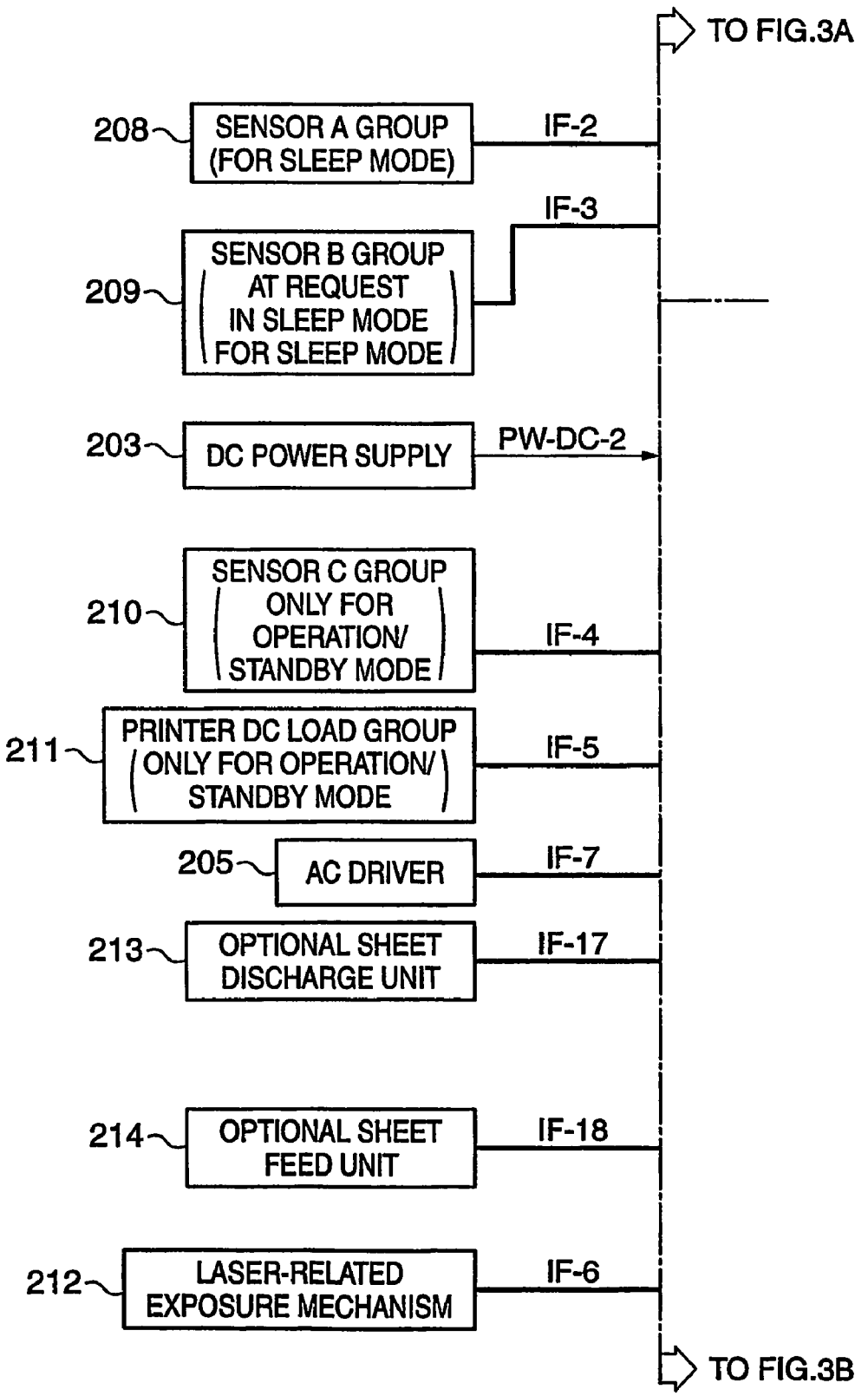

FIG. 3A to FIG. 3C are block diagram showing details of the arrangement of the DCON 201 and its related parts appearing in FIG. 2A and FIG. 2B. Component parts and elements corresponding to those in FIG. 2A and FIG. 2B are designated by identical reference numerals.

In FIG. 3A to FIG. 3C, P5VB and P5VC designate 5V power supplies, respectively. The power supply P5VB is supplied from the DC power supply 203 in the copying/printing/ standby modes. Reference numerals 301 to 309 designate interface circuits (IF circuits). The controller 202 turns on and off the power supply P5VB by controlling the DC power supply 203. The power supply P5VC is supplied from the controller 202 via the interface IF-1. The power supply P5VC is constantly ON in the copying/printing/standby modes, whereas in the sleep mode, it is ON only when needed.

The power supply P5VC is needed in the sleep mode when the controller 202 uses a parallel/serial conversion section Q302 and a serial/parallel conversion section Q303 to cause the sensor A group 208 and the sensor B group 209 to perform detection. The power supply P5VC is ON/OFF controlled by the controller 202.

Reference numeral Q301 designates a microcomputer. The microcomputer Q301 has at least a ROM and a RAM integrated therein, and operates according to programs written in the ROM. One of the roles of the microcomputer Q301 is to monitor the status. That is, the microcomputer Q301 detects signals, described in detail hereinafter, from the sensor A and B groups 208, 209 at input ports, and notifies the opening/ closing of a door, the open/closed states of cassettes, a sheet size, and the presence of sheets, as part of the status, to the controller 202 (to a main CPU or a sub CPU) via the interface IF-1, by serial communication.

Another role of the microcomputer Q301 is to control a printing operation, and the microcomputer Q301 detects the states of input ports connected to the sensor A, B and C groups 208, 209, 210, and provides ON/OFF control of the printer DC load group 211 and the AC driver 205 via respective output ports connected to the printer DC load group 211 and the AC driver 205, to thereby execute sheet conveyance control, high voltage control, fixing heater control, and so forth.

Reference numeral Q309 designates a gate array. The gate array Q309 receives video data via the interface IF-1, and controls the exposure mechanism 212 via an IF circuit 308 and the interface IF-6 based on the video data, such that a photosensitive member is exposed to a laser beam, to thereby form a latent image on the photosensitive member. Further, the microcomputer Q301 writes setting values in the gate array Q309, according to which the gate array Q309 operates, via a bus.

Serial communication signals transmitted via the interface IF-1 include a serial data signal SDATA_C2D delivered from the controller 202 to the DCON 201, a serial data signal SDATA_D2C delivered from the DCON 201 to the controller 202, and a serial data transfer clock signal SCLK. Out of these signals, the signal SDATA_C2D and the signal SDATA_D2C are connected to a serial communication terminal of the microcomputer Q301 by signal switching circuits Q304, Q305, Q306, Q308 for switching the connection destinations of the signals depending on the state of a SLEEP signal. The SLEEP signal in the other modes than the sleep mode is low.

In communication in the modes except the sleep mode, various kinds of information including commands and the status can be exchanged. The transfer clock signal SCLK is not supplied to the microcomputer Q301, and hence asynchronous communication requiring no transfer clock is performed between the microcomputer Q301 and the controller 202.

Next, in the sleep mode, the SLEEP signal goes high. The signals SDATA_D2C, SDATA_C2D, SCLK are selectively connected to the serial/parallel conversion section Q303 and the parallel/serial conversion section Q302 via the signal switching circuits Q304, Q305, Q306, Q308. The sleep mode does not allow exchange of so many kinds of information as the other modes. In the sleep mode, the serial communication between the controller 202 and the DCON 201 is performed specifically for communication of the status. As described above, it is possible to change the destination of communication of the status and other information, in dependence on whether or not the machine is in the sleep mode (energy-saving mode).

A LOAD signal line is connected to the serial/parallel conversion section Q303. During loading, the serial/parallel conversion section Q303 loads data stored in an internal serial register thereof into respective buffers thereof directly connected to output terminals Q0 to Q15 thereof, whereas during non-loading, the serial/parallel conversion section Q303 holds data within the buffers.

Data from the serial register within the serial/parallel conversion section Q303 is outputted via an SO terminal thereof with the LSB (Least Significant Bit) first in synchronism with generation of the signal SCLK↓. Further, the MSB (Most Significant Bit) of a shift register of the serial/parallel conversion section Q303 stores data from an SI terminal of the serial/parallel conversion section Q303 in synchronism with the clock. In the sleep mode, the serial/parallel conversion section Q303 outputs the signal SDATA_D2C from the SO terminal thereof, for transmission to the controller 202. In the sleep mode, the SI terminal of the serial/parallel conversion section Q303 is cascaded to the optional sheet feed unit 214.

The parallel/serial conversion section Q302 has a LOAD signal line connected thereto. During loading, the parallel/ serial conversion section Q302 loads data received via input terminals D0 to D15 thereof into an internal serial register thereof. The parallel/serial conversion section Q302 outputs the data from the serial register thereof via an SO terminal thereof, with the LSB first in synchronism with the signal SCLK↓. Further, the parallel/serial conversion section Q302 stores data received via an SI terminal of the thereof in the MSB of a shift register thereof in synchronism with the clock. In the sleep mode, the parallel/serial conversion section Q302 receives the signal SDATA_C2D from the controller 202, via the SI terminal thereof. In the sleep mode, the SO terminal of the parallel/serial conversion section Q302 is cascaded to the optional sheet feed unit 214.

Figure 7:
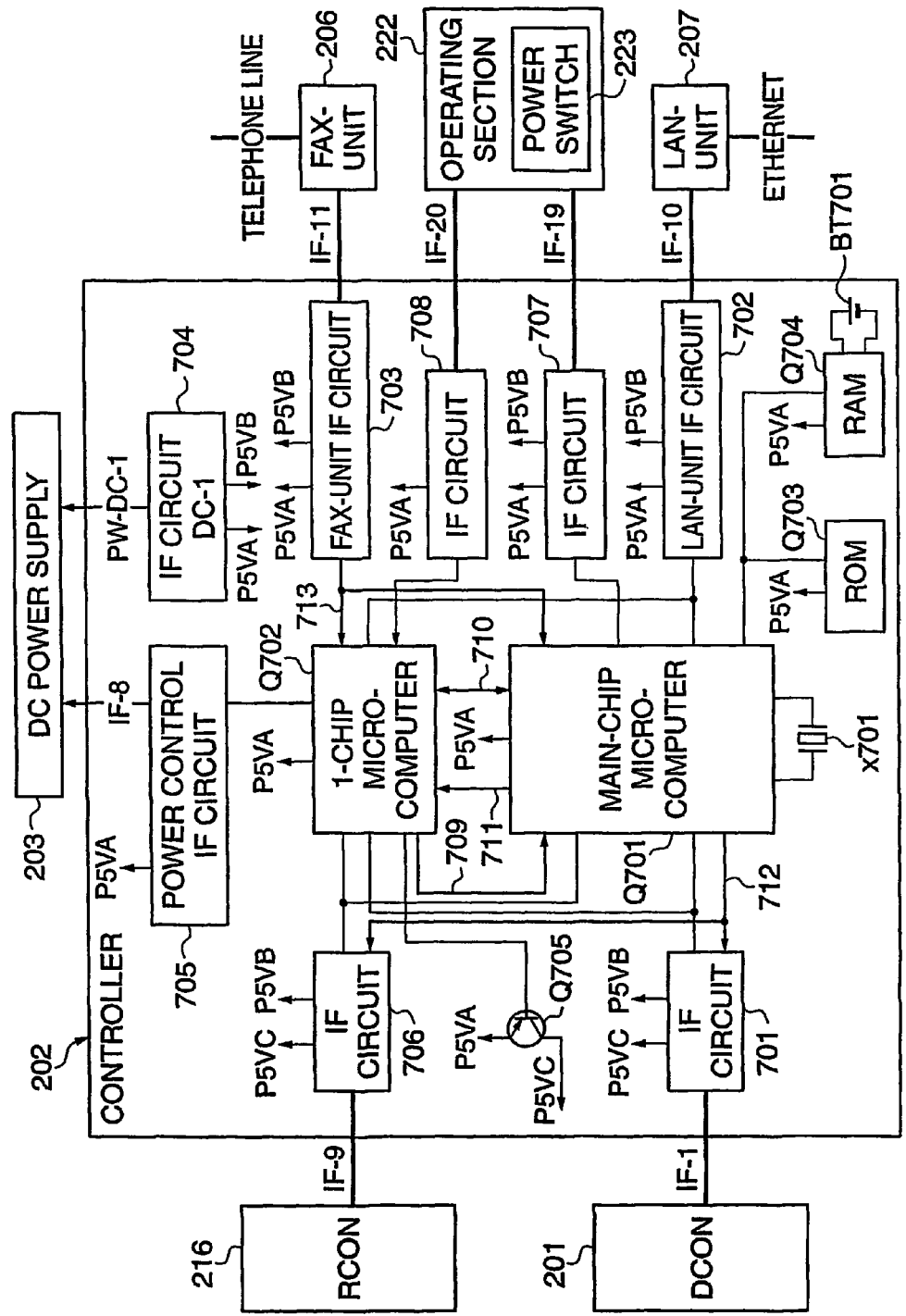
FIG. 7 is a block diagram showing the arrangement of the controller 202 and its related parts appearing in FIG. 2A and FIG. 2B.

According to the above arrangement of the DCON 201 shown in FIG. 3A to FIG. 3C, when the SLEEP signal from a main-chip microcomputer Q701, described in detail hereinafter with reference to FIG. 7, is high, the power supply P5VB to the microcomputer Q301 is cut off, to save the electric power to the microcomputer Q301, whereby energy conservation is achieved. Further, since the signal switching circuits Q304, Q305, Q306, Q308 are driven in place of the microcomputer Q301, it is possible to continue communication of information, such as the status, with the controller 202, while minimizing power consumption.

FIG. 4 is a diagram useful in explaining interface operations between the controller 202 and the DCON 201 in FIG. 2A and FIG. 2B.

In FIG. 4, symbol C_P_READY designates a signal that notifies the DCON 201 that the controller 202 is ready for communication. Symbol P_P_READY designates a signal that notifies the controller 202 that the DCON 201 is ready for communication.

Symbol SCLK↓ designates the clock signal for serial communication. Symbol SDATA_C2D designates the data signal delivered from the controller 202 to the DCON 201 for serial communication. Symbol SDATA_D2C designates the data signal delivered from the DCON 201 to the controller 202 for serial communication.

Symbol PSTART designates a signal by which the controller 202 notifies the DCON 201 that printing will be started. Symbol VREQ designates a signal by which the DCON 201 requests the controller 202 to start outputting of video data for sub scanning, in response to the PSTART signal. Symbol VSYNC designates a signal by which the controller 202 notifies the DCON 201 that outputting of data of valid main scanning lines will be started, after a predetermined number of main scanning lines, and this signal is delivered in response to the signal VREQ.

Symbol HREQ designates a signal by which the DCON 201 requests the controller 202 to start outputting of video data for main scanning. Symbol HSYNC is a signal by which the controller 202 notifies the DCON 201 that valid video data will be outputted after generation of a predetermined number of signals VIDEO_CLK for each main scanning. This signal is delivered in response to the signal HREQ. Symbol VIDEO_CLK designates a transfer clock signal of a signal VIDEO_DATA.

The signal VIDEO_DATA is an 8-bit video data signal. The SLEEP signal goes high in the sleep mode, and is outputted from the controller 202 to the DCON 201. The LOAD signal is for loading data of serial/parallel conversion and parallel/serial conversion, and also for controlling the supply of electric power to some of the sensors. Symbol P5VC designates 5V power supply to be supplied from the controller 202 to the DCON 201, which can be turned on and off.

Figure 5:
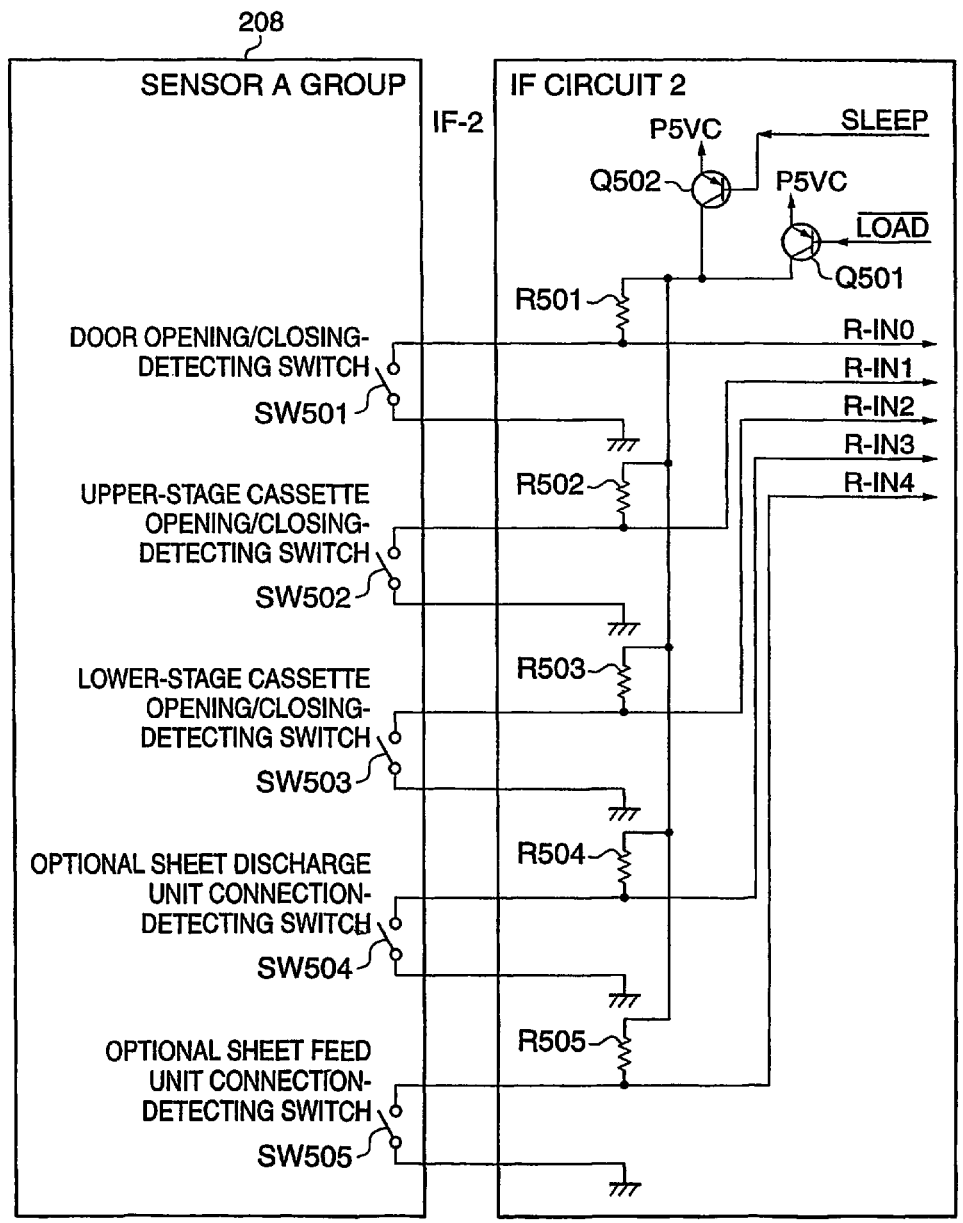
FIG. 5 is a circuit diagram showing the relationship between part of a sensor A group 208 appearing in FIG. 3A to FIG. 3C and part of an IF circuit 2 within an interface circuit 301 in FIG. 3A to FIG. 3C.

FIG. 5 is a circuit diagram showing the relationship between part of the sensor A group 208 appearing in FIG. 3A to FIG. 3C and part of the IF circuit 2 of the interface circuit 301 appearing in FIG. 3A to FIG. 3C.

The sensor A group 208 is a group of sensors formed by respective mechanical microswitches appearing in FIG. 3A to FIG. 3C. Component parts and signals identical to those in FIG. 3A to FIG. 3C are designated by identical reference numerals.

In FIG. 5, a door opening/closing-detecting switch SW501 detects opening/closing of a door that is opened by a user for access to process-related devices, including a fixing device, and a drum cartridge. An upper-stage cassette opening/closing-detecting switch SW502 detects opening/closing of an upper-stage cassette.

A lower-stage cassette opening/closing-detecting switch SW503 detects opening/closing of a lower-stage cassette. An optional sheet discharge unit connection-detecting switch SW504 detects connection of the optional sheet discharge unit 213. An optional sheet feed unit connection-detecting switch SW505 detects connection of the optional sheet feed unit 214. In FIG. 5, symbol P5VC designates the power supply appearing in FIG. 3A to FIG. 3C.

PNP transistors Q501 and Q502 perform ON/OFF control of power supplies to the switches SW501 to SW505.

Resistors R501, R502, R503, R504, R505 limit current values to be supplied to the switches SW501 to SW505.

Further, signals R-IN 0 to R-IN 4 detect the ON/OFF of the respective switches SW501 to SW505. The SLEEP signal and the LOAD signal are for controlling the supply of the power supply P5VC.

In the IF circuit 2 configured as above, when the PNP transistors Q501 and Q502 are in ON states, it is possible to detect the ON/OFF states of the switches SW501 to SW505.

When it is not necessary to detect the ON/OFF states of the switches SW501 to SW505, it is possible to cause the PNP transistors Q501 and Q502 to be turned off to cut off the supply of electric current to the switches SW501 to SW505, thereby suppressing energy consumption.

Figure 6A:
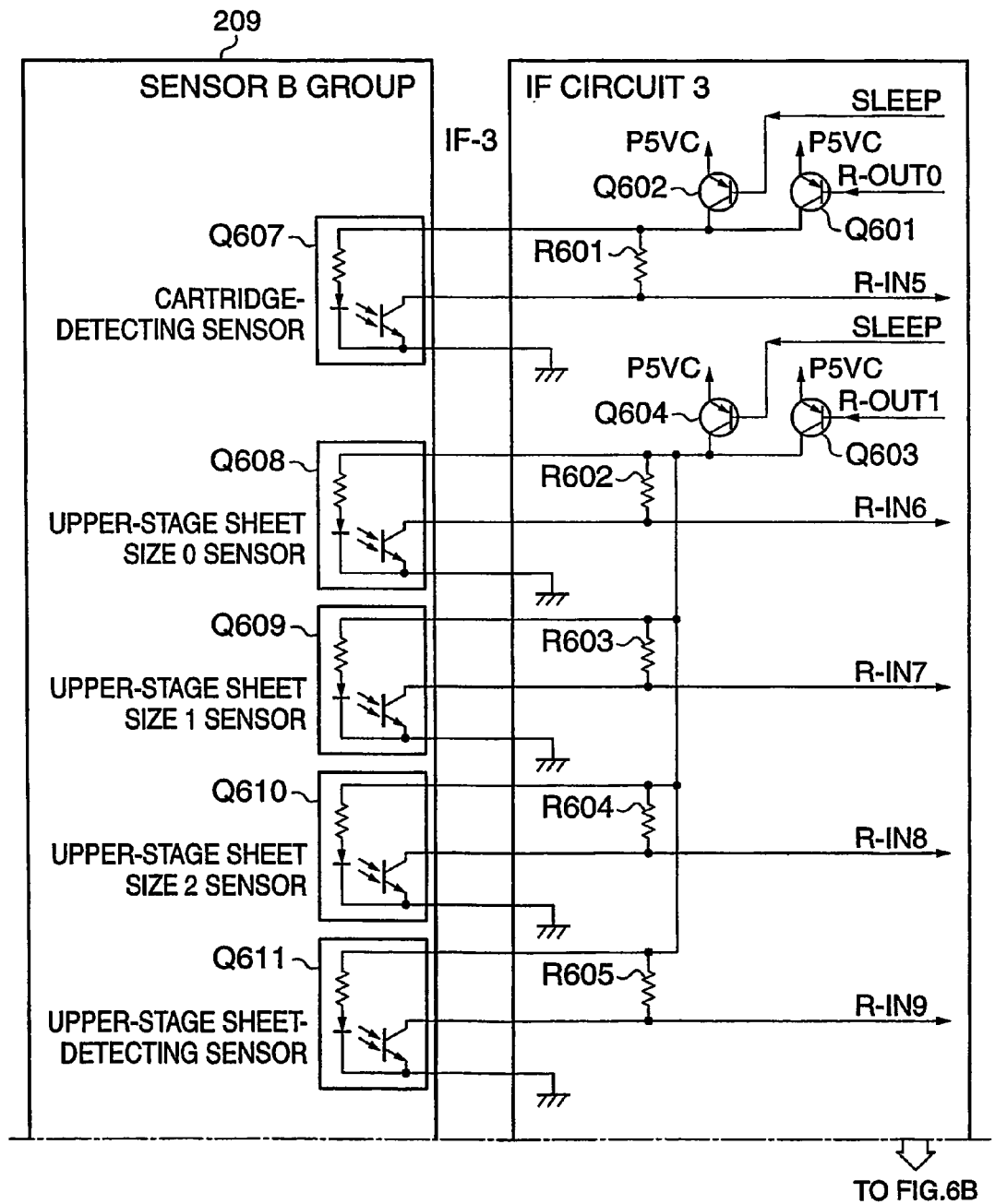
FIG. 6A and FIG. 6B are circuit diagram showing the relationship between part of a sensor B group 209 appearing in FIG. 2A and FIG. 2B and part of an IF circuit 3 within the interface circuit 301 in FIG. 3A to FIG. 3C.
Figure 6B:
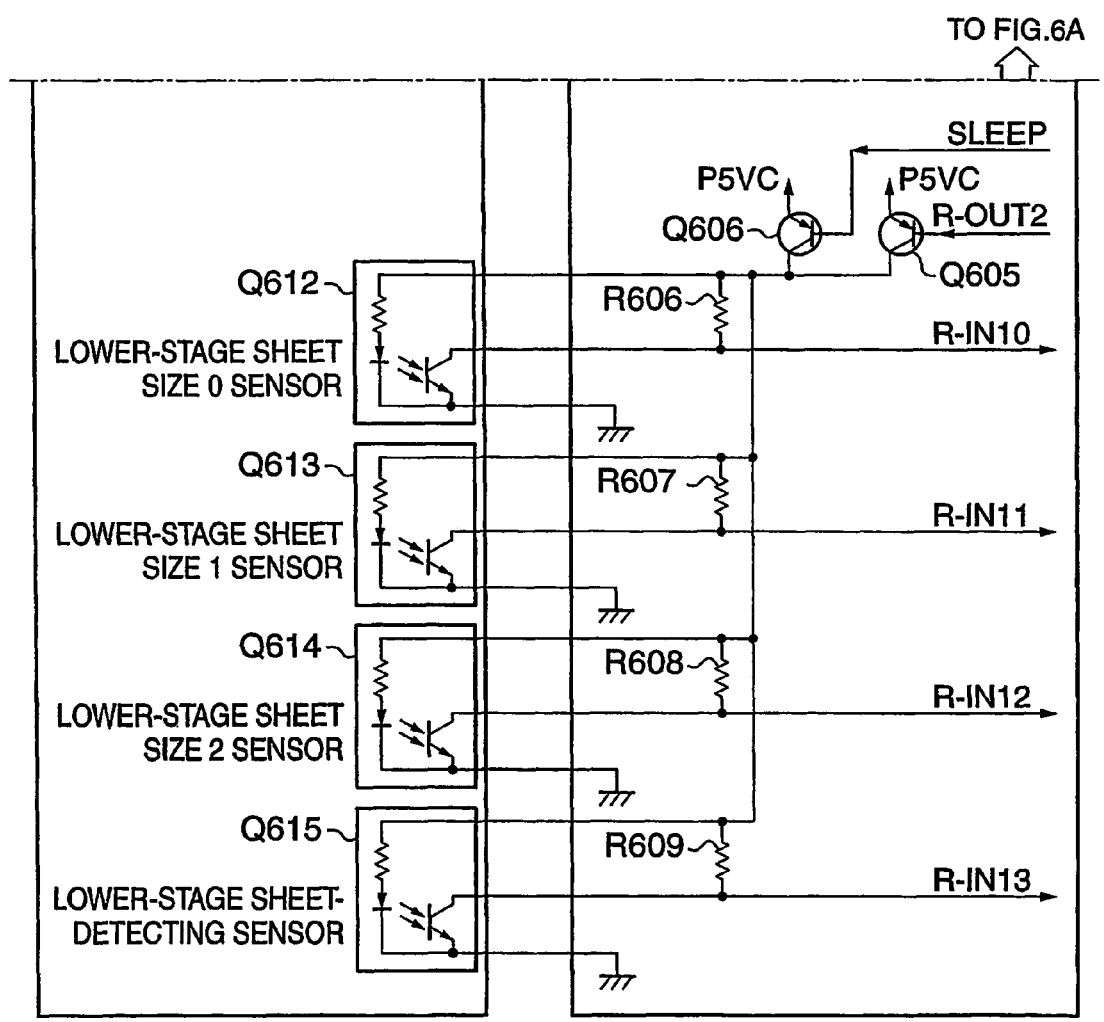

FIG. 6A and FIG. 6B are circuit diagram showing the relationship between part of the sensor B group 209 appearing in FIG. 2A and FIG. 2B and part of the IF circuit 3 of the interface circuit 301 appearing in FIG. 3A to FIG. 3C. It should be noted that the sensor B group 209 is photo-interrupter sensors appearing in FIG. 3A to FIG. 3C.

In FIG. 6A and FIG. 6B, a cartridge-detecting sensor Q607 detects the presence of a cartridge. An upper-stage sheet size 0 sensor Q608, an upper-stage sheet size 1 sensor Q609, and an upper-stage sheet size 2 sensor Q610 detect sheet sizes in the respective upper-stage cassettes, and an upper-stage sheet-detecting sensor Q611 detects the presence of sheets in the upper-stage cartridge.

A lower-stage sheet size 0 sensor Q612, a lower-stage sheet size 1 sensor Q613, and a lower-stage sheet size 2 sensor Q614 detect sheet sizes in the respective lower-stage cassettes, and a lower-stage sheet-detecting sensor Q615 detects the presence of sheets in the lower-stage cartridge.

The IF circuit 3 is the interface circuit, appearing in FIG. 3A to FIG. 3C, for interfacing with the sensor B group 209. Symbol P5VC designates the power supply appearing in FIG. 3A to FIG. 3C. Symbols SLEEP and R-OUT 0 to 2 designate the SLEEP signal and other input signals, appearing in FIG. 3A to FIG. 3C, which are inputted to the IF circuit 3. These signals control power supply to each of the photo-interrupter sensors. Symbols R-IN 5 to R-IN 13 designate output signals outputted from the IF circuit 3 according to the outputs of the respective sensors. Since power is supplied efficiently to the sensor B group 209 when necessary, as described above, it is possible to acquire sensor information efficiently as well as to achieve power conservation.

PNP transistors Q602, Q604, Q606 are ON/OFF controlled by the SLEEP signal for control of power supply to the photo-interrupter sensors. PNP transistors Q601, Q603, Q605 are ON/OFF controlled by the signals R-OUT 0, R-OUT 1, R-OUT 2 for control of power supply to the photo-interrupter sensors. Resistors R601 to R609 limit electric currents to be supplied to the respective photo-interrupter sensors.

With the arrangement described above, the ON or OFF state of power supply to the sensor B group 209 is selected depending on the state of data transmission, so that it is possible to cut off power supply to the photo-interrupter sensors when the power supply is unnecessary. This makes it possible to reduce power consumption in the sleep mode.

FIG. 7 is a block diagram showing details of the arrangement of the controller 202 and its related parts appearing in FIG. 2A and FIG. 2B.

In FIG. 7, reference numerals 701 to 708 designate interface circuits (IF circuits) each of which interfaces between a specific device and a 1-chip microcomputer Q702 or a main-chip microcomputer Q701.

Symbols P5VA, P5VB, P5VC designate 5V power supplies. The power supplies P5VA, P5VB are supplied from the DC power supply 203. The power supply P5VA is constantly supplied to drive the sub CPU, for example. On the other hand, the signal P5VB is supplied only during an image forming operation and in the standby mode. The power supply P5VC is controlled based on the power supply P5VA such that it is ON/OFF controlled by a transistor Q705 of the controller 202 so as to intermittently supply power to the DCON 201 and the RCON 216. Further, by saving the power supplies other than the power supply P5VA in the energy-saving (sleep) mode, it is possible to reduce unnecessary power consumption. In particular, the power supply P5VB stops the power circuit therein, which is greatly effective in reducing power consumption.

The power supplies P5VA, P5VB, P5VC are applied not only to the circuit shown in FIG. 7, but also to respective circuits shown in FIGS. 3, 4, 5, 6, 8, 9, 10, and the power supplies P5VA, P5VB, P5VC in these figures are controlled according to flowcharts shown in FIGS. 11, 12, 13, 14.

The main-chip microcomputer Q701 is a microprocessor that executes control programs stored in a ROM Q703. The main-chip microcomputer Q701 includes an interrupt control circuit for controlling various interrupt signals, a DMA control circuit, various timers, an image processing circuit, a resolution conversion circuit, and an input/output port interface circuit, and controls the overall operation of the controller. A RAM Q704 backed up by electric power of a battery BT701 is used as a work area by the main-chip microcomputer Q701.

The main-chip microcomputer Q701 further includes a phase locked loop circuit (PLL circuit) connected to a CPU clock X701 implemented by a crystal oscillator, for outputting an internal operation clock. This PLL circuit also has the function of suppressing power consumption by the entire chip by stopping clock output when the microprocessor enters the sleep state for achieving power conservation.

On the other hand, the 1-chip microcomputer (sub-chip microcomputer) Q702 includes a CPU, a RAM and a ROM, similarly to a general microcomputer, and is implemented by a microcomputer whose power consumption is low since a less complicated logic is adopted than in the main-chip microcomputer Q701, the clock frequency of the CPU is low, and a memory with a small capacity is provided. The 1-chip microcomputer is capable of updating the status and driving the LAN-UNIT 207 that transmits information to an external device, i.e. carrying out part of operations to be executed by the main-chip microcomputer Q701, even when the controller 202 is in the sleep mode. Further, as described in detail hereinafter, the 1-chip microcomputer is capable of executing operations in the sleep mode, such as power control, status monitoring, and monitoring of a command from the network and response to the command.

The main controller (main-chip microcomputer) Q701 receives, via a NMI (Non-Maskable Interrupt) terminal thereof, an interrupt signal 709 from the 1-chip microcomputer (sub-chip microcomputer) Q702 connected thereto, and when the signal 709 is inputted to the NMI terminal in the sleep state of the microprocessor, the sleep state is canceled, and the PLL circuit is enabled to supply the clock to the entire main-chip microcomputer Q701, whereby the operation of the main-chip microcomputer Q701 is restarted.

The 1-chip microcomputer Q702 monitors sensor signals from the RCON 216 and the DCON 201 in the sleep mode, and a sleep return signal from the FAX-UNIT 206. Further, the 1-chip microcomputer Q702 takes the place of the main-chip microcomputer Q701 in the sleep mode to send a command response and status information to the LAN-UNIT 207.

Between the 1-chip microcomputer Q702 and the main-chip microcomputer Q701, commands and data can be exchanged via a serial communication line 710, and an ACTIVE signal 711 indicative of whether the main-chip microcomputer Q701 is in the sleep state or in an operating state is inputted to the 1-chip microcomputer Q702.

The power switch 223 is disposed on the operating section 222. When the power switch 223 is operated, the digital multifunction machine to which is applied the method according to the present embodiment shifts to the sleep state or returns from the sleep state to the standby state.

However, the digital multifunction machine can also be configured such that it is caused to shift to the sleep mode not only by a manual operation of the power switch 223, but also automatically when the standby state continues over a predetermined time period set via the operating section 222.

Further, the digital multifunction machine can also be configured such that it is caused to return from the sleep state not only by a manual operation of the power switch 223, but also by a command from the LAN or a call signal from the telephone line as described hereinafter.

The SLEEP signal 712 indicative of a shift to the sleep mode goes "H (high)" in the sleep mode, and is sent from the main-chip microcomputer Q701 to the RCON 216 via an IF circuit 706 and to the DCON 201 via an IF circuit 701.

In the sleep mode, the power supplies from the DC power supply 203 except the power supply P5VA are turned off by a control signal from the 1-chip microcomputer Q702, and the power supply P5VC is intermittently turned on and off by the transistor Q705, whereby power consumption is reduced.

The RCON 216 performs A/D conversion of an image signal from the photoelectric conversion element (image sensor 221), such as a CCD, and then carries out shading processing and/or other processing on the read image, followed by outputting the resulting 8-bit video signal to the controller 202.

The RECON 216 also outputs the respective statuses of the sensors including a sensor for detection of the size of an original to the controller 202, and further performs control of the reader DC load group 220 including a motor of the reader section. The interface IF-9 includes signal lines for a vertical synchronizing signal (output signal), a horizontal synchronizing signal (output signal), a vertical synchronization request signal (input signal), a horizontal synchronization request signal (input signal), the clock signal (output signal), the 8-bit video signal (input signal), a video signal ready signal (input signal), the SLEEP signal 712 (output signal) and the LOAD signal (output signal). Further, sensor information from the RCON 216 is inputted to the interface IF-9 by serial communication.

The IF circuit 706 sends the signals from the interface IF-9 to the main-chip microcomputer Q701. In the sleep mode, however, the main-chip microcomputer Q701 is not allowed to receive signals, and hence the signals from the interface IF-9 are delivered to the 1-chip microcomputer Q702. This switching is executed by the SLEEP signal 712 from the main-chip microcomputer Q701.

The DCON 201 performs image recording as described with reference to FIG. 3A to FIG. 3C. The interface IF-1 includes signal lines for the signals described hereinabove described with reference to FIG. 4, and sensor signals from the DCON 201 are inputted to the interface IF-1 together with a command status signal by serial communication.

The IF circuit 701 sends the signals received via the interface IF-1 to the main-chip microcomputer Q701. In the sleep mode, however, the main-chip microcomputer Q701 cannot receive signals, and therefore the signals from the interface IF-1 are delivered to the 1-chip microcomputer Q702. This switching is executed by the SLEEP signal 712 from the main-chip microcomputer Q701.

The interface IF-1 may be configured such that eight signal lines for the signal VIDEO_DATA are normally used for transfer of an image signal, and in the sleep mode, are switched by the SLEEP signal for use as seven sensor signal lines and a LOAD signal line, to thereby save the number of signal lines in the interface IF-1.

For image reading, the main-chip microcomputer Q701 transfers a video signal inputted from the RCON 216 via the interface IF-9 to an internal image processing section thereof and performs image processing on the video signal, followed by storing the processed video signal in the RAM Q704.

For image recording, the main-chip microcomputer Q701 reads out the image data from the RAM Q704, and performs image processing and resolution conversion based on the size of a recording sheet and other settings, followed by outputting the image data to the DCON 201 via the interface IF-1.

The LAN-UNIT 207 includes a physical layer (PHY) for connection to the Ethernet (registered trademark), an Ethernet connection circuit for controlling a media access control layer (MAC layer), and a LAN control section for executing communication control in compliance with the IEEE 802.3.

A LAN-UNIT IF circuit 702 is an interface circuit that interfaces with the LAN-UNIT 207, and is implemented by a USB or IEEE 1284 interface circuit. The IF circuit 702 transmits information received from the LAN-UNIT 207 via the interface IF-10 to the main-chip microcomputer Q701, and transmits information received from the main-chip microcomputer Q701 to the LAN-UNIT 207.

When a command requesting the status of the digital multifunction machine of the present embodiment is detected via the LAN-UNIT 207, for example, the command requesting the status is transmitted from the LAN-UNIT IF circuit 702 to the main-chip microcomputer Q701. Responsive to this, the main-chip microcomputer Q701 transmits necessary information of the status held in the storage (RAM Q704) to the LAN-UNIT IF circuit 702, and the IF circuit 702 sends this information to the LAN-UNIT 207 via the interface IF-10.

When a print job is received from a PC on the network, a command requesting printing is transmitted from the LAN-UNIT IF circuit 702 to the main-chip microcomputer Q701. Then, when the machine gets ready for printing, a response indicating readiness for printing is transmitted from the main-chip microcomputer Q701 to the IF circuit 702, and the IF circuit 702 sends the response to the LAN-UNIT 207 via the interface IF-10.

When receiving this information, the PC on the network transmits print data (image data) immediately. In the same signal flow as described above, the print data is inputted to the main-chip microcomputer Q701. Then, the main-chip microcomputer Q701 performs necessary image processing on the print data, whereafter the print data is temporarily stored in the RAM Q704. Further, the image data is sent to the DCON 201 via the interface IF-1 similarly to the process for image recording, and recorded in an image forming section.

The above description was given of a case where the main-chip microcomputer Q701 is in normal operation, but the operation of the main-chip microcomputer Q701 in the sleep mode is a little different.

In the sleep mode, exchange of commands with the network is executed by the 1-chip microcomputer Q702. The LAN-UNIT IF circuit 702 transmits information received from the LAN-UNIT 207 via the interface IF-10 to the 1-chip microcomputer Q702, and transmits information received from the 1-chip microcomputer Q702 to the LAN-UNIT 207.

In the sleep mode, the main-chip microcomputer Q701 is in the sleep state where transmission/reception of signals is disabled, and therefore the 1-chip microcomputer Q702 receives status information sent from the RCON 216 via the IF circuit 706 and status information sent from the DCON 201 via the IF circuit 701, for monitoring these information. As described in detail hereinafter with reference to a flowchart, upon reception of a status request command from the LAN-UNIT 207, the 1-chip microcomputer Q702 sends status information as a response to the LAN-UNIT 207.

To cancel the sleep state of the digital multifunction machine e.g. due to occurrence of a print job to be processed by the digital multifunction machine, first, the 1-chip microcomputer Q702 determines whether or not the contents of the command received from the LAN-UNIT 207 cannot be processed by the machine without returning from the sleep state. If a command, such as a print request, which cannot be processed by the machine without returning from the sleep state, the 1-chip microcomputer Q702 instructs a power control IF circuit 705 to turn on the power supplies which are OFF state in the sleep mode, and responsive to this instruction, the power control IF circuit 705 delivers a power-on signal to the DC power supply 203.

At the same time, the 1-chip microcomputer Q702 outputs the interrupt signal (NMI) 709 to the terminal NMI of the main-chip microcomputer Q701. Responsive to the interrupt signal 709 received at the terminal NMI, the main-chip microcomputer Q701 shifts from the sleep state to the normal state as described in detail hereinafter with reference to a flowchart. When it is confirmed from the ACTIVE signal 711 that the main-chip microcomputer Q701 has shifted to the normal state, the 1-chip microcomputer Q702 transmits the contents of the received command to the main-chip microcomputer Q701 through the serial communication line 710. When it is determined that the digital multifunction machine is in a state enabled for processing the received command (as for a print command, when it is confirmed that that the digital multifunction machine has shifted to a state enabled for recording), the main-chip microcomputer Q701 sends a necessary response to the LAN-UNIT 207.

The FAX-UNIT 206 includes a CODEC that encodes and decodes image data, a MODEM that modulates encoded data for FAX transmission or demodulates a received FAX signal, a FAX control section that executes a FAX protocol, a CI detector circuit that detects a calling indicator (CI) signal and outputs a CI detection signal, and an off-hook detector circuit that detects an off-hook state and outputs an off-hook detection signal.

A FAX-UNIT IF circuit 703 interfaces with the FAX unit 206, and is implemented by an IEEE 1284 interface circuit. The FAX-UNIT IF circuit 703 exchanges commands and image data with the FAX-UNIT 206 via the interface IF-11. Further, the FAX-UNIT IF circuit 703 receives the CI detection signal (input signal) and the off-hook detection signal (input signal).

During FAX transmission, the main-chip microcomputer Q701 sends image data stored in the RAM Q704 to the FAX-UNIT 206. On the other hand, during FAX reception, the main-chip microcomputer Q701 receives image data from the FAX-UNIT 206, and temporarily stores the same in the RAM Q704. Then, similarly to the process for image recording, the main-chip microcomputer Q701 sends the image data to the DCON 201 via the interface IF-1, and recording is performed in the image forming section.

In the sleep mode, the IF circuit 703 monitors the CI detection signal and the off-hook detection signal to be received via the interface IF-11, and upon detection of reception of a CI or the off-hook state, sends a FAX start signal 713 received from the FAX-UNIT 206 to the 1-chip microcomputer Q702 and the main-chip microcomputer Q701. When receiving the FAX start signal 713 sent from the FAX-UNIT 206, the 1-chip microcomputer Q702 turns on the DC power supply 203, and at the same time returns the main-chip microcomputer Q701 from the sleep state to a state enabled for responding to a command from the FAX-UNIT 206.

Although in the above description, the FAX start signal 713 received from the FAX-UNIT 206 is inputted to both the 1-chip microcomputer Q702 and the main-chip microcomputer Q701, the digital multifunction machine may be configured such that the FAX start signal 713 is inputted to the 1-chip microcomputer Q702 alone, and the 1-chip microcomputer Q702 informs the main-chip microcomputer Q701 through the serial communication line 710 that a FAX operation has been started by the FAX start signal 713 from the FAX-UNIT 206.

Figure 8A:
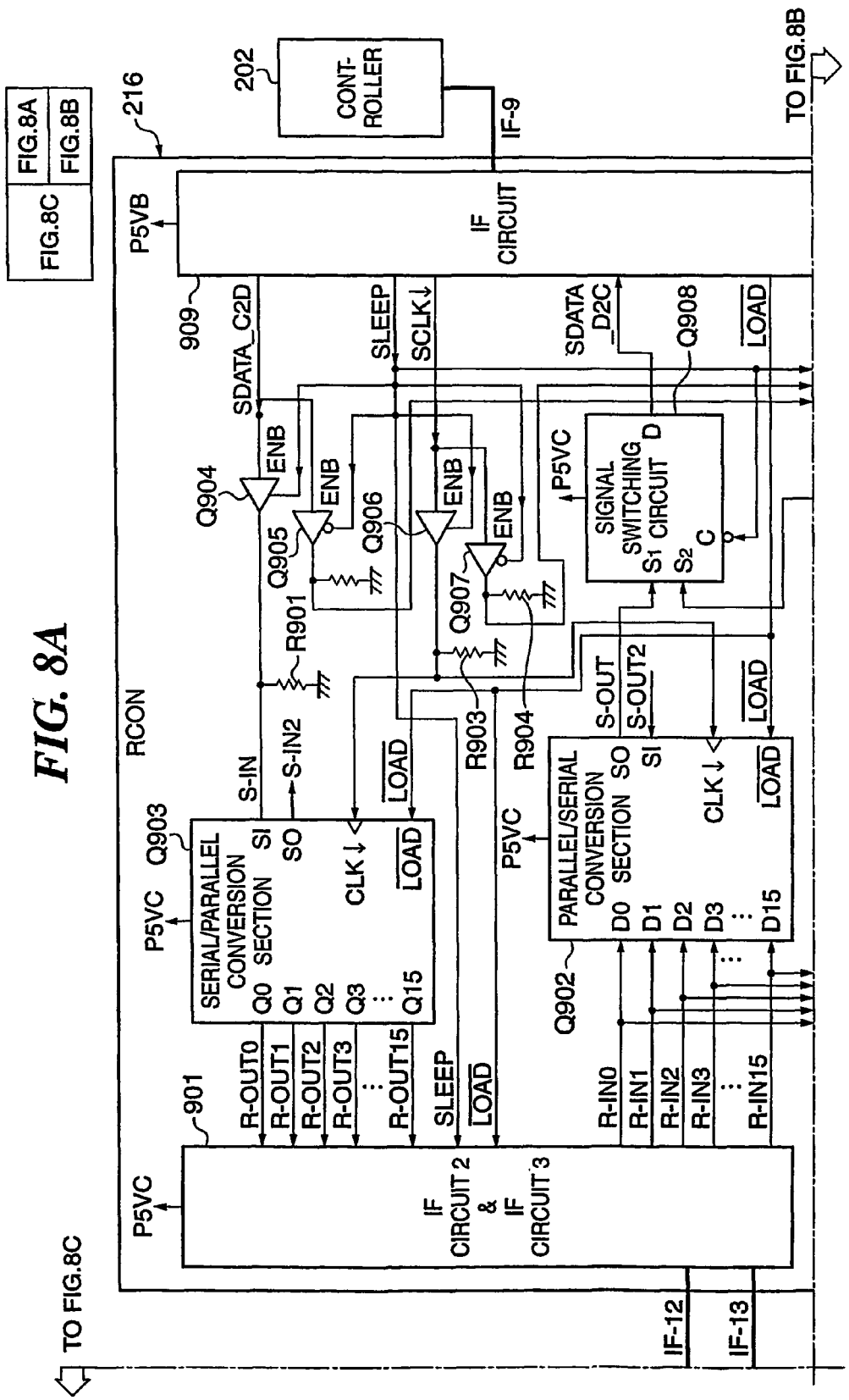
Figure 8C:
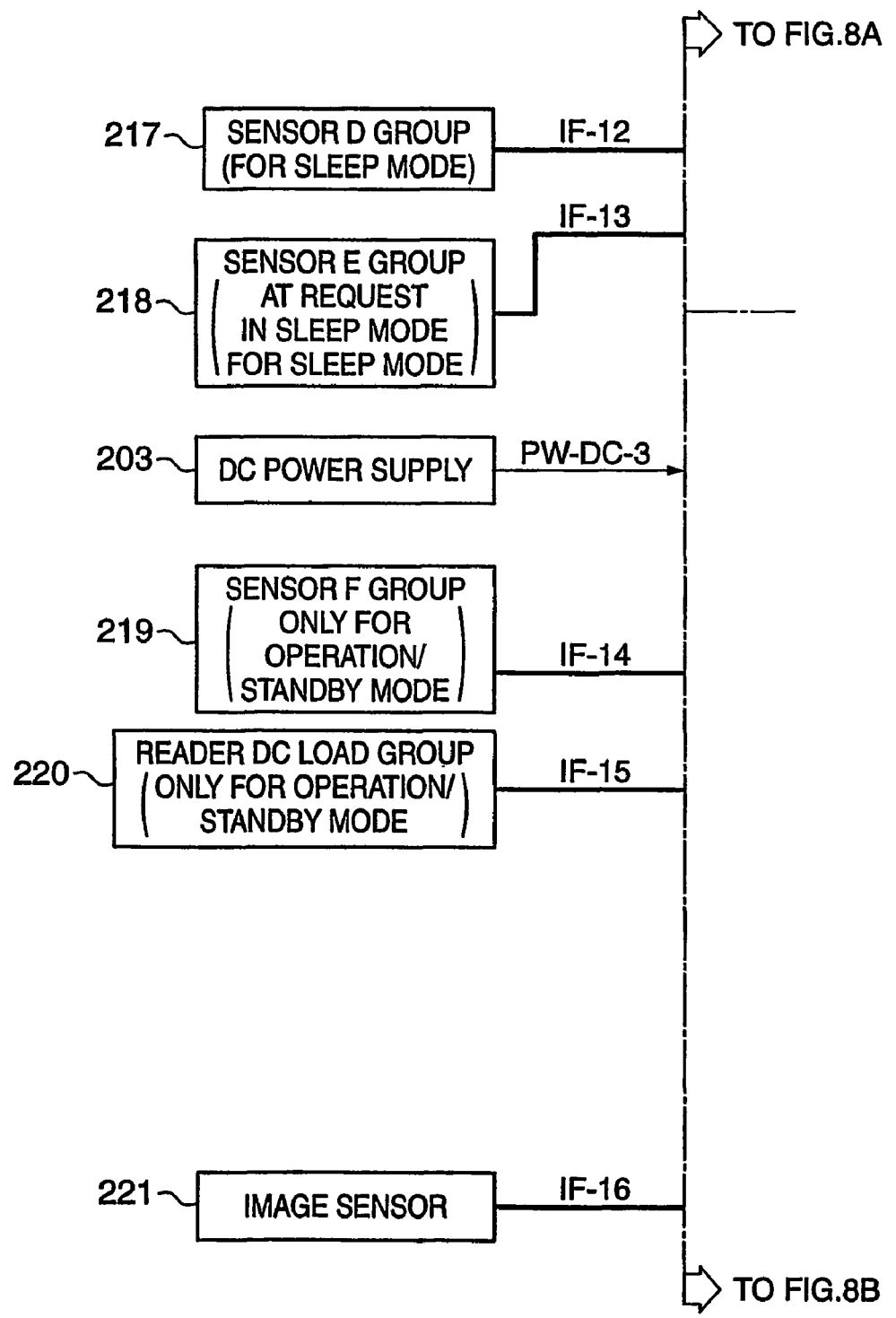

FIG. 8A to FIG. 8C are block diagram showing details of the arrangement of the RCON 216 and its related parts appearing in FIG. 2A and FIG. 2B. Component parts and signals corresponding to those in FIG. 2A and FIG. 2B are designated by identical reference numerals.

Compared with the DCON 201 shown in FIG. 3A to FIG. 3C, the RCON 216 in FIG. 8A to FIG. 8C has a major difference in that the printer DC load group 211 is replaced by the reader DC load group 220 appearing in FIG. 2A and FIG. 2B. Reference numerals 901 to 904, 908, 909 designate interface circuits (IF circuits). The IF circuit 901 is comprised of an IF circuit 2 and an IF circuit 3. The IF circuit 902 is comprised of an IF circuit DC-3.

The IF circuits 903, 904, 908, 909 are comprised of IF circuits 4, 5, 6, 1, respectively.

The RCON 216 does not have the AC driver 205, the IF circuit 305, the optional sheet discharge unit 213, the IF circuit 306, the optional sheet feed unit 214, the IF circuit 307, the exposure mechanism 212, or the IF circuit 308, differently from the DCON 201 in FIG. 3A to FIG. 3C, or any signal lines connected to these devices.

Reference numeral PW-DC-3 designates a line connecting between the RCON 216 and the DC power supply 203. Reference numeral Q901 designates a microcomputer. Reference numeral Q902 designates a parallel/serial conversion section. Reference numeral Q903 designates a serial/parallel conversion section. Reference numerals Q904, Q906 designate state buffers (tri-state buffers).

Figure 9:
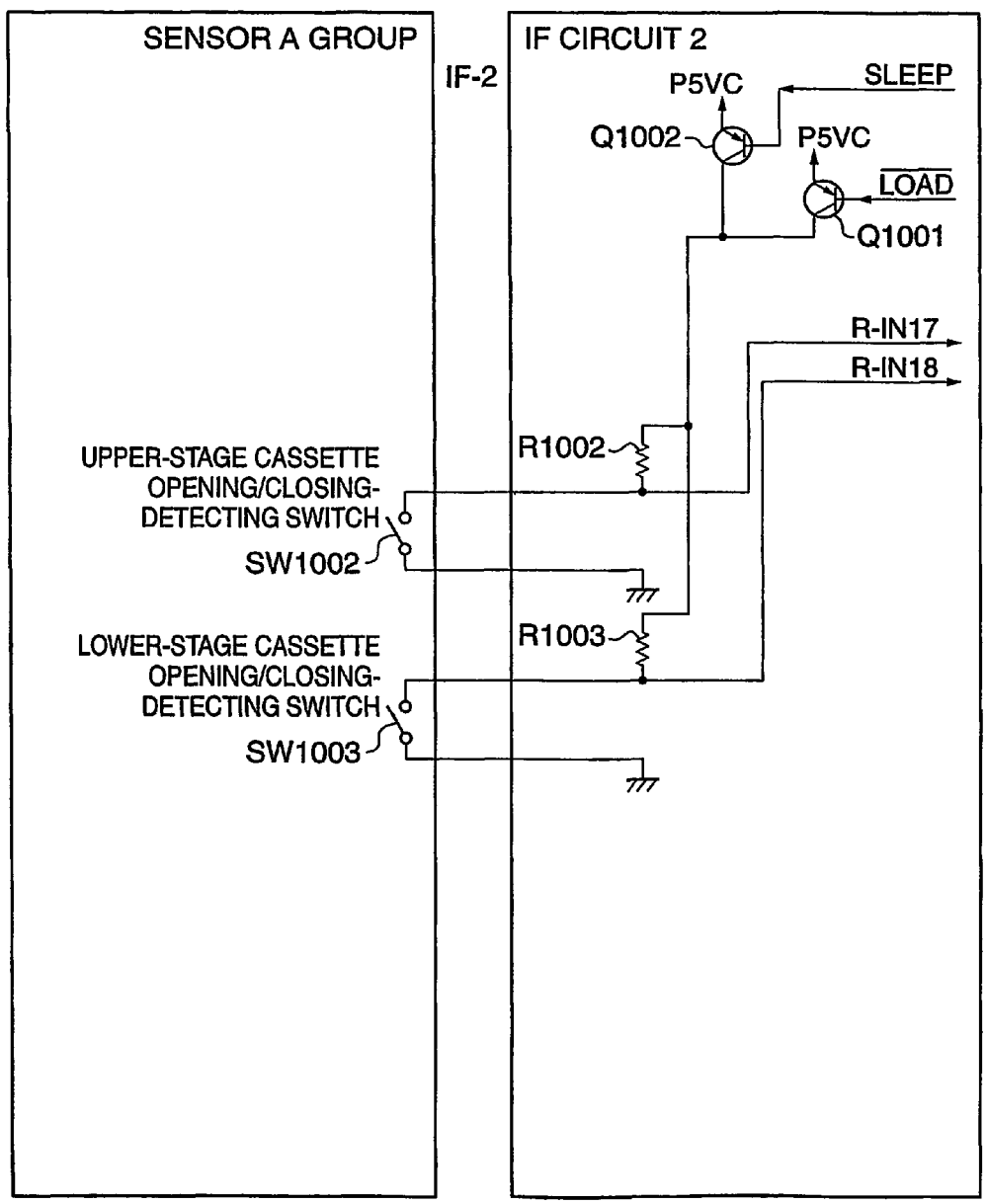
FIG. 9 is a circuit diagram showing the relationship between part of an IF circuit 2 within an optional sheet feed unit 214 in FIG. 3A to FIG. 3C and a sensor A group.

FIG. 9 is a circuit diagram showing the relationship between an IF circuit 2 of the optional sheet feed unit 214 appearing in FIG. 3A to FIG. 3C and a sensor A group. The IF circuit 2 is basically identical in configuration and operation to the IF circuit 2 of the RCON 216 and that of the DCON 201. It should be noted that the IF circuit 2 within the optional sheet feed unit 214 and the sensor group A and an IF circuit 3 and a sensor group B provided within the optional sheet feed unit 214, which are referred to in FIG. 9 and in FIG. 10A and FIG. 10B, described hereinafter, are different from the IF circuits 2, 3 provided within the interface circuit 301 and the sensor A and B groups 208, 209 connected to the interface circuit 301, shown in FIG. 3A to FIG. 3C. However, the sensor A group 208 and the sensor B group 209 which will be referred to in the description of FIGS. 11 to 13, described hereinafter, also include the sensor A group and sensor B group referred to in FIGS. 9 and 10.

In FIG. 9, the sensor A group provided in the optional sheet feed unit 214 is a group of sensors implemented by microswitches. In the sensor A group, reference numeral SW1002 designates an upper-stage cassette opening/closing-detecting switch that detects opening/closing of the upper-stage cassette. Reference numeral SW1003 designates a lower-stage cassette opening/closing-detecting switch that detects opening/closing of the lower-stage cassette. Reference numeral P5VC designates the power supply appearing in FIG. 3A to FIG. 3C.

In the IF circuit 2 of the optional sheet feed unit 214, reference numerals Q1001, Q1002 designate PNP transistors that controls ON/OFF of the respective power supplies supplied to the switches SW1002 to SW1003. Reference numerals R1002, R1003 designate resistors that limit respective current values supplied to the switches SW1002 to SW1003.

Reference numeral R-IN 17 designates a signal for detecting the ON/OFF of the switch SW1002. Reference numeral R-IN 18 designates a signal for detecting the ON/OFF of the switch SW1003. A SLEEP signal and a LOAD signal are for controlling the power supply P5VC.

With the arrangement described above, the IF circuit 2 of the optional sheet feed unit 214 is capable of detecting the ON/OFF states of the switches SW1002 and SW1003 when the transistors Q1001 and Q1002 are in the ON state.

When it is not necessary to detect the ON/OFF states of the switches SW1002 and SW1003, it is possible to turn off the transistors Q1001 and Q1002 to cut off the supply of electric current to the switches SW1002 and SW1003, thereby suppressing energy consumption.

The IF circuit 2 in the optional sheet feed unit 214 can communicate with the IF circuit 18 307 of the DCON 201 via the interface IF-18 appearing in FIG. 3A to FIG. 3C. A signal S-OUT 2 from the IF circuit 18 307 is inputted to the parallel/serial conversion section Q302, and a signal S-IN 2 to the IF circuit 18 307 is supplied from the serial/parallel conversion section Q303. Further, the LOAD, SLEEP and SCLK↓ signals to the IF circuit 18 307 are outputted from the IF circuit 309.

Figure 10A:
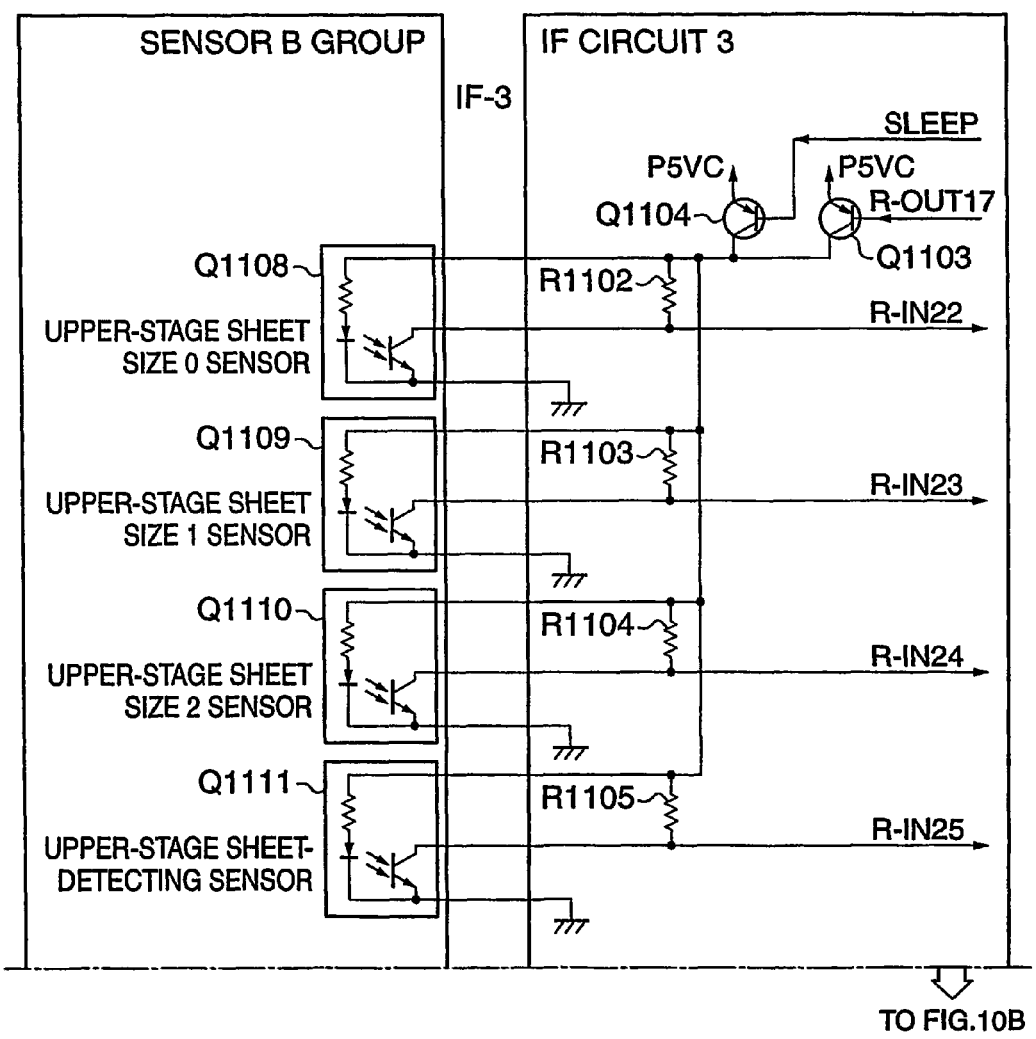
FIG. 10A and FIG. 10B are circuit diagram showing the relationship between part of an IF circuit 3 within the optional sheet feed unit 214 in FIG. 3A to FIG. 3C and a sensor B group.
Figure 10B:
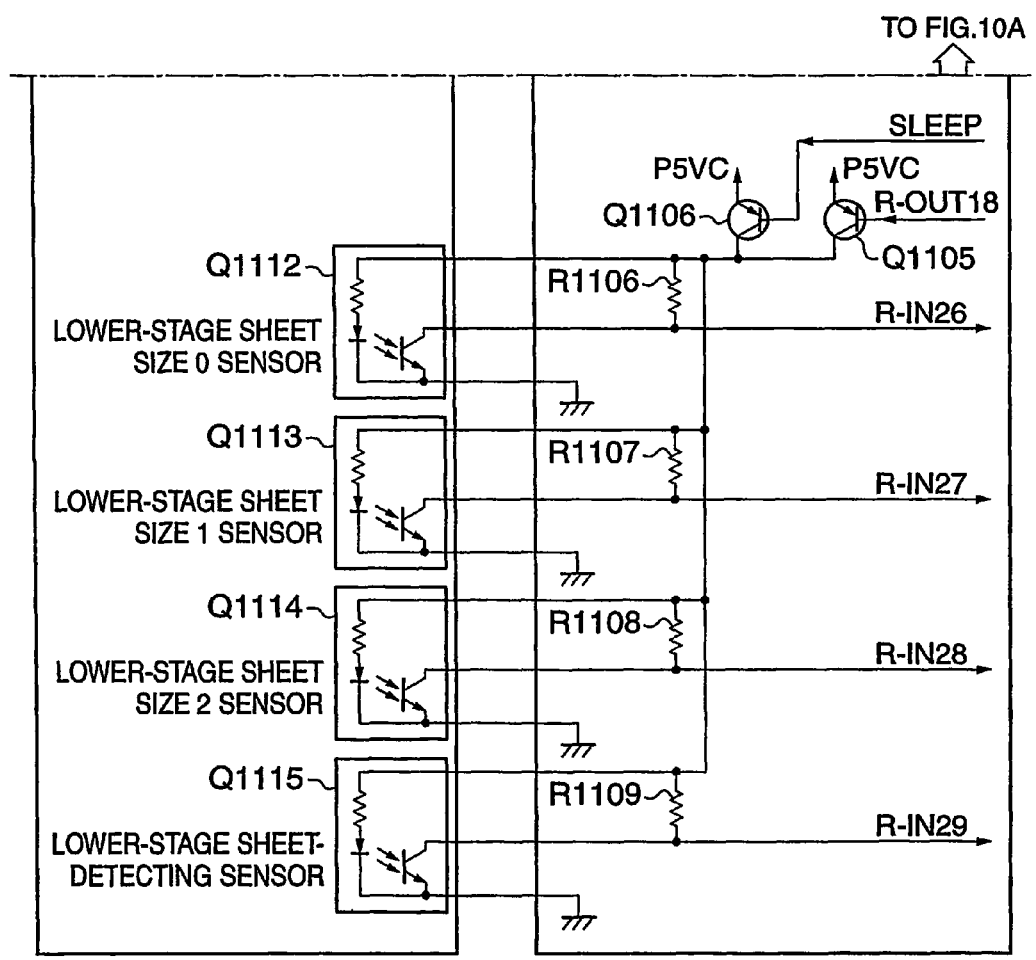

FIG. 10A and FIG. 10B are circuit diagram showing the relationship between an IF circuit 3 of the optional sheet feed unit 214 appearing in FIG. 3A to FIG. 3C and a sensor B group. The IF circuit 3 is basically identical in configuration and operation to the IF circuit 3 of the RCON 216 and that of the DCON 201.

In FIG. 10A and FIG. 10B, the sensor B group provided in the optional sheet feed unit 214 is a group of sensors implemented by photo interrupters. In the sensor B group, reference numeral Q1108 designates an upper-stage sheet size 0 sensor for detecting the size of sheets in the upper-stage cassette. Reference numeral Q1109 designates an upper-stage sheet size 1 sensor for detecting the size of sheets in the upper-stage cassette. Reference numeral Q1110 designates an upper-stage sheet size 2 sensor for detecting the size of sheets in the upper-stage cassette. Reference numeral Q1111 designates an upper-stage sheet-detecting sensor for detecting the presence of sheets in the upper-stage cassette.

Reference numeral Q1112 designates a lower-stage sheet size 0 sensor for detecting the size of sheets in the lower-stage cassette. Reference numeral Q1113 designates a lower-stage sheet size 1 sensor for detecting the size of sheets in the lower-stage cassette. Reference numeral Q1114 designates a lower-stage sheet size 1 sensor for detecting the size of sheets in the lower-stage cassette. Reference numeral Q1115 designates a lower-stage sheet-detecting sensor for detecting the absence/presence of sheets in the lower-stage cassette.

Reference numeral. P5VC designates the power signal appearing in FIG. 3A to FIG. 3C. A SLEEP signal and signals R-OUT 17 and R-OUT 18 are input signals inputted to the IF circuit 3. These signals control respective power supplies to the photo-interrupter sensors.

Reference numerals R-IN 22 to R-IN 29 are output signals outputted from the IF circuit 3.

Reference numerals Q1104, Q1106 designate PNP transistors that are ON/OFF controlled by the SLEEP signal, for control of power supply to the photo-interrupter sensors.

Reference numerals Q1103, Q1105 designate PNP transistors that are ON/OFF controlled by the signal R-OUT 17 and the signal R-OUT 18, respectively, for control of power supply to the photo-interrupter sensors. Reference numerals R1102 to R1109 designate current limiter resistors that control current to the photo-interrupters.

The IF circuit 3 of the optional sheet feed unit 214 can communicate with the IF circuit 18 307 of the DCON 201 via the interface IF-18 appearing in FIG. 3A to FIG. 3C. A signal S-OUT 2 from the IF circuit 18 307 is inputted to the parallel/serial conversion section Q302, and a signal S-IN 2 to the IF circuit 18 307 is supplied from the serial/parallel conversion section Q303. Further, the LOAD, SLEEP, and SCLK↓ signals to the IF circuit 18 307 are outputted from the IF circuit 309.

With the arrangement of the optional sheet feed unit 214 described above, it is possible to cut off power supply to the photo interrupter sensors except when the power supply is required.

With the above described arrangement of the digital multifunction machine, a shift to the sleep state and a return from the sleep state to the normal state, monitoring of the statuses of the DCON 201 and the RECON 216 in the sleep mode, and monitoring of commands from the LAN-UNIT 207 and transmission of status information to the LAN-UNIT 207 in the sleep mode are controlled by the 1-chip microcomputer Q702 (hereinafter referred to as the sub CPU) and the main-chip microcomputer Q701 (hereinafter referred to as the main CPU).

In the following, the operations of the above described component parts of the digital multifunction machine will be described with reference to flowcharts in FIGS. 11 to 14.

Figure 11:
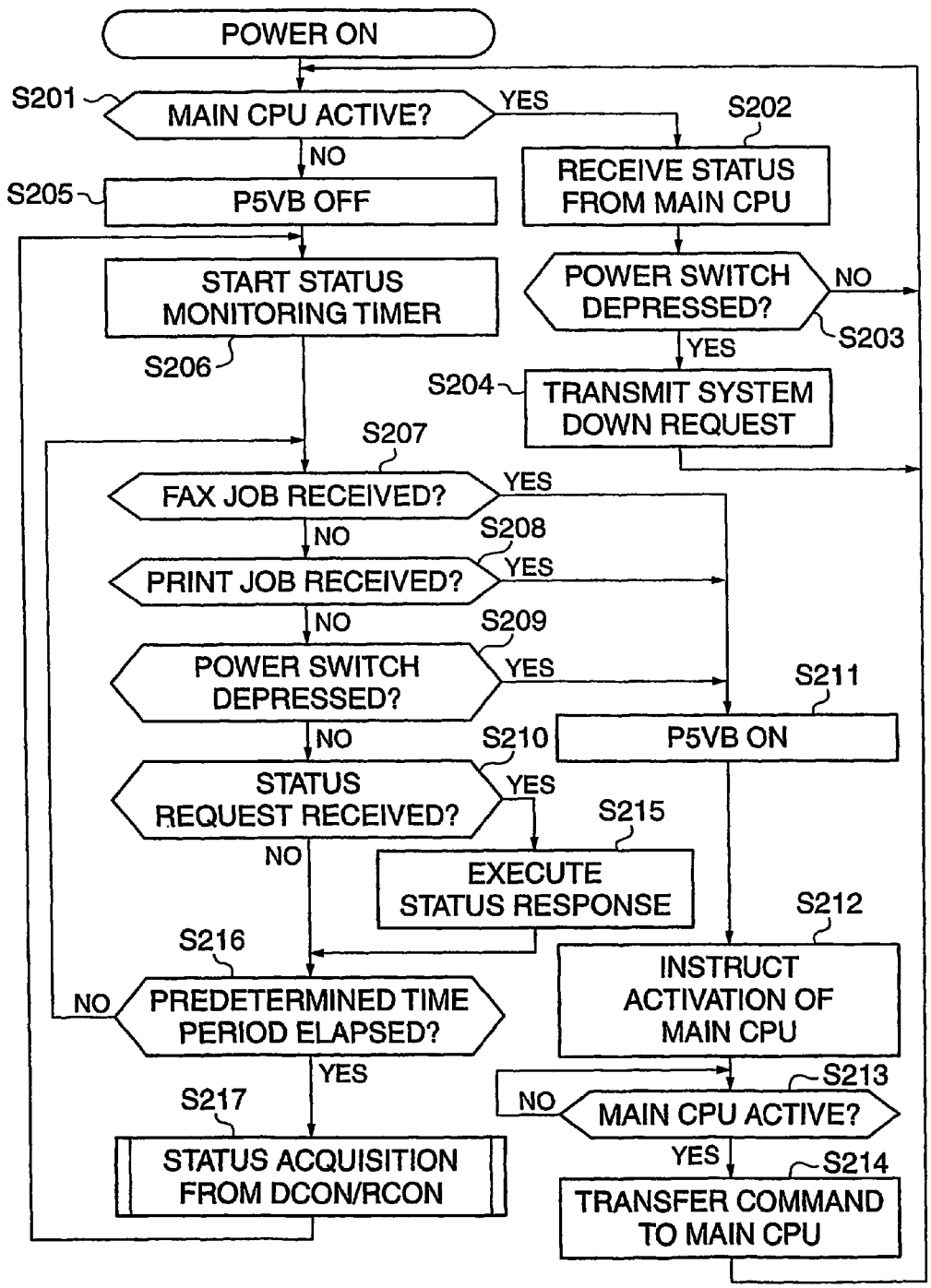
FIG. 11 is a flowchart showing an example of a procedure of control operations carried out by a sub CPU.

FIG. 11 is a flowchart showing an example of a procedure of control operations executed by the sub CPU, based on a program stored in a ROM, not shown, or another storage medium, not shown.

The sub CPU is connected to the power supply P5VA of the DC power supply 203, for constant operation. The operation of the sub CPU is broadly divided into an operation in the sleep mode as a halt state in which the main CPU is inoperative, and an operation in the normal mode in which the main CPU is performing a normal operation. First, a description will be given of the operation in the normal mode.

It is determined whether or not the ACTIVE signal 711 from the main CPU is in the ON state (step S201). If the ACTIVE signal 711 is in the ON state, which means that the main CPU is in the normal mode, the status of the DCON 201 and that of the RCON 216 are received from the main. CPU (step S202), and an operation of monitoring the power switch 223 is repeatedly carried out (step S203).

Then, when it is determined that the power switch 223 has been depressed, a SYSTEM DOWN request is transmitted to the main CPU so as to shift the entire system (digital multifunction machine) into the sleep mode for power conservation (step S204). The reception of the status in the step S202 and transmission of the SYSTEM DOWN request in the step S204 are executed via the serial communication line 710 between the sub CPU and the main CPU.

On the other hand, if the ACTIVE signal 711 from the main CPU is in the OFF state, the system shifts into the sleep mode. When the system has shifted into the sleep mode, first, the power control IF circuit 705 is instructed to turn off the power supply P5VB to the DCON 201 and the RCON 216 (step S205).

Next, a status monitoring timer for monitoring the status of the DCON 201 and the RCON 216 is started (step S206). This timer counts a time interval of e.g. 100 msec., for status acquisition.

Then, until 100 msec. is counted, reception of a FAX job request (step S207), reception of a print job request (step S208), depression of the power supply switch 223 (step S209) and reception of a status request from an external device (step S210) are repeatedly monitored. When a job request has been received (YES to any one of S207 and S208) or when the power supply switch 223 has been depressed (YES to S209), the power control IF circuit 705 is instructed to turn on the power supply P5VB to the DCON 201 and the RCON 216 (step S211), and the interrupt signal 709 for activating the main CPU is turned on (step S212), whereafter the activation of the main CPU (turning-on of the ACTIVE signal) is awaited (step S213). When the main CPU is activated, information indicative of the cause of the activation in the step S209 or information of a command received from the LAN-UNIT in the step 207 or 208 and the like is transferred to the main CPU (step S214), and then the process returns to the step S201. Thus, the system shifts into the normal mode.

The determination as to the presence of a FAX job in the step S207 is carried out based on the CI detection signal or the off-hook detection signal supplied from the aforementioned FAX-UNIT IF circuit 703. The presence of a print job is determined based on the command supplied from the aforementioned LAN-UNIT IF circuit 702, and this command is transferred to the main CPU.

On the other hand, when a status request has been received from an external device (step S210), a status response is executed by transmitting the latest statuses of the DCON 201 and the RCON 216 stored in the sub CPU to the external device via the LAN-UNIT 207 (step S215). The status information transmitted (notified) to the external device is displayed as status information on a display section provided in the external device, whereby a user can check the latest statuses.

The statuses of the DCON 201 and the RCON 216 transmitted in the step S215 are the latest ones of the statuses received from the main CPU in the step S202 and the statues acquired in a step S217, referred to hereinafter.

The monitoring process in the steps S207 to S210 is repeatedly executed until the status monitoring timer counts up 100 msec. (step S216). When the status monitoring timer counts up 100 msec. (YES to S216), the latest statuses are acquired from the DCON 201 and the RCON 216 (step S217), and then the steps S206 et seq. are repeatedly executed. The status acquiring operation in the step S217 will be described in detail hereinafter with reference to FIG. 13A and FIG. 13B.

According to the flowchart in FIG. 11, the power supply P5VB is saved unless a job request or depression of the power switch 223 is detected. Further, even if the main CPU is in the power-saving state, the sub CPU that consumes less electric power can perform status response (step S215) in response to a status request from an external device (step S210). Moreover, the status acquisition process in the step S217 for updating the statuses to be transmitted to the external device by the status response is also carried out in a power-saving manner.

Next, the operation of the main CPU will be described with reference to a flowchart shown in FIG. 12A and FIG. 12B.

Figure 12A:
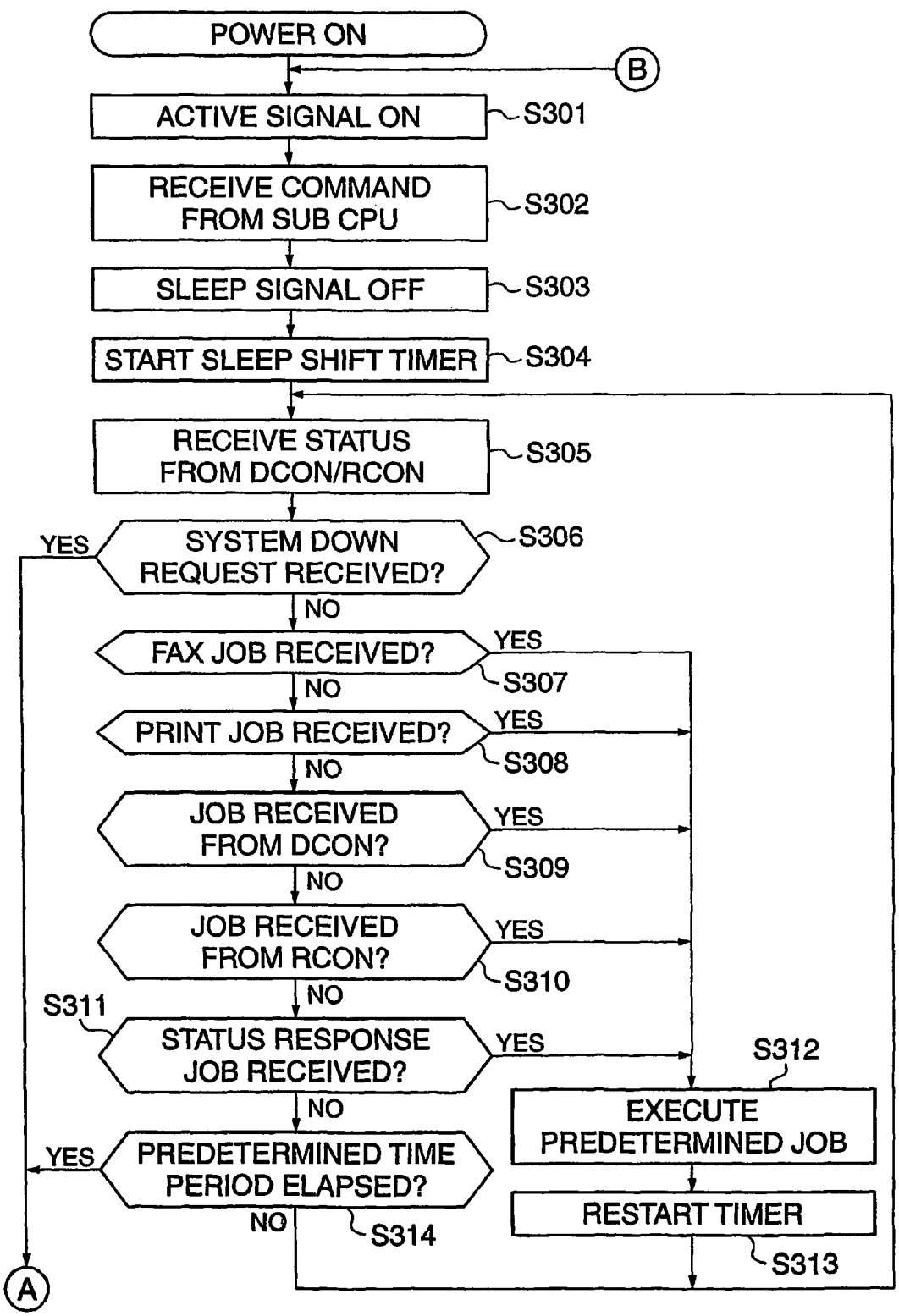
FIG. 12A and FIG. 12B are flowchart showing an example of a procedure of control operations carried out by a main CPU.
Figure 12B:
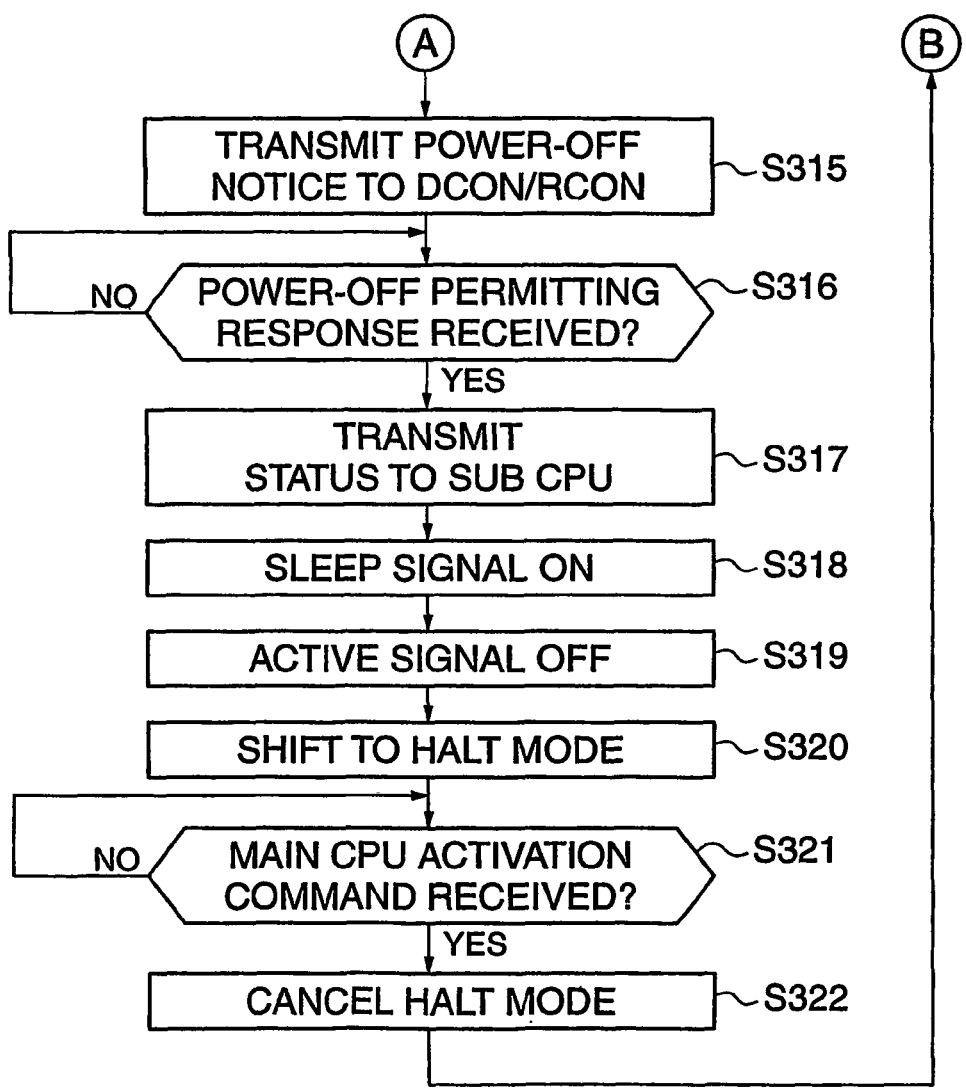

FIG. 12A and FIG. 12B are flowchart showing an example of a procedure of control operations executed by the main CPU, based on a program stored in a ROM, not shown, or another storage medium, not shown.

Similarly to the sub CPU, the main CPU is connected to the power supply P5VA of the DC power supply 203, for constant operation, but the operation of the main CPU is broadly divided into an operation in the sleep mode as a halt state in which the CPU clock X701 is inoperative, and an operation in the normal mode in which all the operations of the present system, including FAX transmission/reception, printing, scanning, and response to a status request from an external device, are enabled.

When the main CPU has shifted into the normal mode (from the halt state), first, the ACTIVE signal 711 is turned on (step S301). As described hereinabove, this operation brings the sub CPU into the normal mode. Then, the cause of the activation and a command are received from the sub CPU (step S302). The command received here is one which the sub CPU received from the LAN-UNIT, as described hereinbefore, and this command is processed in steps S307 et seq., described hereinbelow.

Then, the SLEEP signal 712 is turned off (step S303). As described hereinbefore, in the controller 202, this operation causes the IF circuit 701 and the IF circuit 706 to switch respective serial communication IF's from ones interfacing between the sub CPU and the DCON 201 and the RCON 216 to ones interfacing between the main CPU and the DCON 201 and the RCON 216.

At the same time, in the DCON 201 and the RCON 216 as well, the serial communication IF's thereof are switched from ones formed by hardware to ones realized by the microcomputer Q301 and the microcomputer Q901, and the sleep states of the microcomputer Q301 and the microcomputer Q901 are canceled.

Then, a sleep shift timer is started (step S304). This timer counts a time period of e.g. one hour, before a shift from the normal mode to the sleep mode is carried out. Thereafter, until one hour is counted up, monitoring is repeatedly executed of reception of the statuses from the DCON 201 and the RCON 216 (step S305), reception of the SYSTEM DOWN request from the sub CPU (step S306), reception of a FAX job request (step S307), reception of a print job request (step S308), reception of a job request from the microcomputer Q301 of the DCON 201 (step S309), reception of a job request from the microcomputer Q901 of the RCON 216 (step S310), and reception of a status request (status response job) from an external device (step S311).

When the SYSTEM DOWN request is received (YES to S306), processing for a shift to the sleep mode is executed in steps S315 et seq., described in detail hereinafter.

When a job request is received, a corresponding job is carried out (step S312), and the count of the sleep shift timer is reset to one hour and restarted (step S313), followed by the process returning to the step S305.

The presence of a FAX job is determined based on the CI detection signal, the off-hook detection signal supplied from the FAX-UNIT-IF circuit 703, or the command received from the sub CPU in the step S302. The presence of a print job is determined based on the command supplied from the LAN-UNIT IF circuit 702 or the command received from the sub CPU in the step S302. Job requests from the DCON 201 and the RCON 216 are received through the respective serial communication IF's.

The presence of a status request from an external device is determined based on the command supplied from the LAN-UNIT IF circuit 702, described hereinabove. The execution of each job can be achieved by any suitable methods generally employed, and hence detailed description thereof is omitted.

If the sleep shift timer has counted up one hour, i.e. if a state where no job is executed has continued for one hour (step S314), the main CPU executes the processing for a shift to the sleep mode in steps S315 et seq. so that the main CPU itself shifts to the sleep mode.

Next, a description will be given of the processing for a shift to the sleep mode in the steps S315 et seq. This processing is executed in response to the SYSTEM DOWN request received from the sub CPU (S306) or for shift of the main CPU itself to the sleep mode (S314). First, a power-off notice is transmitted to the DCON 201 and the RCON 216 via the serial communication IF (step S315), and reception of a power-off permitting response from each of the DCON 201 and the RCON 216 is awaited (step S316).

When receiving the power-off notice, the microcomputers Q301, Q901 each execute a predetermined power-off process, and transmit power-off permission to the main CPU after completion of the power-off process.

When receiving the power-off permitting responses from both of the microcomputers Q301 and Q901 (step S316), the main CPU transmits the statuses of the DCON 201 and the RCON 216 to the sub CPU (step S317). It should be noted that the statuses of the DCON 201 and the RCON 216 transmitted in the step S317 are the latest ones received from the microcomputers Q301 and Q901 in the step S305.

Then, the SLEEP signal 712 is turned on (step S318). As described hereinbefore, this operation causes the IF circuit 701 and the IF circuit 706 to switch respective serial communication IF's from the ones interfacing between the main CPU and the DCON 201 and the RCON 216 to the ones interfacing between the sub CPU and the DCON 201 and the RCON 216. At the same time, in the DCON 201 and the RCON 216 as well, the serial communication IF's thereof are switched from the ones realized by the microcomputer Q301 and the microcomputer Q901 to the ones formed by the hardware, and the microcomputer Q301 and the microcomputer Q901 enter their sleep states.

Then, the ACTIVE signal 711 is turned off (step S319). As described hereinabove, this operation causes the sub CPU to provide control for the sleep mode.

Then, the main CPU brings itself into the halt state where the CPU clock X701 is inoperative, whereby the shift to the sleep mode is completed (step S320). This state continues until an interruption is caused by the interrupt signal 709 supplied from the sub CPU to activate the main CPU. When the interruption is caused (YES to S321), the halt state of the main CPU is canceled (step S322), followed by the process returning to the step S301 in the normal mode.

Next, the operation of the sub CPU for acquiring statuses from the DCON 201 in the sleep mode will be described with reference to flowcharts in FIGS. 13 and 14.

FIGS. 13 and 14 are flowcharts showing an example of a procedure of control operations (a detailed procedure of the status acquisition process in the step S217 in FIG. 11) executed by the sub CPU, based on a program stored in a ROM, not shown, or another storage medium, not shown.

First, the power supply P5VC is turned on so as to enable respective hardware serial communication blocks of the DCON 201 and a sheet feed unit (step S401). The IF circuits 2 and 3 are energized by this power supply P5VC as shown in FIGS. 5 and 6, to switch the sensor A, B groups 208, 209 to a state enabled for signal detection. This control process corresponds to control of power supply (energization of the sensor groups) necessary for updating the statuses even in the energy-saving mode. The statuses updated according to this control are notified to the external device via the LAN-UNIT 207 by "status response" in the step S215 in FIG. 11.

Then, the LOAD signal is switched to "low" (step S402), and stabilization of input data to the parallel/serial conversion section Q302 is awaited for 100 μsec. (step S403), whereafter the LOAD signal is switched to "high", and the input data to the parallel/serial conversion section Q302 is finally determined (step S404).

Then, transmission data "0000 (Hex)" is set so as to turn off power supply to the sensor B group 209 (step S405), and thirty-two clock signals clk are outputted through the SCLK signal line, for transmission and reception of 32-bit data (step S406). This enables the status of the sensor A group 208 to be received. At the same time, information of the sensor B group 209 is received in a manner accompanying the status reception, but since the power supply to the sensor B group 209 is in the OFF state, control is provided to invalidate the data.

More specifically, the transmission data "0000 (Hex)" is transmitted to the serial/parallel conversion section Q303 via the data signal SDATA_C2D, and the data R-IN 31 to R-IN 0 are received by the parallel/serial conversion section Q302 to form the data signal SDATA_D2C. However, the data R-IN 5 to R-IN 16 and R-IN 19 to R-IN 31 received at this time are invalid. Further, when there is no sheet feed unit connected, the more significant 16 bits of the transmission/reception data are invalid data.

Then, the LOAD signal is switched to low (step S407), and after 100 μsec. is waited (step S408), the LOAD signal is switched to high, and output data from the serial/parallel conversion section Q303 is finally determined (step S409). At this time, data for the next transmission within a register for checking a change in status is cleared to 0, whereby the communication buffers are cleared and initialized (step S410).

Then, the received statuses of the sensor A group 208 are compared with the latest statuses already acquired.

The bit 0 (R-IN 0) of the received data is indicative of the state of the door opening/closing-detecting switch SW501. When the door opening/closing-detecting switch SW501 is in the open state (YES to S412), the value of the bit 0 of data for the next transmission is set to 1 (hereinafter, "set" means "set from "0" to "1"") so as to output the result of detection by the cartridge-detecting sensor Q607 as the signal R-IN 5 when the data for the next transmission is transmitted (step S413).

The bit 1 (R-IN 1) of the received data is indicative of the state of the upper-stage cassette opening/closing-detecting switch SW502. When the upper-stage cassette opening/closing-detecting switch SW502 is changed from the open state to the closed state (YES to S414), the value of the bit 1 of the data for the next transmission is set so as to cause the results of detection by the upper-stage cassette size 0 sensor Q608, the upper-stage cassette size 1 sensor Q609, the upper-stage cassette size 2 sensor Q610, and the upper-stage sheet-detecting sensor Q611 to be outputted as the signals R-IN 6 to R-IN 9 when the data for the next transmission is transmitted (step S415).

The bit 2 (R-IN 2) of the received data is indicative of the state of the lower-stage cassette opening/closing-detecting switch SW503. When the lower-stage cassette opening/closing-detecting switch SW503 is switched from the open state to the closed state (YES to S416), the value of the bit 2 of the data for the next transmission is set so as to cause the results of detection by the lower-stage cassette size 0 sensor Q612, the lower-stage cassette size 1 sensor Q613, the lower-stage cassette size 2 sensor Q614, and the lower-stage sheet-detecting sensor Q615 to be outputted as the signals R-IN 10 to R-IN 13 when the data for the next transmission is transmitted (step S417).

The bit 4 (R-IN 4) of the received data is indicative of the state of the optional sheet feed unit connection-detecting switch SW505. When the optional sheet feed unit connection-detecting switch SW505 has detected the presence of connection of the optional sheet feed unit (YES to S418), changes in the open/closed states of the upper-stage and lower-stage cassettes as the optional sheet feed units are determined in steps S419 et seq., described in detail hereinafter, whereas when the absence of the connection is detected, steps S423 et seq., described in detail hereinafter, are executed.

The bit 17 (R-IN 17) of the received data is indicative of the state of an optional upper-stage cassette opening/closing-detecting sensor. When the output of the optional upper-stage cassette opening/closing-detecting sensor has been changed from one indicative of "the open state" to one indicative of "the closed state" (YES to S419), the bit 17 of the data for the next transmission is set so as to cause the results of detection by an optional upper-stage cassette size 0 sensor, an optional upper-stage cassette size 1 sensor, an optional upper-stage cassette size 2 sensor, and an optional upper-stage sheet-detecting sensor to be outputted as the signals R-IN 22 to R-IN 25 when the data for the next transmission is transmitted (step S420).

The bit 18 (R-IN 18) of the received data is indicative of the state of an optional lower-stage cassette opening/closing-detecting sensor. When the output of the optional lower-stage cassette opening/closing-detecting sensor has been changed from one indicative of "the open state" to one indicative of "the closed state" (YES to S421), the bit 18 of the data for the next transmission is set so as to cause the results of detection by an optional lower-stage cassette size 0 sensor, an optional lower-stage cassette size 1 sensor, an optional lower-stage cassette size 2 sensor, and an optional lower-stage sheet-detecting sensor to be outputted as the signals R-IN 26 to R-IN 29 when the data for the next transmission is transmitted (step S422).

When the data for the next transmission assumes "0" (YES to S423), it is unnecessary to detect the state of the sensor B group 209, and therefore only the data of the sensor A group 208 whose state has been changed is updated, and the power supply P5VC is turned off (step S424), followed by terminating the status acquisition/determination process. Execution of this step S424 makes it possible to achieve control for conserving power supply required for status updating, after completion of the status updating, thereby further reducing power consumption.

When the data for the next transmission assumes a value other than "0" (N0 to S423), it is necessary to detect the state of the sensor B group 209, and hence a secondary status acquisition/determination process is executed in steps S425 et seq. Thus, through execution of the determination process in the step S423, the data of the sensor B group 209 is collected in a manner interlocked with the opening of the door being detected in the step S412 or the open/closed state of a cassette having been changed, so that efficient collection of status data can be achieved. On the other hand, when there is a high probability that the data of the sensor B group 209 is unnecessary, status collection from the sensor B group 209 is not carried out, which contributes to further reduction of power consumption.

First, thirty-two clock signals clk are outputted via the SCLK signal line, whereby the above described data for the next transmission is transmitted as 32-bit data (step S425) (data received at this time is invalid, and therefore discarded). Then, the LOAD signal is switched to low (step S426), and after 100 μsec. is waited (step S428), the LOAD signal is switched to high (step S428). By this operation, output data from the serial/parallel conversion section is finally determined, and the state of the sensor B group 209 is finally determined as input data to the parallel/serial conversion section. Then, thirty-two clock signals clk are outputted again via the SCLK signal line, and 32-bit data is received (step S429), whereby the status of the sensor B group 209 is acquired.

The data transmitted at this time is invalid data because the ON/OFF operation of the LOAD signal is not carried out.

Then, only valid status data of the received data is updated (step S430), and the steps S424 et seq. are executed, followed by terminating the status acquisition/determination process.

It should be noted that the valid data mentioned above means the bit 5 of the received data when the bit 0 of the data transmitted in the step S429 is 1, the bits 6 to 9 when the bit 1 of the transmitted data is 1, the bits 10 to 13 when the bit 2 of the transmitted data is 1, the bits 22 to 25 when the bit 17 of the transmitted data is 1, and the bits 26 to 29 when the bit 8 of the transmitted data is 1. The other bits of the transmitted data in the above-mentioned cases are all invalid data.

Further, although the status acquisition/determination process explained above with reference to the present flowchart relates to the DECON 201 and the sheet feed unit, the sub CPU is also capable of acquiring/determining the statuses of the sensor D group 217 and the sensor E group 218 via the RCON 216 in the same manner. When the status acquisition/determination process related to the DECON 201 and the sheet feed unit is executed, the status acquisition/determination via the RCON 216 is also executed simultaneously.

Thus, according to the flowcharts in FIGS. 13, 14, it is possible to shift the power supply P5VB necessary for image formation (by the exposure mechanism 212, etc.) and sheet feeding (by the optional sheet feed unit 214, etc.) to the power-saving state, while constantly supplying the power supply P5VA necessary for detecting predetermined signals from an external device including the sub CPU.

As described above, the present embodiment enables an image forming apparatus, such as a digital multifunction machine, a copying machine, and a printer, connectable to a network to achieve further reduction of power consumption than in the prior art, and send an updated status to an external device in response to a status request from the same.

Further, the present embodiment enables an image forming apparatus, such as a digital multifunction machine, a copying machine, and a printer, provided with a plurality of sensors, to perform status response to an external device by a sub CPU that consumes less electric power than a main CPU.

Next, a second embodiment of the present invention will be described.

The second embodiment is distinguished from the above described first embodiment in which when the image forming apparatus (digital multifunction machine 101*a* (101*b*)) receives a status request from an external device via the network during the sleep mode, the sub CPU (1-chip microcomputer Q702) transmits status information to the external device in place of the main CPU (main-chip microcomputer Q701), in that only when there is any change in the status during the sleep mode, the sub CPU transmits status information to an agency server (server 101), and a status request received via the network by the image forming apparatus is responded to not by the sub CPU, but by the agency server 102.

Figure 15:
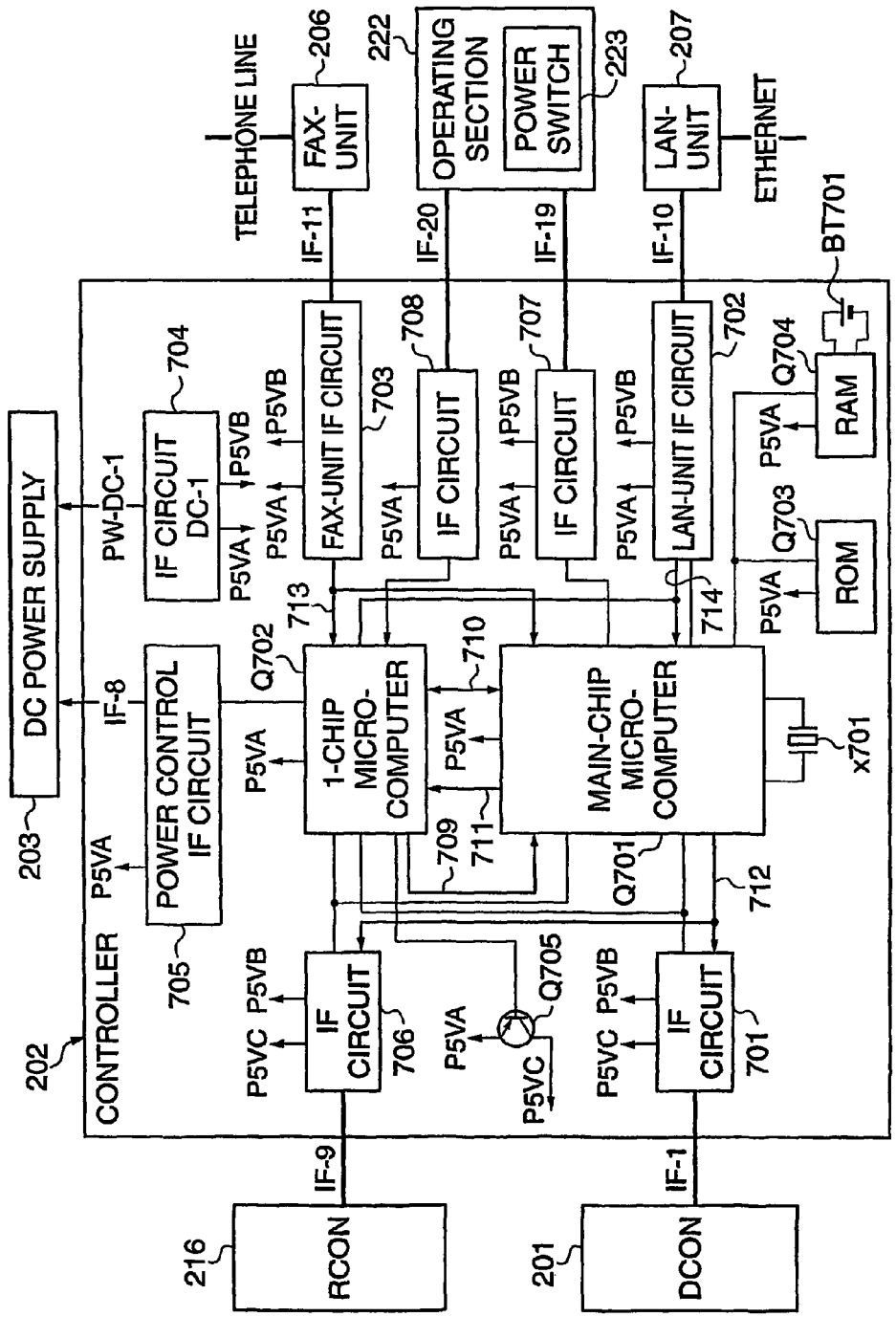
FIG. 15 is a block diagram showing the arrangement of a controller of an image forming apparatus and its related parts to which is applied a method of controlling a network system, according to a second embodiment of the present invention.

FIG. 15 is a block diagram showing details of the arrangement of a controller and its related parts of an image forming apparatus to which the method according to the second embodiment of the present invention is applied. Component parts and signals corresponding to those in FIG. 7 are designated by identical reference numerals. Hereafter, only different components and signals from those in the first embodiment will be explained, and description of the components corresponding to those in the first embodiment is omitted.

In FIG. 15, a wakeup signal 714 is outputted from the LAN-UNIT 207 to the main-chip microcomputer Q701 when the LAN-UNIT 207 has identified the IP address of the digital multifunction machine, decoded an IP packet, and recognized a "wakeup command".

In the present embodiment, in the sleep mode of the digital multifunction machine, the 1-chip microcomputer Q702 does not send a command response or status information to the LAN-UNIT 207 in place of the main-chip microcomputer Q701, but simply monitors sensor signals from the RCON 216 and the DCON 201 in the sleep state, and monitors sleep return signals from the FAX-UNIT 206 and the LAN-UNIT 207.

Further, in the present embodiment, the power supplies (P5VA, P5VB, P5VC) in FIGS. 3 to 10 are controlled according to flowcharts described in detail hereinafter with reference to FIGS. 17 to 22.

In normal operation of the main-chip microcomputer Q701, when a command requesting the status of the digital multifunction machine is detected via the LAN-UNIT 207, the status requesting command is transmitted to the main-chip microcomputer Q701 from the LAN-UNIT IF circuit 702, as in the above described first embodiment, and the main-chip microcomputer Q701 transmits a necessary status selected from status data stored in a storage section (RAM Q704) to the LAN-UNIT IF circuit 702, which in turn transfers this information to the LAN-UNIT 207 via the interface IF-10.

Further, when a print job comes from either the PC 103*a* or 103*b* on the network, a command requesting printing is transmitted to the main-chip microcomputer Q701 from the LAN-UNIT IF circuit 702, and when the printer section is made ready for printing, a response indicative of readiness for printing is transmitted from the main-chip microcomputer Q701 to the LAN-UNIT IF circuit 702, which in turn transfers this information to the LAN-UNIT 207 via the interface IF-10.

When receiving this response, the PC on the network transmits print data (image data) immediately, and the print data is inputted to the main-chip microcomputer Q701 in the same signal flow as described above. After being subjected to necessary image processing by the main-chip microcomputer Q701, the print data is temporarily stored in the RAM Q704. Then, similarly to the processing for image recording, the image data is sent as an image signal via the interface IF-1 to the DCON 201, and recorded in the image forming section.

The above description was given of a case where the main-chip microcomputer Q701 is in normal operation, but the operation of the main-chip microcomputer Q701 in the sleep mode is a little different.

Figure 16:
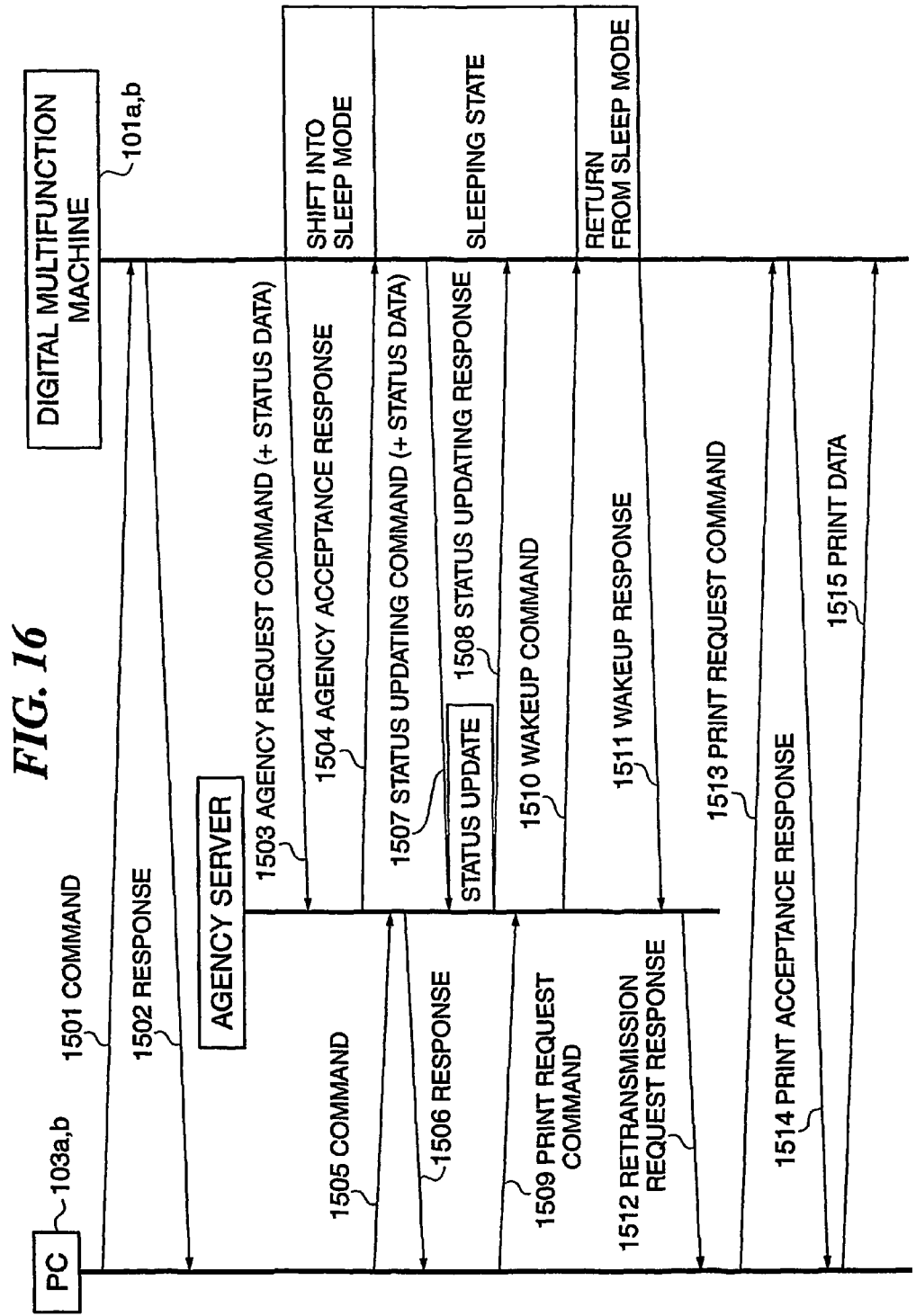
FIG. 16 is a diagram showing exchange of command responses between a PC 103a (103b) and a digital multifunction machine 101a (101b) on an Ethernet 104 as a network.

In the sleep mode, as shown in FIG. 16, referred to hereinafter, exchange of commands via the network is performed by the agency server 102. The agency server 102 is on a workstation as a network system, similarly to the server 102 connected to the network shown in FIG. 1. The agency server 102 having accepted an "agency request command" from the digital multifunction machine 101*a* or 101*b* responds to a command transmitted to the digital multifunction machine 101*a* or 101*b* in place of the same.

Address information and status information of the digital multifunction machine 101*a*, 101*b* are delivered to the agency server 102 together with the above-mentioned agency request command. However, when the status of the digital multifunction machine 101*a* (101*b*) has changed, the digital multifunction machine 101*a* (101*b*) informs the agency server 102 of a status thereof after the change.

When the main-chip microcomputer Q701 is in the sleep state, it cannot transmit or receive signals, and therefore the 1-chip microcomputer Q702 receives status information from the RCON 216 via the IF circuit 706 and from the DCON 201 via the IF circuit 701, for monitoring thereof.

When the status of the digital multifunction machine 101*a* (101*b*) has changed, the 1-chip microcomputer Q702 outputs the interrupt signal (NMI) 709 to the main-chip microcomputer Q701, as described hereinabove, to once return the main-chip microcomputer Q701 from the sleep state.

When confirming from the ACTIVE signal 711 that the main-chip microcomputer Q701 has returned from the sleep state, the 1-chip microcomputer Q702 transmits the status information to the main-chip microcomputer Q701 via the serial communication line 710. When receiving the status information, the main-chip microcomputer Q701 delivers the status information not only to the agency server 102 but also to the LAN-UNIT IF circuit 702. The LAN-UNIT IF circuit 702 delivers the received status information to the LAN-UNIT 207, and then the LAN-UNIT 207 transmits the updated status information to the agency server 102. Thus, the status information of the digital multifunction machine 101a (101b) stored in the agency server 102 is updated. When the digital multifunction machine 101a (101b) has been returned from the sleep state due to a change in the status during the sleep mode, the digital multifunction machine 101a (101b) delivers a status updating command together with the status information to the agency server 102, and then returns to the sleep state.

When the digital multifunction machine 101a (101b) is returned from the sleep state e.g. due to generation of a print job therefor in the sleep mode, the wakeup command is delivered to the LAN-UNIT 207 from the agency server 102. When recognizing the wakeup command, the LAN-UNIT 207 delivers the wakeup signal 714 to the LAN-UNIT IF circuit 702, and the LAN-UNIT IF circuit 702 having received the wakeup signal 714 sends the wakeup signal 714 to the 1-chip microcomputer Q702 and the main-chip microcomputer Q701.

Responsive to the wakeup signal 714, the 1-chip microcomputer Q702 turns on the power supply and returns the main-chip microcomputer Q701 from the sleep state, similarly to the case where the 1-chip microcomputer Q702 receives the FAX start signal from the FAX unit 206 via the FAX-UNIT IF circuit 703, to thereby enable the main-chip microcomputer Q701 to respond to the command from the LAN-UNIT 207. More specifically, the 1-chip microcomputer Q702 instructs the power control IF circuit 705 to turn on the power supplies which have been in the OFF state in the sleep mode. The power control IF circuit 705 delivers the power-on signal to the DC power supply 203. At the same time, the 1-chip microcomputer Q702 outputs the interrupt signal (NMI) 709 to the main-chip microcomputer Q701, and responsive to the NMI 709, the main-chip microcomputer Q701 shifts from the sleep state to the normal state.

Although in the above description, the wakeup signal 714 is inputted to both the 1-chip microcomputer Q702 and the main-chip microcomputer Q701, the digital multifunction machine may be configured such that the wakeup signal 714 is inputted to the 1-chip microcomputer Q702 alone, and the 1-chip microcomputer Q702 notifies the main-chip microcomputer Q701 via the serial communication line 710 that the digital multifunction machine has been instructed to be started by the wakeup signal 714.

In the following, commands and responses exchanged between the digital multifunction machine 101a (101b) in the sleep mode and the agency server 102 and the PC 103a (103b) on the network will be described with reference to FIG. 16.

FIG. 16 is a diagram showing the exchange of the commands and responses between the PC 103a (103b) and the digital multifunction machine 101a (101b) on the Ethernet 104 as a network including the agency server 102.

In the normal mode, when a command 1501, such as a command requesting the status of the digital multifunction machine 101a (101b) or a print job request, is outputted from the PC 103a (103b) to the digital multifunction machine 101a (101b), the digital multifunction machine 101a (101b) transmits a response 1502 in response to the command 1501.

In the present embodiment, in shifting to the sleep state, the digital multifunction machine 101a (101b) outputs an agency request command 1503 to the agency server 102 basically via the Ethernet 104. At this time, status data (sensor information, etc.) of the digital multifunction machine 101a (101b) is also sent to the agency server 102 together with the command 1503.

Responsive to the agency request command 1503, the agency server 102 stores the status information of the digital multifunction machine 101a (101b) in an internal storage, and prepares for performing operation as the agency server 102. When made ready, the agency server 102 transmits an agency acceptance response 1504 to the digital multifunction machine 101a (101b). When receiving the agency acceptance response 1504, the digital multifunction machine 101a (101b) enters the sleep state. From then on, the digital multifunction machine 101a (101b) does not respond to the command 1505 issued to it, but the agency server 102 responds to the command to the digital multifunction machine 101a (101b) by transmitting a response 1506 on its behalf.

If there is any change in the status of the digital multifunction machine 101a (101b) in the sleep mode, the digital multifunction machine 101a (101b) once returns from the sleep state to send updated status information to the agency server 102 together with a status updating command 1507. Responsive to the status update command 1507, the agency server 102 updates the status information stored in the internal storage, and when the status updating is completed, transmits a status updating response 1508 to the digital multifunction machine 101a (101b). When receiving the status updating response 1508, the digital multifunction machine 101a (101b) enters the sleep state again.

In the case where the agency server 102 receives a command, such as a print request command 1509, requiring operation of the digital multifunction machine 101a (101b) when the digital multifunction machine 101a (101b) is in the sleep mode, the agency server 102 delivers a wakeup command 1510 to the digital multifunction machine 101a (101b).

Responsive to the wakeup command 1510, the digital multifunction machine 101a (101b) returns from the sleep state, and makes itself ready for receiving a command via Ethernet 104, whereupon the digital multifunction machine 101a (101b) transmits a wakeup response 1511 to the agency server 102. When receiving the wakeup response 1511, the agency server 102 transmits a command retransmission request response 1512 for requesting retransmission of the command to a PC that transmitted the command. This command retransmission request response 1512 is transmitted for the digital multifunction machine 101a (101b) to receive a command, such as a print request command.

The PC 103a (103b) that transmitted the print request command 1513 again transmits the print request command 1513 to the digital multifunction machine 101a (101b) in response to the command retransmission request response 1512. The digital multifunction machine 101a (101b) transmits a print acceptance response 1514 to the PC 103a (103b) that transmitted the print request command 1513, in response to the print request command 1513. From then on, normal print job exchange is performed.

Although FIG. 16 illustrates, by way of example, general commands for convenience of description, timing for transmission of commands and responses and the contents of the commands and responses are not limited to the illustrated example.

With the arrangement of the digital multifunction machine described above, the shift to the sleep state and the return to the normal state, and monitoring of the statuses of the DCON 201 and the RCON 216, and status transmission to the agency server 102, in the sleep mode are controlled by the 1-chip microcomputer Q702 (hereinafter referred to as the sub CPU) and the main-chip microcomputer Q701 (hereinafter referred to as the main CPU). In the following, the operations of these CPUs will be described with reference to flowcharts shown in FIGS. 17 to 22.

Figure 17:
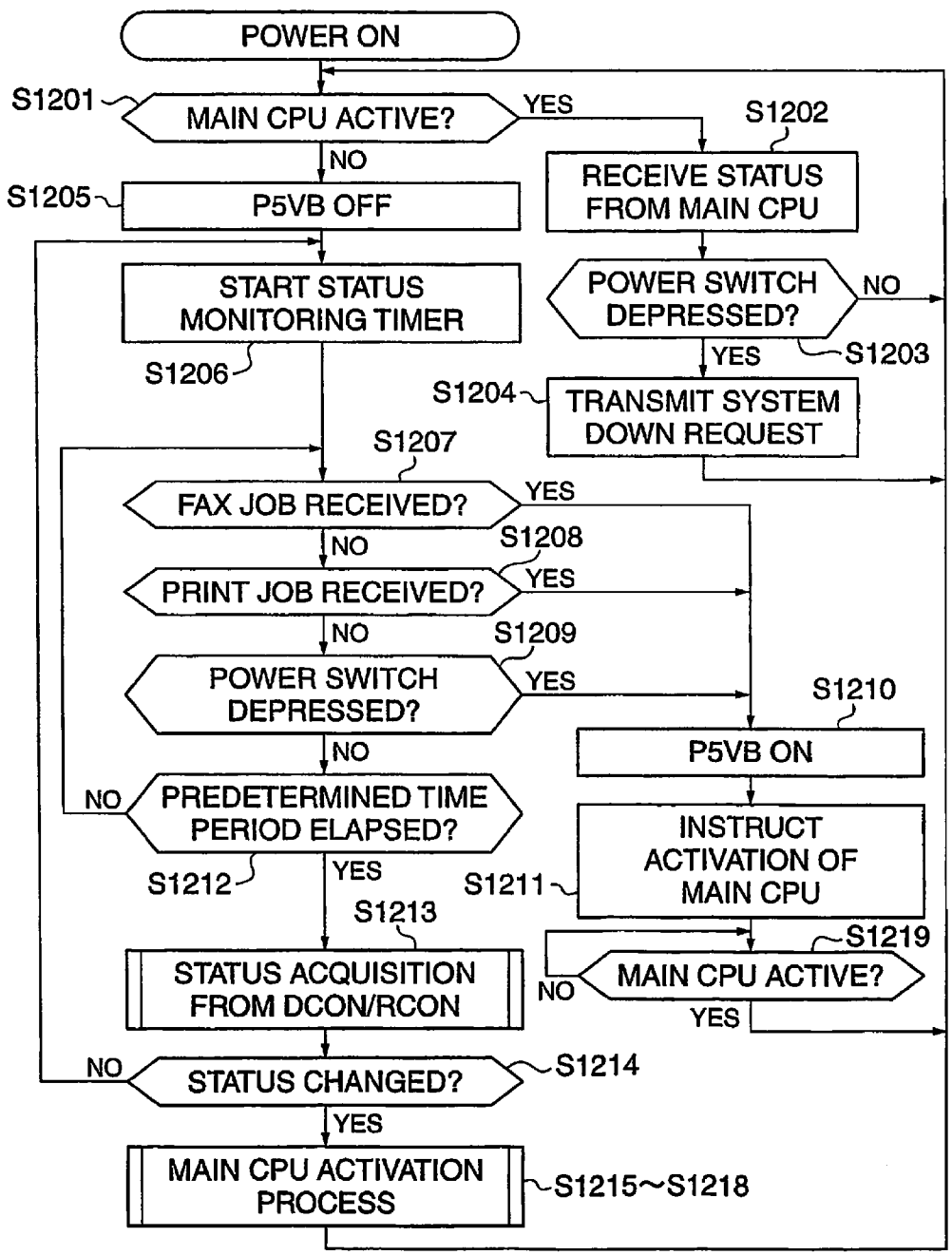
FIG. 17 is a flowchart showing an example of a procedure of control operations carried out by a sub CPU, to which is applied the method according to the second embodiment.
Figure 18:
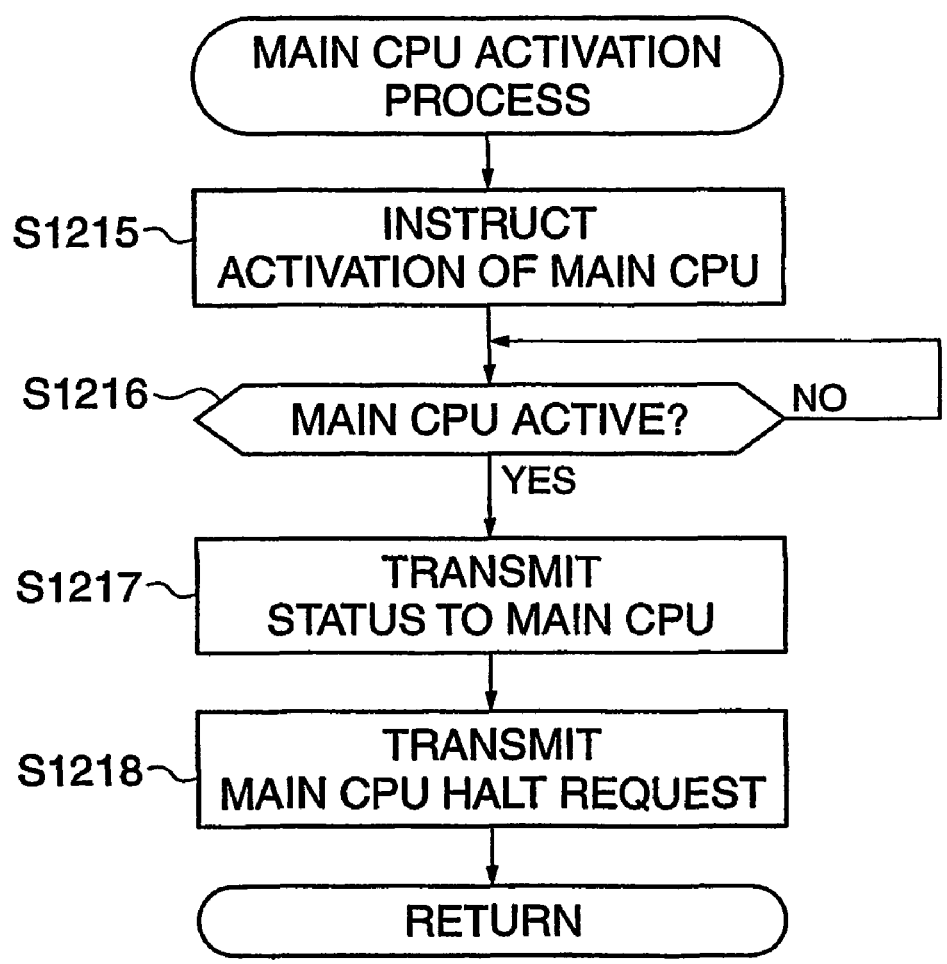
FIG. 18 is a flowchart showing a main CPU activation process executed in steps S1215 to S1218 in FIG. 17.

FIGS. 17, 18 are a flowchart showing an example of a procedure of control operations executed by the sub CPU, based on a program stored in a ROM, not shown, or another storage medium, not shown.

The sub CPU is connected to the power supply P5VA of the DC power supply 203, for constant operation. The operation of the sub CPU is broadly divided into an operation in the sleep mode as a halt state in which the main CPU is inoperative, and an operation in the normal mode in which the main CPU is performing normal operation.

First, a description will be given of the operation in the normal mode. Description of processing similar to that in the flowchart shown in FIG. 11 is omitted.

Processing in steps S1201 to S1209, and steps S1210, S1211 and S1219 are the same as processing in the steps S201 to S209 and the steps S211 to S213 in FIG. 11. When the ACTIVE signal is turned on in the step S1219, the process returns to the step S1201. Thus, the main CPU shifts to the normal state.

On the other hand, when the power switch 223 has not been depressed in the step S1209, it is determined whether or not the status monitoring timer has counted up 100 msec. (step S1212), and until 100 msec. is counted up, monitoring operation in the steps S1207 et seq. is repeatedly carried out. When the status monitoring timer has counted up 100 msec. (YES to step S1212), statuses are acquired from the DCON 201 and the RCON 216 (step S1213). This operation for status acquisition will be described in detail hereinafter with reference to FIGS. 20 to 22.

The statuses acquired in the step S1213 are compared with the statuses (statuses before a shift to the sleep mode) received from the main CPU in the step S1202, whereby it is determined whether or not there is any change in the status of the digital multifunction machine (step S1214). If it is determined in the step that there is no change in the status of the digital multifunction machine (N0 to S1214), the process returns to the step S1206, wherein periodical monitoring of status reception, a job request, and the power switch is repeatedly carried out.

On the other hand, if it is determined in the step S1214 that there is any change in the status (YES to S1214), a main CPU activation process is executed in the following steps S1215 et seq. (see FIG. 18).

First, the interrupt signal 709 for activating the main CPU is turned on (step S1215), whereafter activation of the main CPU (turning on of the ACTIVE signal) is awaited (step S1216), and the statuses received from the DCON 201 and the RCON 216 in the step S1213 are transmitted to the main CPU (step S1217). Further, the sub CPU requests the main CPU to shift to the halt state (step S1218), and then the process returns to the step S1201, wherein another shift of the main CPU to the sleep state (turning off of the ACTIVE signal) is awaited. The transmission of the statuses and transmission of the request for a shift to the halt state are performed via the serial communication line 710 between the sub CPU and the main CPU.

According to the flowchart in FIGS. 17, 18, the power supply P5VB can be saved unless processing for image formation or detection of depression of the power switch 223 or the like is performed. Further, the status acquisition process in the step S1217 for updating the statuses to be transmitted to the agency server 102 is also carried out in a power-saving manner.

Figure 19A:
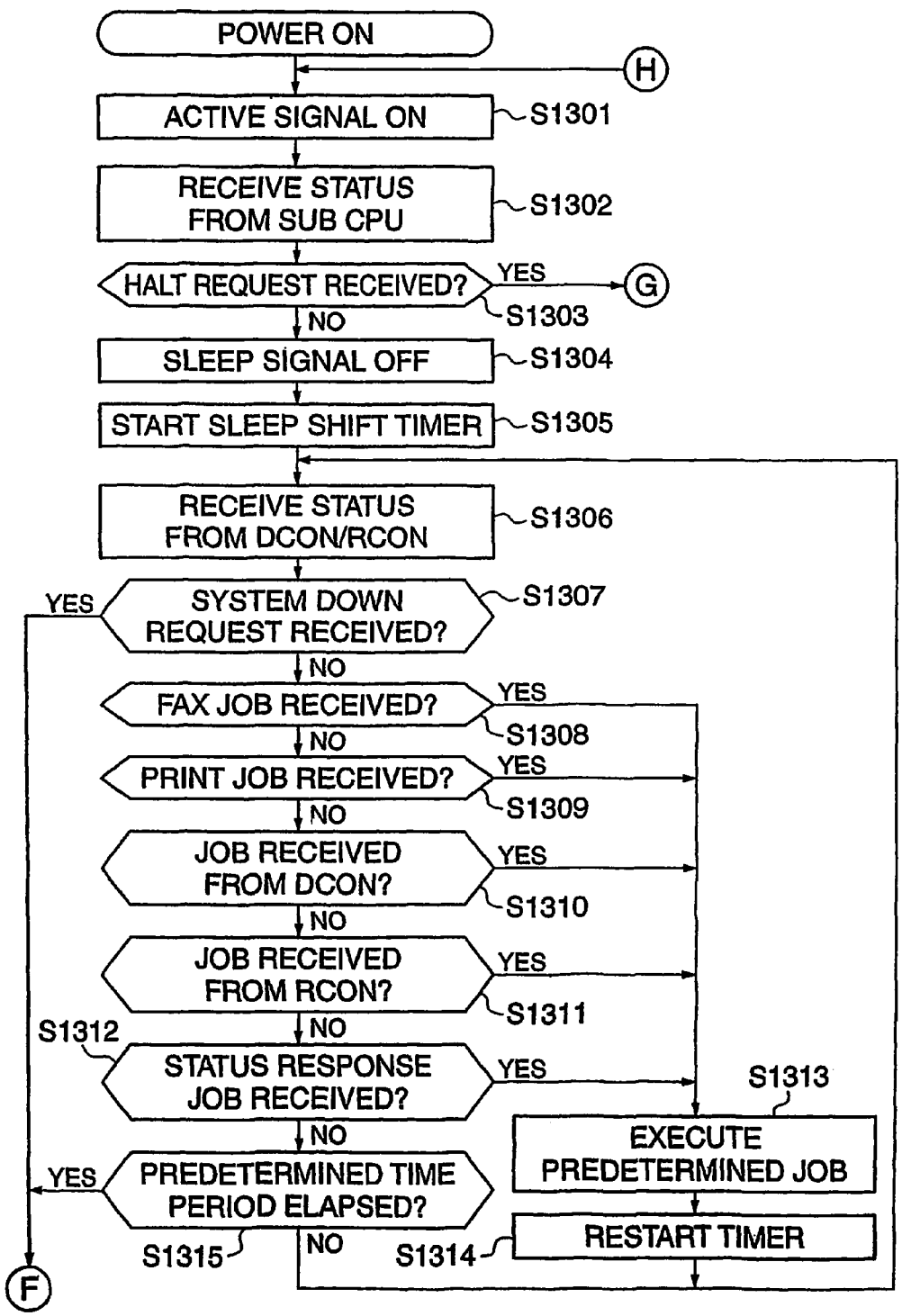
FIG. 19A and FIG. 19B are flowchart showing an example of procedure of control operations carried out by main CPU, to which is applied the method according to the second embodiment.
Figure 19B:
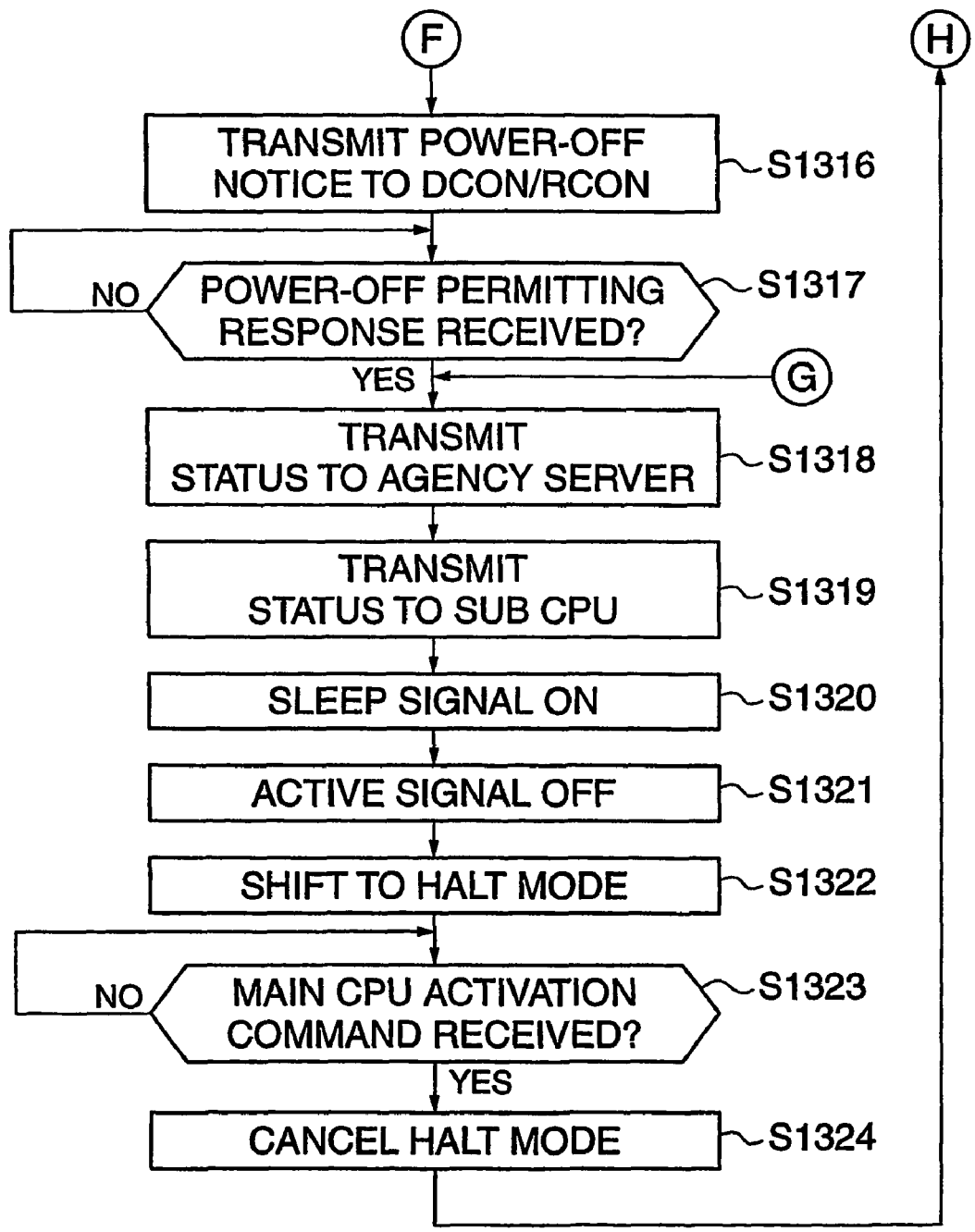

FIG. 19A and FIG. 19B are flowchart showing an example of a procedure of control operations executed by the main CPU according to the present embodiment, based on a program stored in a ROM, not shown, or another storage medium, not shown.

Similarly to the sub CPU, the main CPU is connected to the power supply P5VA of the DC power supply 203, for constant operation, but the operation of the main CPU is broadly divided into an operation in the sleep mode as a halt state in which the CPU clock X701 is inoperative, and an operation in the normal mode in which all the operations of the present system, including FAX transmission/reception, printing, scanning, and response to s status inquiry (request) from an external device, are enabled. Description of processing similar to that in the flowchart in FIG. 12A and FIG. 12B is omitted.

When the main CPU has shifted to the normal state (from the halt state), first, the ACTIVE signal 711 is turned on (step S1301). As described hereinbefore, this operation brings the sub CPU into the normal state. Then, the statuses of the DCON 201 and the RCON 216 in the halt mode are received from the sub CPU (step S1302). Then, it is determined whether or not a HALT request has been issued from the sub CPU (step S1303). If a HALT request has been issued from the sub CPU, processing for a shift to the sleep state is carried out in steps S1318 et seq., described in detail hereinbelow.

On the other hand, if the HALT request has not been received in the step S1303, it is judged, as described hereinbefore, that depression of the power switch 223 or a FAX or print request has been detected by the sub CPU, and a start request has been issued to the main CPU, normal processing is carried out in steps S1304 et seq.

Processing in steps S1304 to S1317 is identical with that in the steps S303 to S316 in FIG. 12A and FIG. 12B.

Next, the processing for a shift to the sleep state, which is carried out in the steps S1318 et seq., will be described. This processing for a shift to the sleep state is carried out when the HALT request has been received from the sub CPU (YES to S1303), when the SYSTEM DOWN request has been received from the sub CPU (YES to S1307), or when the main CPU has itself shifted to the sleep state after the predetermined time period has been counted up by the sleep shift timer (YES to S1315). First, a status transmission process for transmitting the status to the agency server 102 is executed (step S1318). In the status transmission process, transmission of the agency request command 1503 (see FIG. 16) to the agency server 102, reception of the agency acceptance response 1504, transmission of the statuses of the DCON 201 and the RCON 216 are sequentially executed. When status transmission is executed in response to the HALT request, the statuses of the DCON 201 and the RCON 216 transmitted in the step S1318 are the statuses received from the sub CPU in the step S1302, and when status transmission is executed for the other reasons, the statuses are the latest ones received from the microcomputers Q301 and Q901 in the step S1306.

Then, the same statuses of the DCON 201 and the RCON 216 are transmitted to the sub CPU (step S1319). As described hereinbefore, these statuses are stored in the sub CPU to set a reference status of the digital multifunction machine with reference to which, after the shift of the main CPU to the sleep state, it is determined whether or not there is any change in the status of the digital multifunction machine.

Processing in steps S1320 to S1324 is identical with that in the steps S318 to S322 in FIG. 12A and FIG. 12B.

Next, the operation of the sub CPU for acquiring the status from the DCON 201 in the sleep mode will be described with reference to a flowchart shown in FIGS. 20 to 22.

Figure 20A:
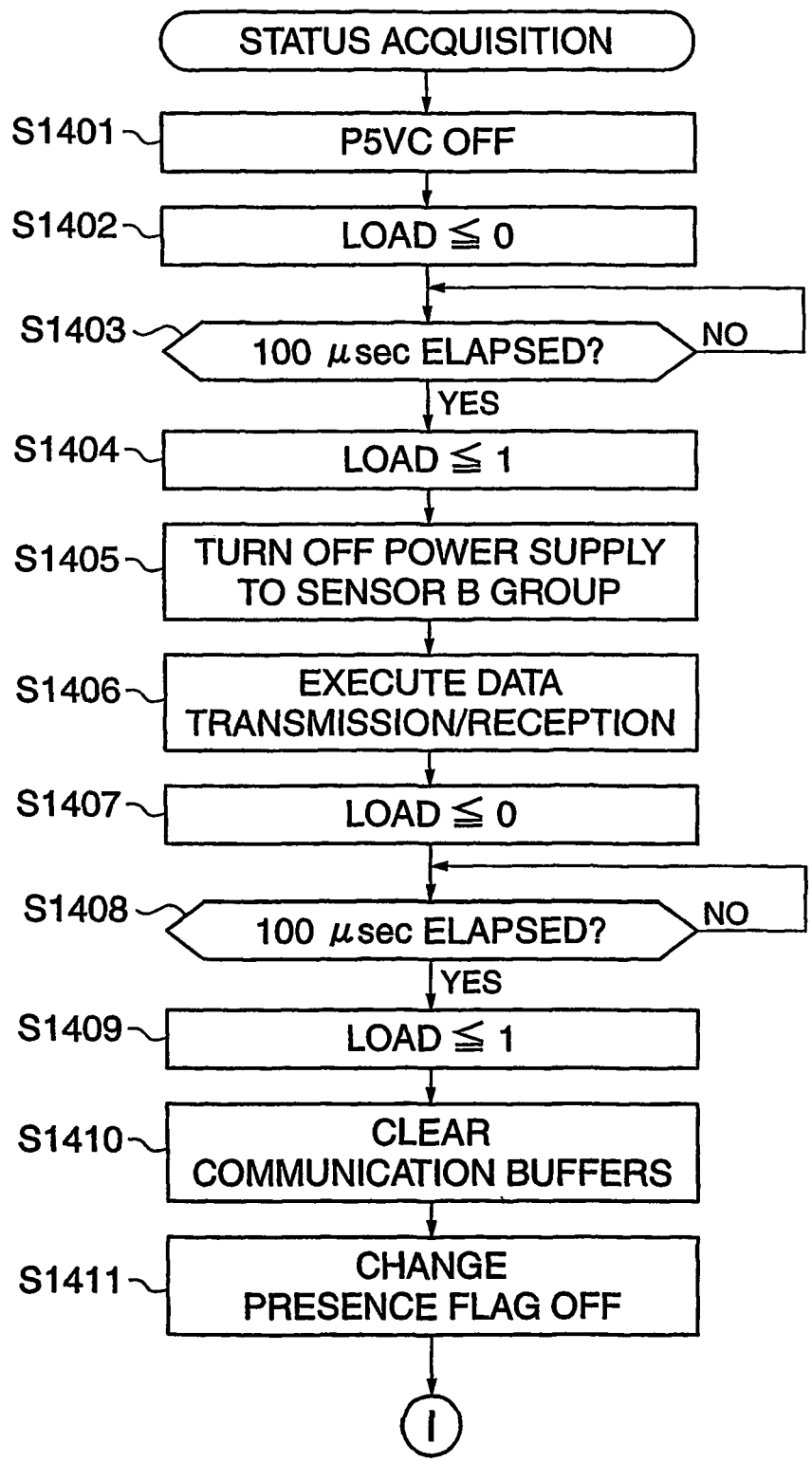
FIG. 20A and FIG. 20B are flowchart showing a status acquisition process executed in a step S1213 in FIG. 17.
Figure 20B:
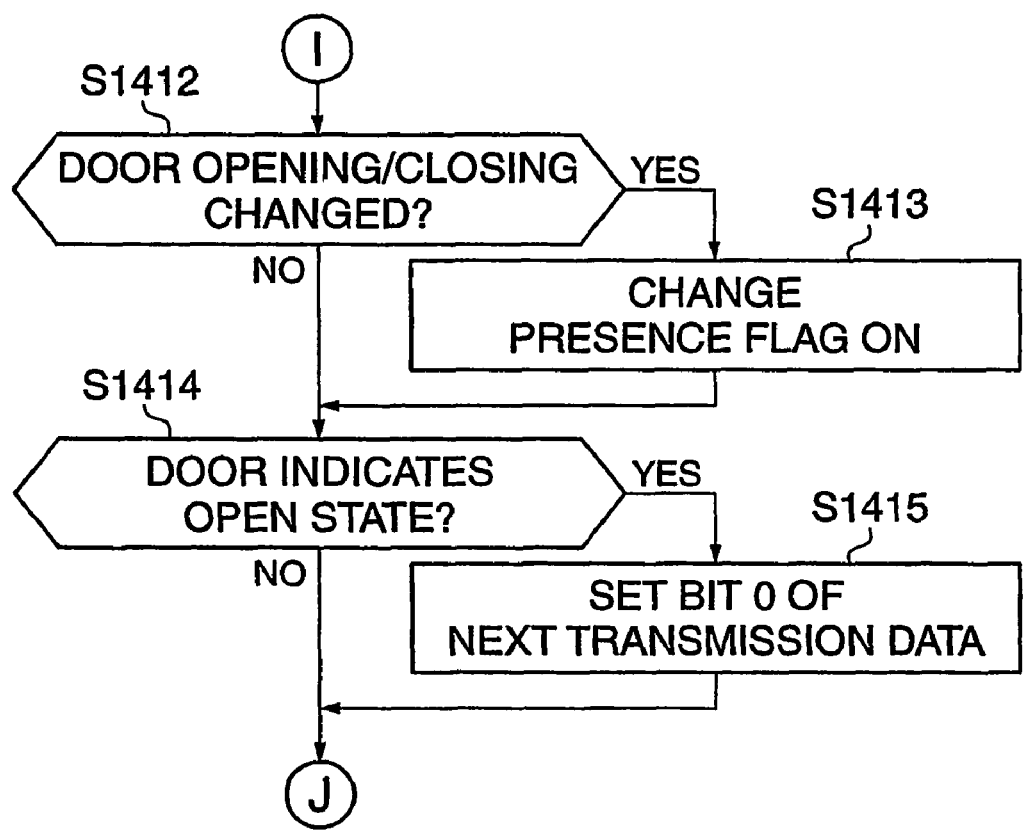
Figure 21A:
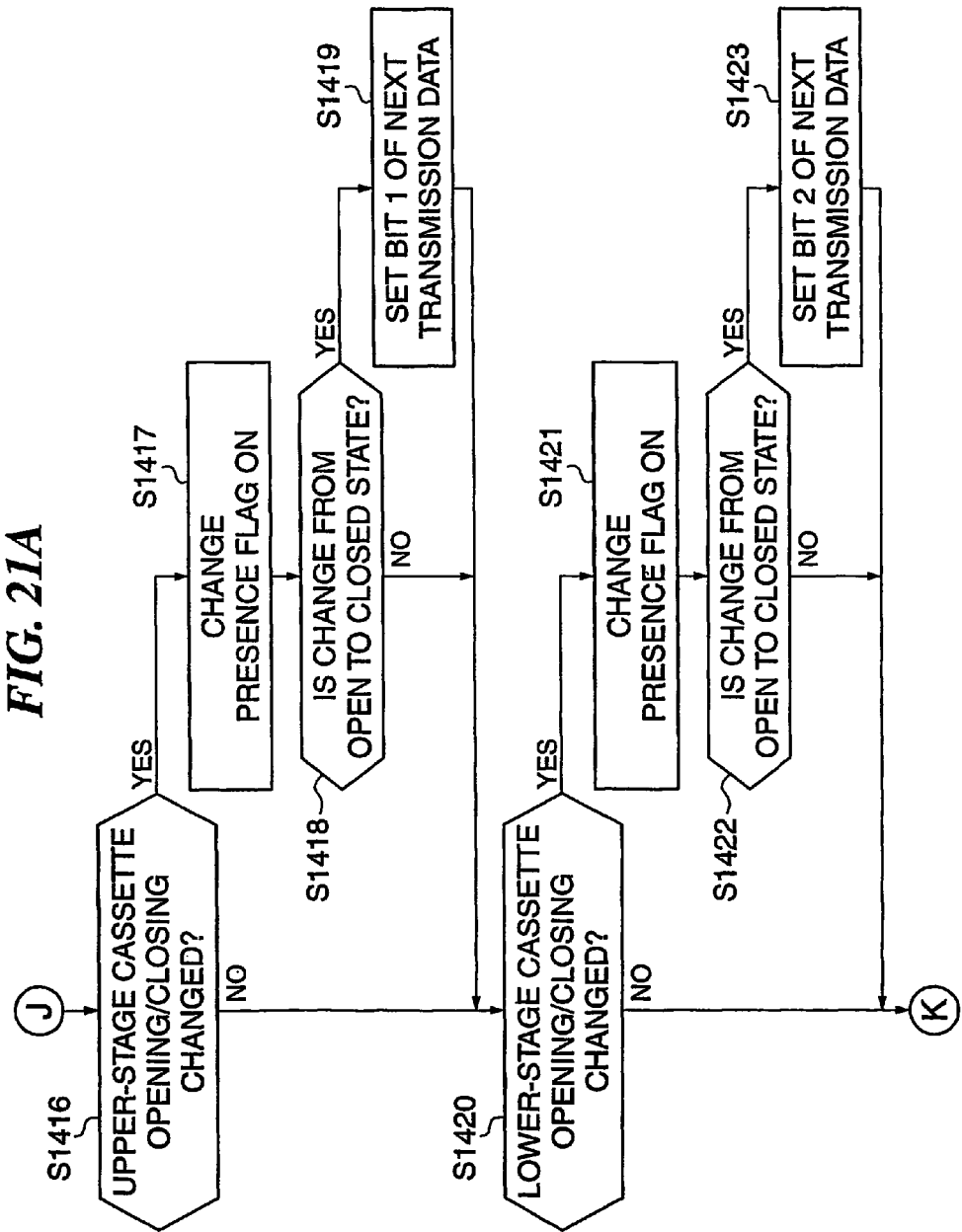
FIG. 21A to FIG. 21C are flowchart of a continued part of the status acquisition process executed in the step S1213 in FIG. 17.
Figure 21B:
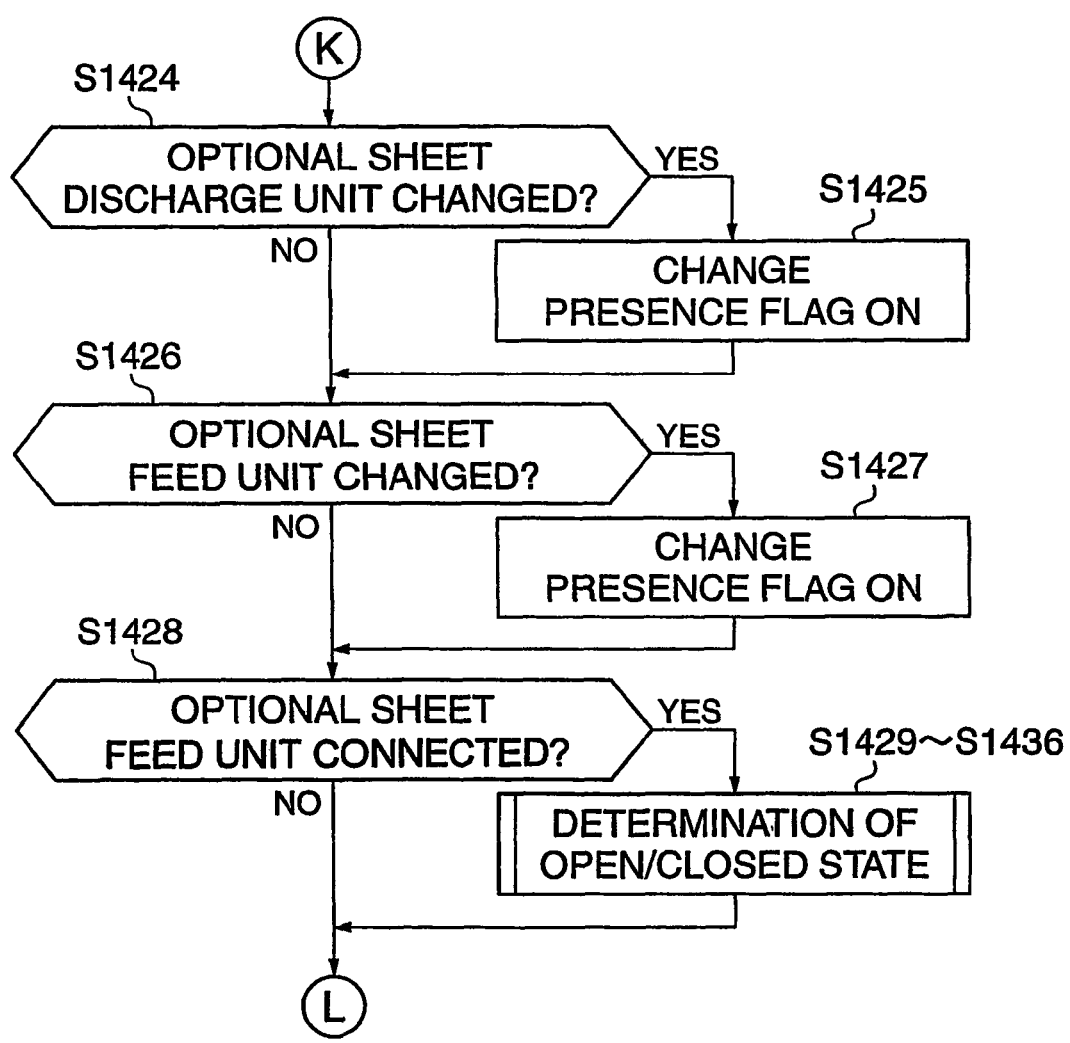
Figure 21C:
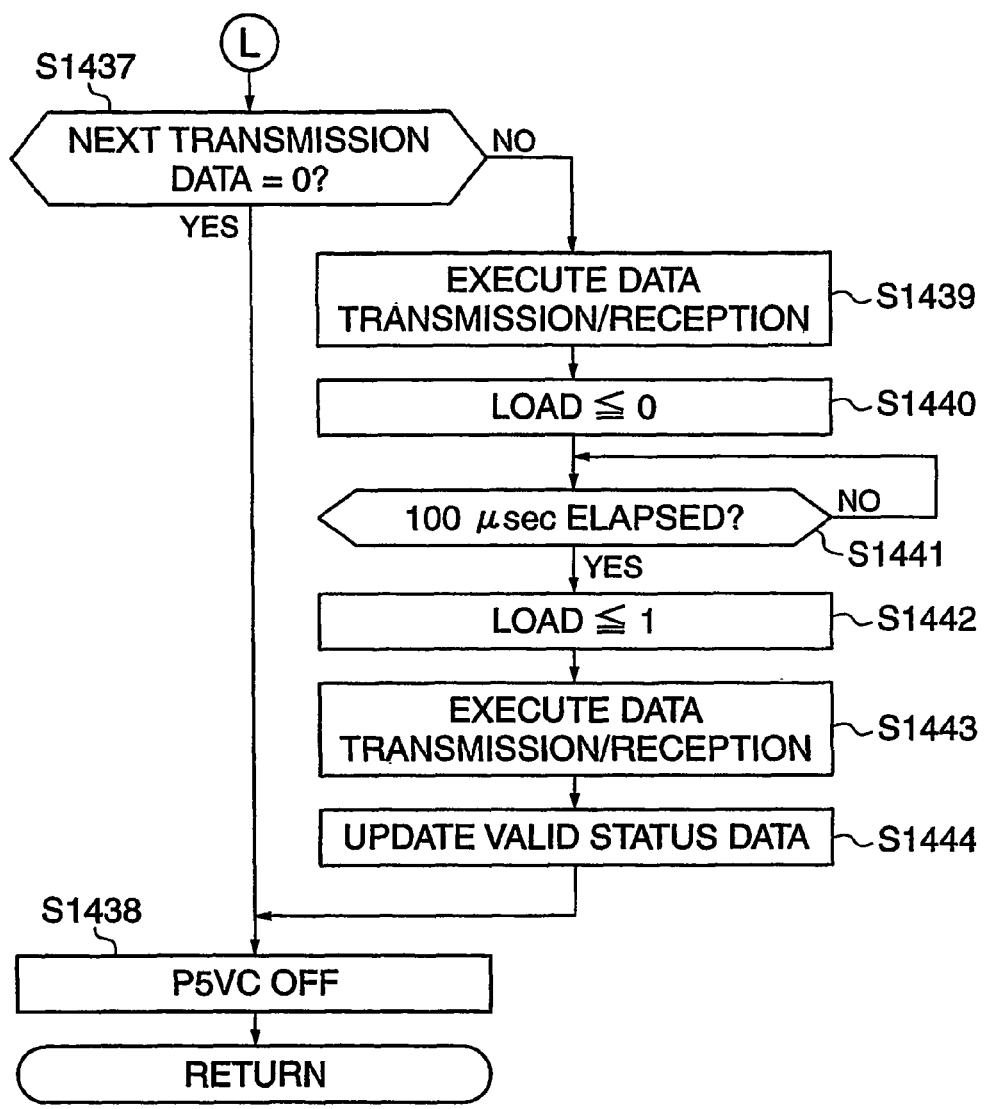
Figure 22:
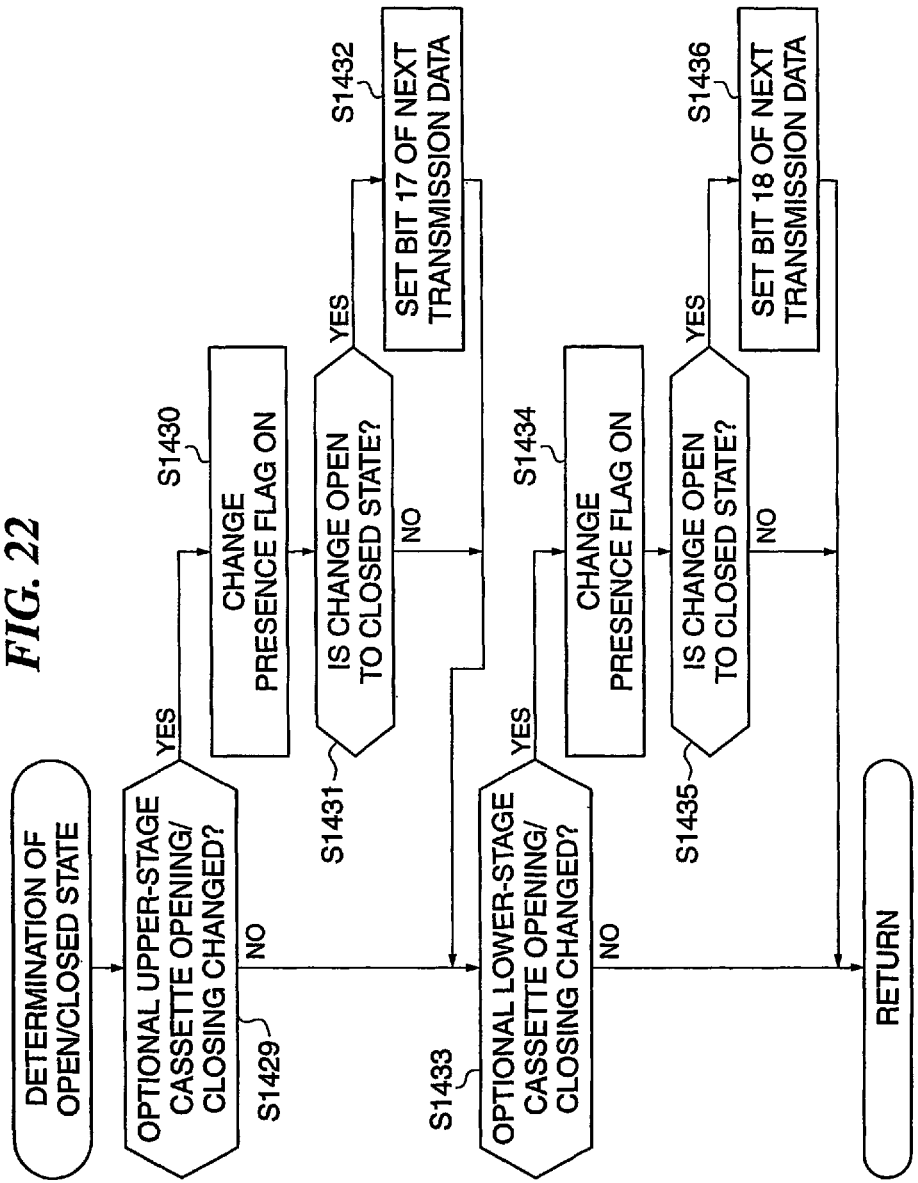
FIG. 22 is a flowchart showing an opening/closing determination process executed in steps S1429 to S1436 in FIG. 21A to FIG. 21C.
Figure 24:
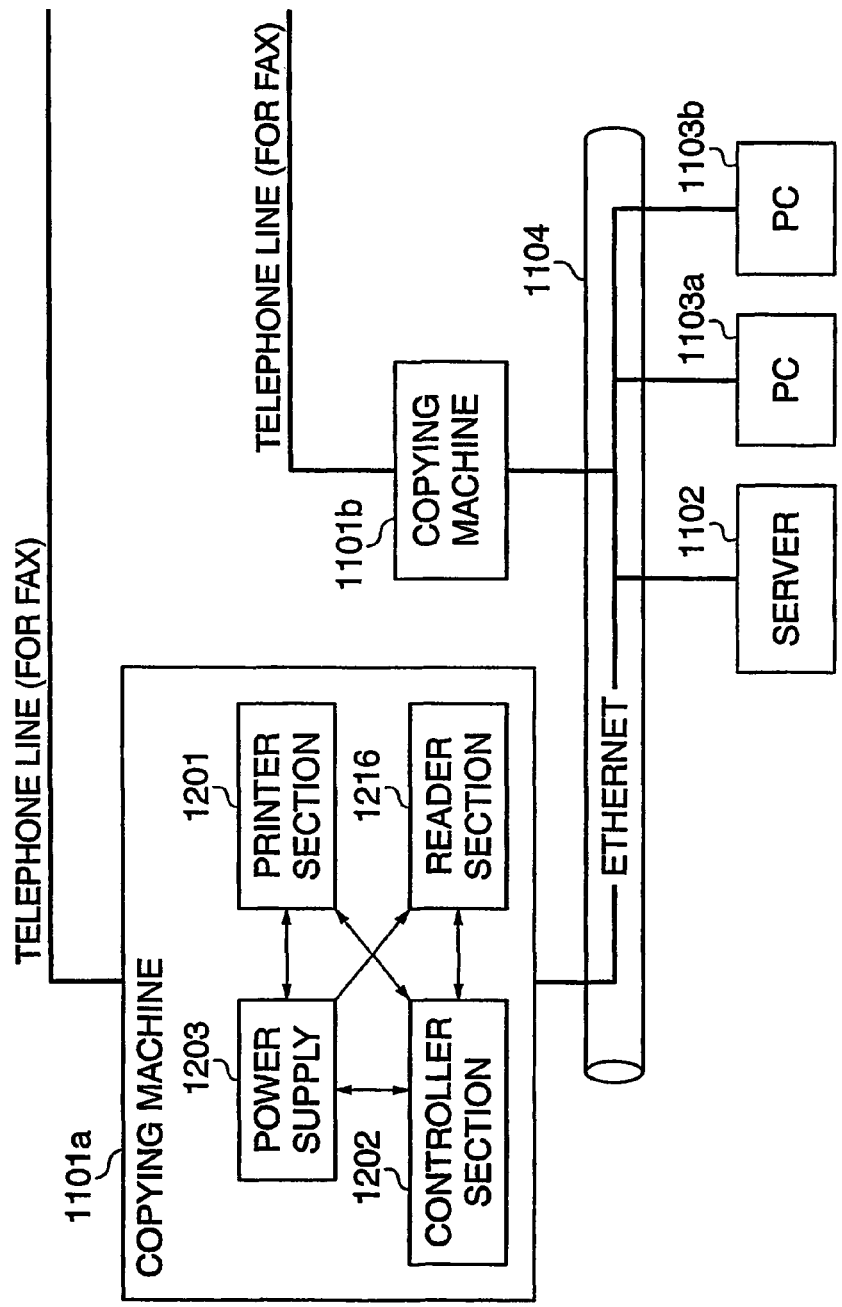
FIG. 24 is a block diagram showing an example of the configuration of a conventional network system.

The flowchart of FIGS. 20 to 22 shows an example of control operations (detailed procedure of the status acquisition process in the step S1213 in FIG. 17) executed by the sub CPU, based on a program stored in a ROM, not shown, or another storage medium, not shown. Description of processing similar to that in the flowchart in FIG. 13A and FIG. 13B is omitted.

Figure 13A:
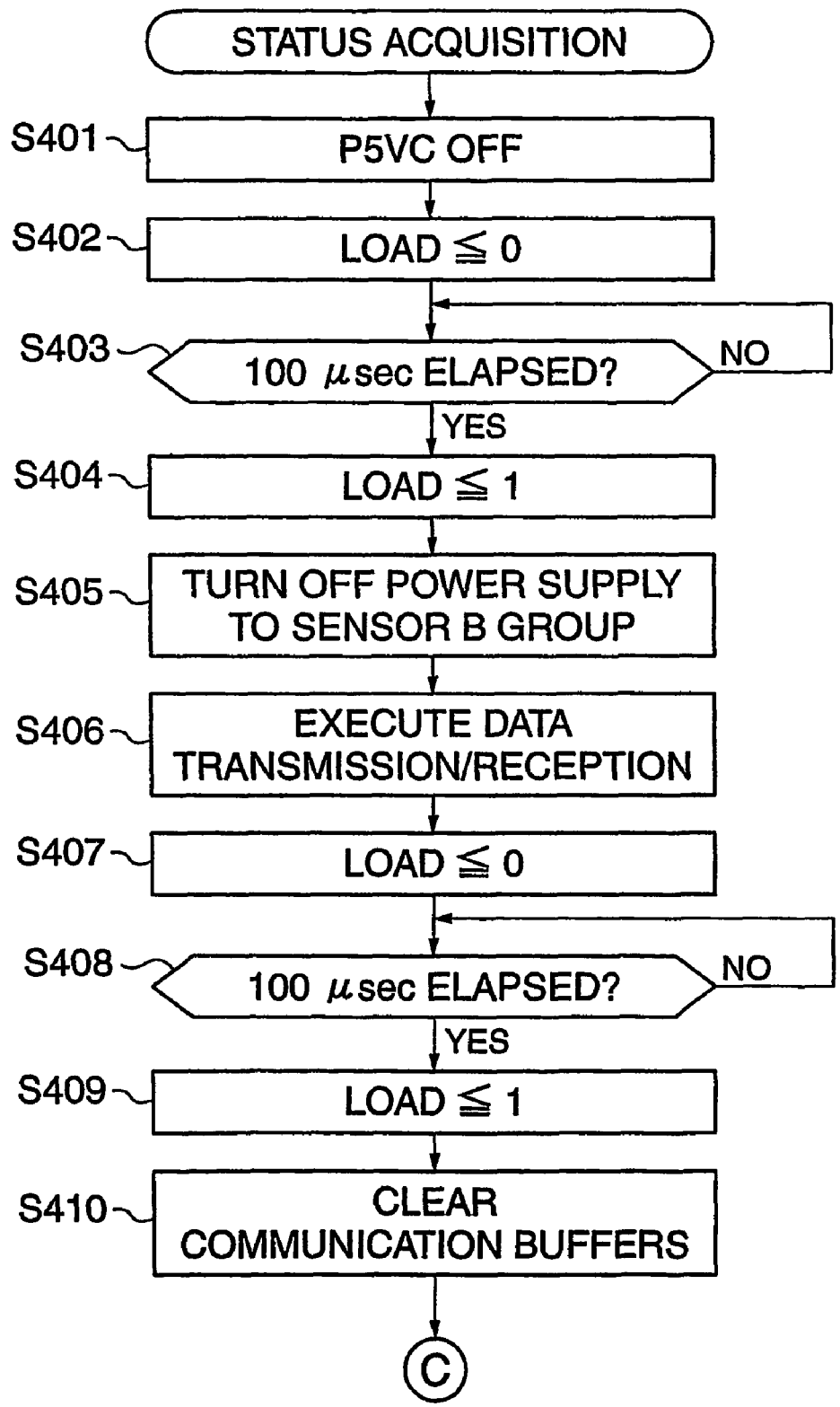
FIG. 13A and FIG. 13B are flowchart showing a status acquisition process executed in a step S217 in FIG. 11.
Figure 13B:
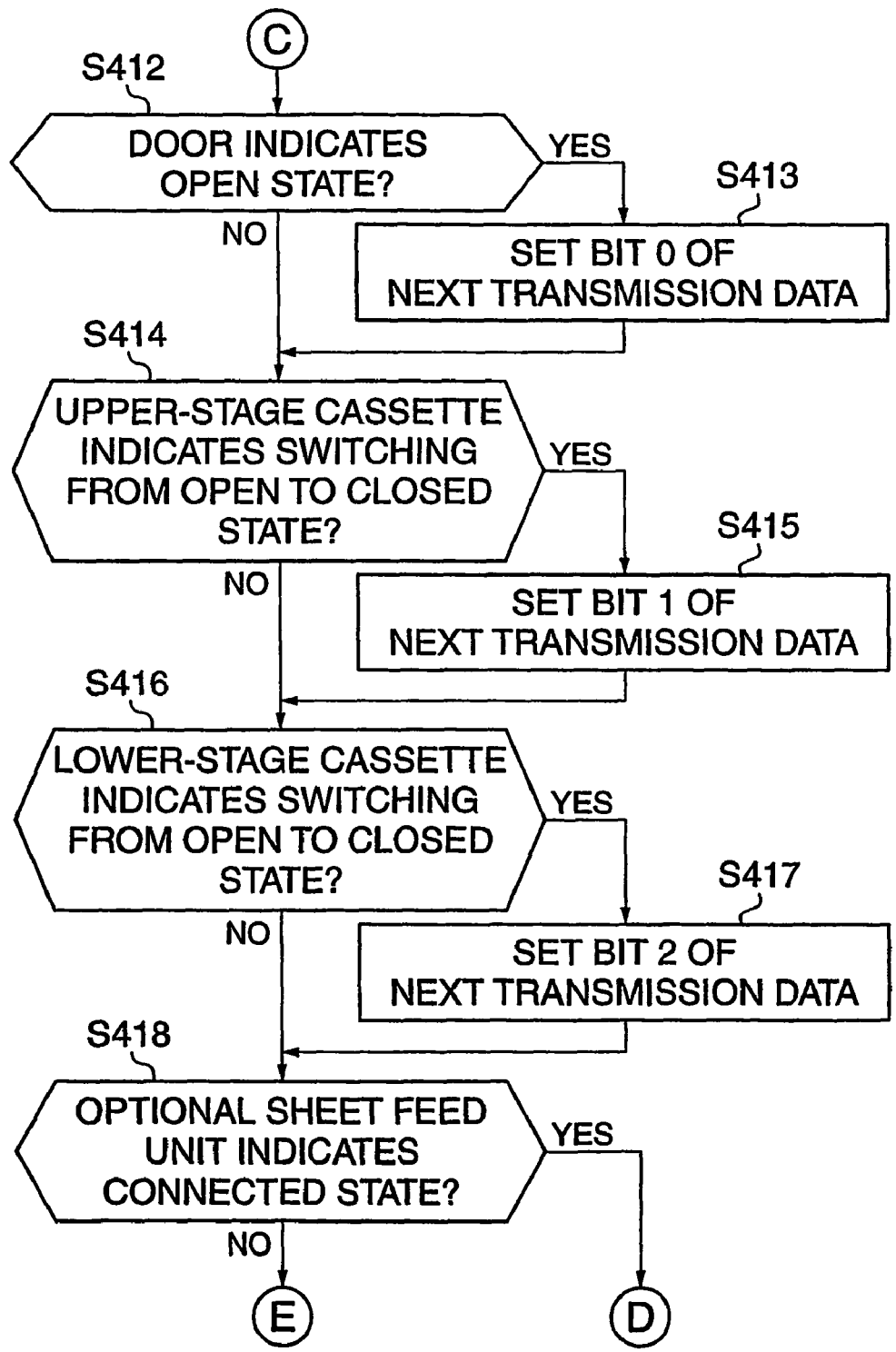

Processing in steps S1401 to S1410 is identical with that in the steps S401 to S410 in FIG. 13A and FIG. 13B. In the present embodiment, after data for the next transmission is cleared to 0 in the step S1410, a change presence flag indicative of the presence of a change in the status is turned off, whereby the data for the next transmission is initialized (step S1411).

Then, the received status of the sensor A group is compared with the latest status thereof already acquired.

The bit 0 (R-IN 0) of the received data is indicative of the state of the door opening/closing-detecting switch SW501. When there is a change in the state of the door opening/closing-detecting switch SW501 (YES to S1412), the change presence flag is turned on (step S1413). Further, when the door opening/closing-detecting switch SW501 is in the open state (YES to S1414), the value of the bit 0 of the data for the next transmission is set to 1 so as to output the result of detection by the cartridge-detecting sensor Q607 as the signal R-IN 5 when the data for the next transmission is transmitted (step S1415).

The bit 1 (R-IN 1) of the received data is indicative of the state of the upper-stage cassette opening/closing-detecting switch SW502. When there is a change in the state of the upper-stage cassette opening/closing-detecting switch SW502 (YES to S1416), the change presence flag is turned on (step S1417). Further, when the upper-stage cassette opening/closing-detecting switch SW502 has been switched from the open state to the closed state (YES to S1418), the value of the bit 1 of the data for the next transmission is set so as to cause the results of detection by the upper-stage cassette size 0 sensor Q608, the upper-stage cassette size 1 sensor Q609, the upper-stage cassette size 2 sensor Q610 and the upper-stage sheet-detecting sensor Q611 to be outputted as the signals R-IN 6 to R-IN 9 when the data for the next transmission is transmitted (step S1419).

The bit 2 (R-IN 2) of the received data is indicative of the state of the lower-stage cassette opening/closing-detecting switch SW503. When there is a change in the state of the lower-stage cassette opening/closing-detecting switch SW503 (YES to S1420), the change presence flag is turned on (step S1421). Further, when the lower-stage cassette opening/closing-detecting switch SW503 is switched from the open state to the closed state (YES to S1422), the value of the bit 2 of the data for the next transmission is set so as to cause the results of detection by the lower-stage cassette size 0 sensor Q612, the lower-stage cassette size 1 sensor Q613, the lower-stage cassette size 2 sensor Q614, and the lower-stage sheet-detecting sensor Q615 to be outputted as the signals R-IN 10 to R-IN 13 when the data for next transmission is transmitted (step S1423).

The bit 3 (R-IN 3) of the received data is indicative of the state of the optional sheet discharge unit connection-detecting switch SW504. When there is a change in the state of the optional sheet discharge unit connection-detecting switch SW504 (YES to S1424), the change presence flag is turned on (step S1425).

The bit 4 (R-IN 4) of the received data is indicative of the state of the optional sheet feed unit connection-detecting switch SW505. When the state of the optional sheet feed unit connection-detecting switch SW505 has changed (YES to S1426), the change presence flag is turned on (step S1427).

Further, when the optional sheet feed unit connection-detecting switch SW505 detect presence of connection (YES to S1428), the open/closed states of the upper-stage and lower-stage cassettes of the optional sheet feed unit are determined in steps S1429 et seq., described in detail hereinafter, whereas when absence of connection is detected, steps S1437 et seq., described in detail hereinafter, are executed.

The bit 17 (R-IN 17) of the received data is indicative of the state of an optional upper-stage cassette opening/closing-detecting sensor. In the determination of the open/closed state of the upper-stage cassette, first, it is determined whether or not there is a change in the output of the optional upper-stage cassette opening/closing-detecting sensor (step S1429). When there is a change in the output of the optional upper-stage cassette opening/closing-detecting sensor (YES to S1429), the change presence flag is turned on (step S1430). Further, when the output of the optional upper-stage cassette opening/closing-detecting sensor has been changed from one indicative of "the open state" to one indicative of "the closed state" (YES to S1431), the bit 17 of the data for the next transmission is set so as to cause the results of detection by an optional upper-stage cassette size 0 sensor, the optional upper-stage cassette size 1 sensor, the optional upper-stage cassette size 2 sensor, and the optional upper-stage sheet-detecting sensor to be outputted as the signals R-IN 22 to R-IN 25 when the data for the next transmission is transmitted (step S1432).

The bit 18 (R-IN 18) of the received data is indicative of the state of an optional lower-stage cassette opening/closing-detecting sensor. When there is a change in the output of the optional lower-stage cassette opening/closing-detecting sensor (YES to S1433), the change presence flag is turned on (step S1434). Further, when the output of the optional lower-stage cassette opening/closing-detecting sensor has been changed from one indicative of "the open state" to one indicative of "the closed state" (YES to S1435), the bit 18 of the next transmission data is set so as to cause the results of detection by the optional lower-stage cassette size 0 sensor, an optional lower-stage cassette size 1 sensor, the optional lower-stage cassette size 2 sensor, and the optional lower-stage sheet-detecting sensor to be outputted as the signals R-IN 26 to R-IN 29 when the data for the next transmission is transmitted (step S1436), followed by the program proceeding to steps S1437 et seq.

Figure 14A:
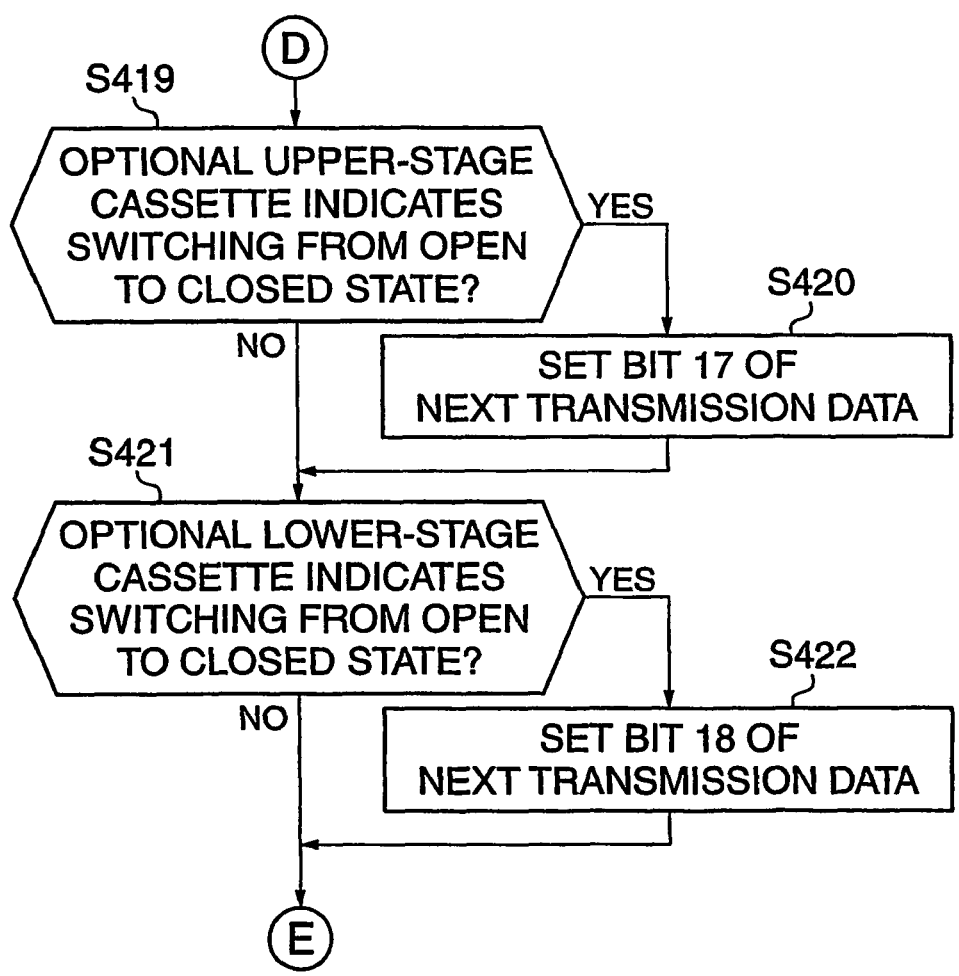
FIG. 14A and FIG. 14B are flowchart showing a continued part of the status acquisition process executed in the step S217 in FIG. 11.
Figure 14B:
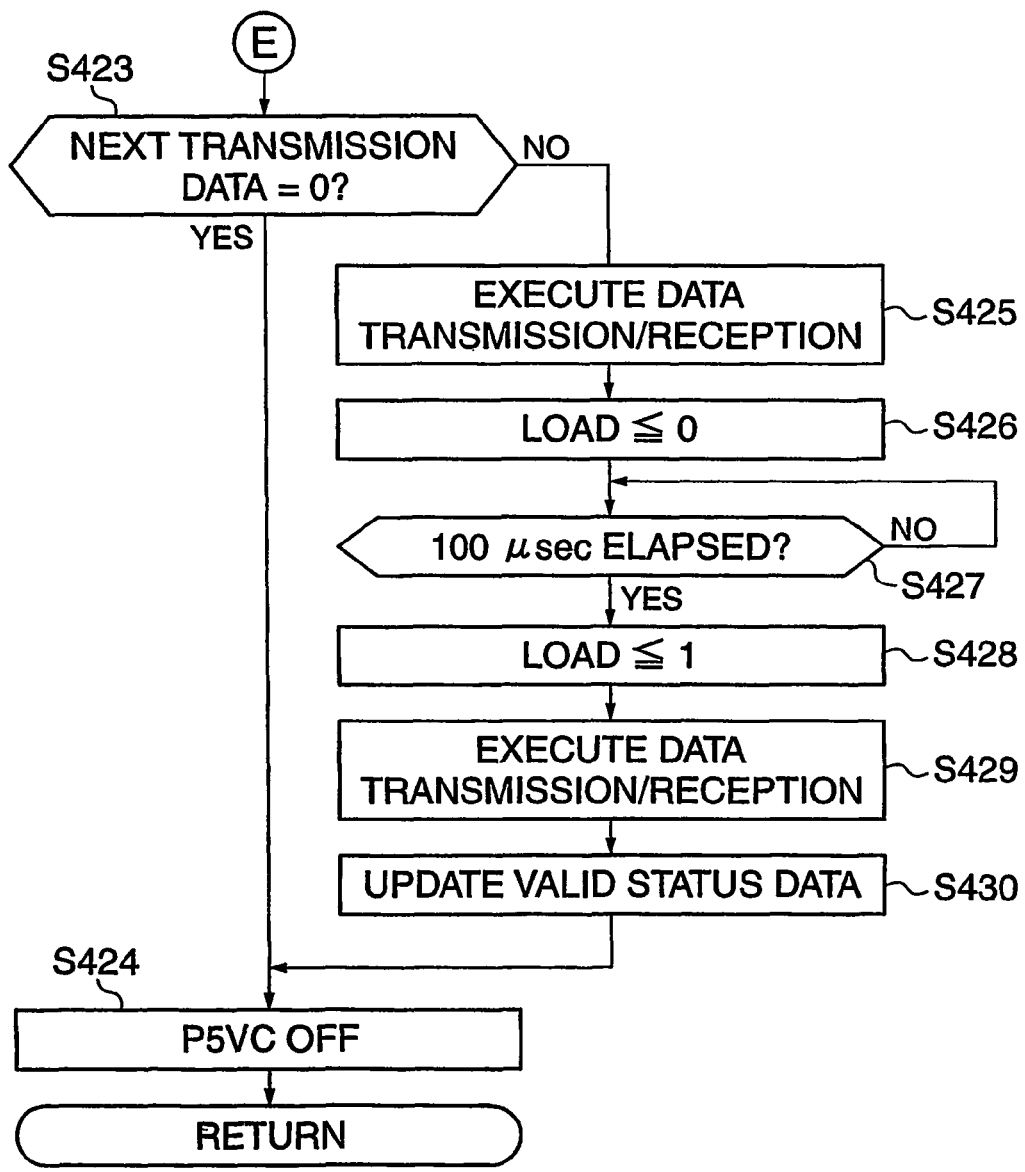

Processing in the steps S1437 to S1444 is identical with the processing in the steps S423 to S430 in FIG. 14A and FIG. 14B.

The change presence flag referred to in the present flowchart is used for determination of the presence or absence of a change in the status by the sub CPU in the step S1214 in FIG. 17, described hereinbefore.

Although the status acquisition for acquiring the statuses of the DECON 201 and the sheet feed unit has been described with reference to the present flowchart, the sub CPU is also capable of acquiring/determining the statuses of the sensor D group 217 and the sensor E group 218 via the RCON 216 in the same manner as described above. The status acquisition/determination via the RCON 216 is executed simultaneously with execution of the status acquisition/determination process related to the DECON 201 and the sheet feed unit.

Further, although when the door opening/closing-detecting switch SW501 is in the open state in the step S1414, when the upper-stage cassette opening/closing-detecting switch SW502 is switched from the open state to the closed state in the step S1418, and when the lower-stage cassette opening/closing-detecting switch SW503 is switched from the open state to the closed state in the step S1422, the bits of data for the next transmission are set to thereby turn on the power supply to the sensor B group 209, it may be arranged such that when a specific state, such as the open state of the door opening/closing-detecting switch SW501, the upper-stage cassette opening/closing-detecting switch SW502, or the lower-stage cassette opening/closing-detecting switch SW503, has continued for a significant time period, part or the whole of the corresponding bit of the next transmission data may be turned off to thereby turn off part or the whole of the power supply.

As described above, according to the present embodiment, in the case where an image forming apparatus connected to the network receives an inquiry about its status from the network when the image forming apparatus is in the energy-saving mode, the agency server 102 sends the status as a response on behalf of the image forming apparatus. Further, the image forming apparatus in the energy-saving mode transmits status information to the agency server 102 only when its status has changed. This enables the image forming apparatus to respond to a status request delivered through the network even when the image forming apparatus is in the energy-saving mode such as the sleep mode, with minimum energy consumption and at low costs.

Conventionally, the network side is not capable of detecting a change in the status of an image forming apparatus, such as a copying machine, and hence the status of the image forming apparatus is frequently requested. Therefore, each time an inquiry is made of the status of the image forming apparatus in the sleep mode, it is necessary to supply electric power to the entire image forming apparatus, which hinders achievement of sufficient energy conservation. However, in the network system of the present embodiment, only when the status of an image forming apparatus has changed, status information is transmitted to the network side with minimum power consumption. As a result, frequent operation of the network side for inquiring the status of the image forming apparatus can be dispensed with, and hence power supply to the entire image forming apparatus for each status inquiry is unnecessary, which makes it possible to reduce power consumption.

Further, in the present embodiment, in the energy-saving mode, it is possible to put the large power-consuming main CPU in the sleep state which inhibits response to the network, and when the status of the image forming apparatus has changed, activate the main CPU and deliver status information having been received by the sub CPU to the same. This enables the main CPU to transmit changed status information to the network, as well as to achieve low power consumption.

Moreover, the present embodiment makes it possible to activate the main CPU when an activation request (Wakeup command) is received from the network during the energy-saving mode, to thereby return the image forming apparatus from the sleep state to the normal state, thus enabling the image forming apparatus to respond to a print request or the like, and achieving low power consumption at the same time.

Thus, even when the image forming apparatus is in the sleep state, it is possible to respond to a status request from the network with minimum energy consumption and at low costs.

Further, according to the present embodiment, when the image forming apparatus is in a reduced power consumption mode, it is possible to switch the communication destination of a status group from the main CPU to the sub CPU to thereby respond to a status request from the network with minimum energy consumption and at low costs, even when the image forming apparatus is in the sleep state.

Furthermore, according to the present embodiment, when the image forming apparatus has shifted from the normal mode to the reduced power consumption mode, status information stored in the sub CPU can be transferred to the main CPU, and when the image forming apparatus has shifted from the reduced power consumption mode to the normal mode, status information stored in the main CPU can be transferred to the sub CPU. This makes it possible to shift the image forming apparatus from one mode to the other swiftly with accurate status information maintained, as well as to respond to a status request from the network with minimum energy consumption and at low costs.

Moreover, while in the modes except the sleep mode, the DCON 201 transmits the status to the controller 202 by serial communication by the same method as conventionally employed, in response to a command indicative of a status inquiry from the controller 202 to the DCON 201, in the sleep mode, in which command exchange is not performed between the controller 202 to the DCON 201, the serial communication is used dedicatedly for status communication, so that operation of the controller for command generation and operation of the DCON 201 for determination as to commands can be dispensed with, which makes it possible to achieve power conservation. Thus, even when the image forming apparatus is in the sleep state, it is possible to respond to a status request from the network with minimum energy consumption and at low costs.

Further, in the modes except the sleep mode, communications between the DCON 201 and the controller 202 are carried out by asynchronous communications which do not necessitate any transfer clock, which contributes to reduction of radiation noise as well as decrease of IC terminals. However, in asynchronous communications, an internal operating clock is required to have a frequency several times higher than that of a transfer clock, for matching phases for communication. On the other hand, in the sleep mode, the communications between the DCON 201 and the controller 202 are carried out by synchronous communication using a transfer clock generated by either the DCON 201 or the controller 202, so that the other of the DCON 201 and the controller 202, which generates no transfer clock, operates in accordance with an operating clock having the same frequency as the generated transfer clock. As a result, since energy consumption is generally proportional to the frequency of an operating clock, power conservation in the sleep mode can be achieved. Thus, even when the image forming apparatus is in the sleep state, it is possible to respond to a status request from the network with minimum energy consumption and at low costs.

Next, a third embodiment of the present invention will be described.

Although in the above described first and second embodiments, the sub CPU (1-chip microcomputer Q702) and the main CPU (main-chip microcomputer Q701) are physically separate from each other, this is not limitative. In the present embodiment, a single chip (CPU) is operated with a high-frequency clock in the normal mode, and operated with a low-frequency clock in the energy-saving mode. Further, in the energy-saving mode, a local power supply in the single chip is saved, and the chip is driven with small power consumption.

The present invention includes a combination of the above described embodiments.

Hereafter, a description will be given of a data processing program that can be read by the image forming apparatus according to any one of the above described embodiments, by referring to a memory map shown in FIG. 23.

FIG. 23 is a diagram showing the structure of a memory map of a storage medium that stores various data processing programs which can be read out by the image forming apparatus according to any one of the above described embodiments.

Although not specifically shown, the storage medium sometimes also stores information for managing a group of control programs stored in the storage medium, such as information of versions of the programs, and creators of the same, and at the same time, information dependent on an operating system (OS) that reads out the programs, such as icons discriminatively representing the programs.

The functions of the image forming apparatus according to the first or second embodiments described hereinbefore with reference to FIGS. 11, 12, 13 to 14, or 17 to 18, 19, 20 to 22 may be executed by a host computer, based on a program externally installed on the computer. In this case, the present invention is applicable to a case where a group of information including the program code is supplied to an input device of the host computer from a storage medium, such as a CD-ROM, a flash memory, and a flexible disk (FD), or from a storage medium of an external device via a network.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of the present invention, and hence the storage medium on which the program code is stored constitutes the present invention.

Examples of the storage medium for supplying the program code include a RAM, a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

Furthermore, the present invention may be applied to a system comprised of a plurality of apparatuses or to an apparatus formed by a single apparatus.

Further, a system or an apparatus may be supplied with a program code of software which realizes the functions of any of the above described embodiments by downloading the program code from a database on a network by a communication program, so that the system or the apparatus can have the advantageous effects of the present invention.

The present invention is not limited to the above described embodiments, but can be modified in various manners based on the subject matter of the present invention, which should not be excluded from the scope of the present invention.

INDUSTRIAL APPLICABILITY

According to the present invention, even when a status request is received when an image forming apparatus is in the sleep state, an agency server is caused to respond to the status request on behalf of the image forming apparatus to thereby prevent the status request from causing an impediment to reduced power consumption, and therefore, by applying the present invention to an image forming apparatus and a server connected to a network, and a network system including the image forming apparatus, the server, and an information processing apparatus, it is possible to more effectively attain the power conservation.

The invention claimed is:

1. An image forming apparatus connected to a server apparatus and a client computer via a network, the image forming apparatus comprising an image forming unit for image formation, and having a standby mode, and an energy-saving mode in which less electric power is consumed than in the standby mode, wherein waiting time to restart image formation from the standby mode is shorter than that from the energy-saving mode, and the image forming apparatus further comprising:

a detecting device that periodically detects a status of the image forming apparatus;

a receiving device that receives from the client computer an inquiry about a status of the image forming apparatus; and a first control device configured to, when the inquiry is received by said receiving device and the image forming apparatus is in the standby mode, send the status detected by said detecting device to the client computer, and before the image forming apparatus shifts to the energy-saving mode, transmit the status detected by said detecting device and an agency request command to the server apparatus and thereafter shift to a halt state, wherein, after receiving the agency request, the server apparatus responds to the inquiry from the client computer on behalf of said first control device; and a second control device configured to output to said first control device a command for resuming from the halt state, in a case where there is any change between a latest status detected by said detecting device while the image forming apparatus is in the energy saving mode and the status detected earlier before the image forming apparatus shifts to the energy-saving mode, in the absence of an image forming request, wherein said first control device transmits the latest status to the server apparatus, after resuming from the halt state responding to the command output by said second control device, and thereafter shifts back to the halt state, without the image forming apparatus shifting to the standby mode.

2. An image forming apparatus according to claim 1, wherein the received inquiry is transmitted to said second control device when the image forming apparatus is in the energy saving mode.

3. An image forming apparatus according to claim 1, wherein said second control device monitors the detected status at predetermined time intervals to determine whether or not there is any change in the detected status after the image forming apparatus shifts to the energy-saving mode.

4. An image forming apparatus according to claim 1, wherein said first control device outputs to said second control device a first signal indicating that the status of the image forming apparatus is changed from the energy saving mode to the standby mode, and said second control device transfers the detected status when receiving the first signal output from said first control device.

5. An image forming apparatus according to claim 4, further comprising a transfer device configured to output a second signal to said second control device when receiving via the network a request for causing the image forming apparatus to restart from the energy saving mode, wherein said second control device outputs to said first control device a command for resuming from the halt state when receiving the second signal when the image forming apparatus is in the energy saving mode.

\* \* \* \* \*